US011711539B2

(12) United States Patent
Maeda et al.

(10) Patent No.: US 11,711,539 B2
(45) Date of Patent: *Jul. 25, 2023

(54) IMAGE ENCODING APPARATUS, IMAGE ENCODING METHOD AND PROGRAM, IMAGE DECODING APPARATUS, AND IMAGE DECODING METHOD AND PROGRAM

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 48 days.

This patent is subject to a terminal disclaimer.

(21) Appl. No.: 17/381,778

(22) Filed: Jul. 21, 2021

(65) Prior Publication Data

US 2021/0352317 A1 Nov. 11, 2021

Related U.S. Application Data

(63) Continuation of application No. 16/840,184, filed on Apr. 3, 2020, now Pat. No. 11,102,505, which is a (Continued)

(30) Foreign Application Priority Data

Jun. 12, 2014 (JP) .............................. JP2014-121903

(51) Int. Cl.
*H04N 19/52* (2014.01)
*H04N 19/70* (2014.01)
(Continued)

(52) U.S. Cl.
CPC .......... *H04N 19/52* (2014.11); *H04N 19/176* (2014.11); *H04N 19/182* (2014.11);
(Continued)

(58) Field of Classification Search
CPC ..... H04N 19/52; H04N 19/182; H04N 19/593
See application file for complete search history.

(56) References Cited

U.S. PATENT DOCUMENTS 9,756,354 B2 * 9/2017 Pang .................... H04N 19/463
10,469,863 B2 * 11/2019 Zhu ........................ H04N 19/52
(Continued)

FOREIGN PATENT DOCUMENTS

CN 103210646 A 7/2013
CN 103563386 A 2/2014

OTHER PUBLICATIONS

Intra motion compensation with variable length intra MV coding; Kwon; Qualcomm; 2013. (Year: 2013).*
(Continued)

*Primary Examiner* — Luis Perez-Fuentes
(74) *Attorney, Agent, or Firm* — Canon U.S.A., Inc. IP Division

(57) ABSTRACT

An index, indicating a vector representing a spatial relationship between a block to be encoded and at least one block spatially at the periphery of the block to be encoded, is encoded in a case where an coding mode to encode the block to be encoded is a first coding mode, and an index, indicating a vector representing a spatial relationship between the block to be encoded and at least one block spatially at the periphery of the block to be encoded, and a vector correlated with a block within an image that is different from the image to be encoded, is encoded in a case where the coding mode to encode the block to be encoded is a second coding mode.

1 Claim, 40 Drawing Sheets

Related U.S. Application Data continuation of application No. 15/317,926, filed as application No. PCT/JP2015/002906 on Jun. 10, 2015, now Pat. No. 10,652,568.

(51) Int. Cl.
  *H04N 19/593* (2014.01)
  *H04N 19/176* (2014.01)
  *H04N 19/182* (2014.01)
  *H04N 19/557* (2014.01)

(52) U.S. Cl.
  CPC ......... *H04N 19/557* (2014.11); *H04N 19/593* (2014.11); *H04N 19/70* (2014.11)

(56) References Cited

U.S. PATENT DOCUMENTS

| | | | |
|---|---|---|---|
| 10,666,968 B2 * | 5/2020 | Xu | H04N 19/52 |
| 11,102,505 B2 * | 8/2021 | Maeda | H04N 19/52 |
| 11,388,433 B2 * | 7/2022 | Zhu | H04N 19/91 |

OTHER PUBLICATIONS

Intra motion compensation with 2D motion vectors; Pang; TI; Aug. 2013. (Year: 2013).*
Intra motion compensation with variable length intra MV coding; Kwon; 2013. (Year: 2013).*

* cited by examiner

FIG. 2

| No. | | Descriptor |
|---|---|---|
| 1 | coding_unit( x0, y0, log2CbSize ) { | |
| 2 | <<<OMITTED>>> | |
| 3 | if( slice_type != I ) | |
| 4 | cu_skip_flag[ x0 ][ y0 ] | ae(v) |
| 5 | nCbS = ( 1 << log2CbSize ) | |
| 6 | if( cu_skip_flag[ x0 ][ y0 ] ) | |
| 7 | prediction_unit( x0, y0, nCbS, nCbS ) | |
| 8 | else { | |
| 9 | if( intra_block_copy_enabled_flag ) | |
| 10 | intra_bc_flag[ x0 ][ y0 ] | ae(v) |
| 11 | if( slice_type != I && !intra_bc_flag[ x0 ][ y0 ] ) | |
| 12 | pred_mode_flag | ae(v) |
| 13 | if( CuPredMode[ x0 ][ y0 ] != MODE_INTRA \|\| intra_bc_flag[ x0 ][ y0 ] \|\| log2CbSize == MinCbLog2SizeY ) | |
| 14 | part_mode | ae(v) |
| 15 | if( CuPredMode[ x0 ][ y0 ] == MODE_INTRA ) { | |
| 16 | if( PartMode == PART_2Nx2N && pcm_enabled_flag && !intra_bc_flag[ x0 ][ y0 ] && log2CbSize >= Log2MinIpcmCbSizeY && log2CbSize <= Log2MaxIpcmCbSizeY ) | |
| 17 | <<<OMITTED>>> | |
| 18 | } else if( intra_bc_flag[ x0 ][ y0 ] ) { | |
| 19 | if( PartMode == PART_2Nx2N ) | |
| 20 | prediction_unit( x0, y0, nCbS, nCbS ) | |
| 21 | else if( PartMode == PART_2NxN ) { | |
| 22 | prediction_unit( x0, y0, nCbS, nCbS / 2 ) | |
| 23 | prediction_unit( x0, y0 + ( nCbS / 2 ), nCbS, nCbS / 2 ) | |
| 24 | } else if( PartMode == PART_Nx2N ) { | |
| 25 | prediction_unit( x0, y0, nCbS / 2, nCbS ) | |
| 26 | prediction_unit( x0 + ( nCbS / 2 ), y0, nCbS / 2, nCbS ) | |
| 27 | } else if( PartMode == PART_NxN ) { | |
| 28 | prediction_unit( x0, y0, nCbS / 2, nCbS / 2 ) | |
| 29 | prediction_unit( x0 + ( nCbS / 2 ), y0, nCbS / 2, nCbS / 2 ) | |
| 30 | prediction_unit( x0, y0 + ( nCbS / 2 ), nCbS / 2, nCbS / 2 ) | |
| 31 | prediction_unit( x0 + ( nCbS / 2 ), y0 + ( nCbS / 2 ), nCbS / 2, nCbS / 2 ) | |
| 32 | } | |
| 33 | } else { | |
| 34 | pbOffset = ( PartMode == PART_NxN ) ? ( nCbS / 2 ) : nCbS | |
| 35 | for( j = 0; j < nCbS; j = j + pbOffset ) | |
| 36 | for( i = 0; i < nCbS; i = i + pbOffset ) | |
| 37 | prev_intra_luma_pred_flag[ x0 + i ][ y0 + j ] | ae(v) |
| 38 | for( j = 0; j < nCbS; j = j + pbOffset ) | |
| 39 | for( i = 0; i < nCbS; i = i + pbOffset ) | |
| 40 | if( prev_intra_luma_pred_flag[ x0 + i ][ y0 + j ] ) | |
| 41 | mpm_idx[ x0 + i ][ y0 + j ] | ae(v) |
| 42 | else | |
| 43 | rem_intra_luma_pred_mode[ x0 + i ][ y0 + j ] | ae(v) |
| 44 | <<<OMITTED>>> | |
| 45 | } | |
| 46 | } else { | |
| 47 | if( PartMode == PART_2Nx2N ) | |
| 48 | prediction_unit( x0, y0, nCbS, nCbS ) | |
| 49 | else if( PartMode == PART_2NxN ) { | |
| 50 | <<<OMITTED>>> | |
| 51 | } | |
| 52 | } | |
| 53 | <<<OMITTED>>> | |
| 54 | } | |
| 55 | } | |

FIG. 3

| No. | | Descriptor |
|---|---|---|
| 1 | prediction_unit( x0, y0, nPbW, nPbH ) { | |
| 2 | if( cu_skip_flag[ x0 ][ y0 ] ) { | |
| 3 | if( MaxNumMergeCand > 1 ) | |
| 4 | merge_idx[ x0 ][ y0 ] | ae(v) |
| 5 | } else { | |
| 6 | merge_flag[ x0 ][ y0 ] | ae(v) |
| 7 | if( merge_flag[ x0 ][ y0 ] ) { | |
| 8 | if( MaxNumMergeCand > 1 ) | |
| 9 | merge_idx[ x0 ][ y0 ] | ae(v) |
| 10 | } else { // ! merge_flag[ x0 ][ y0 ] | |
| 11 | if( slice_type = = B ) | |
| 12 | inter_pred_idc[ x0 ][ y0 ] | ae(v) |
| 13 | if( intra_bc_flag[ x0 ][ y0 ] ) { | |
| 14 | mvd_coding( x0, y0, 0 ) | |
| 15 | mvp_ibc_flag[ x0 ][ y0 ] | ae(v) |
| 16 | } else { | |
| 17 | if( inter_pred_idc[ x0 ][ y0 ] != PRED_L1 ) { | |
| 18 | if( num_ref_idx_l0_active_minus1 > 0 ) | |
| 19 | ref_idx_l0[ x0 ][ y0 ] | ae(v) |
| 20 | mvd_coding( x0, y0, 0 ) | |
| 21 | mvp_l0_flag[ x0 ][ y0 ] | ae(v) |
| 22 | } // inter_pred_idc[ x0 ][ y0 ] != PRED_L1 | |
| 23 | if( inter_pred_idc[ x0 ][ y0 ] != PRED_L0 ) { | |
| 24 | if( num_ref_idx_l1_active_minus1 > 0 ) | |
| 25 | ref_idx_l1[ x0 ][ y0 ] | ae(v) |
| 26 | if( mvd_l1_zero_flag && inter_pred_idc[ x0 ][ y0 ] = = PRED_BI ) { | |
| 27 | MvdL1[ x0 ][ y0 ][ 0 ] = 0 | |
| 28 | MvdL1[ x0 ][ y0 ][ 1 ] = 0 | |
| 29 | } else | |
| 30 | mvd_coding( x0, y0, 1 ) | |
| 31 | mvp_l1_flag[ x0 ][ y0 ] | ae(v) |
| 32 | } // inter_pred_idc[ x0 ][ y0 ] != PRED_L0 | |
| 33 | } // !intra_bc_flag[x0][y0] | |
| 34 | } //!merge_flag[ x0 ][ y0 ] | |
| 35 | } | |

FIG. 4

| No. | | Descriptor |
|---|---|---|
| 1 | prediction_unit( x0, y0, nPbW, nPbH ) { | |
| 2 | if( cu_skip_flag[ x0 ][ y0 ] ) { | |
| 3 |   if( MaxNumMergeCand > 1 ) | |
| 4 |     merge_idx[ x0 ][ y0 ] | ae(v) |
| 5 | } else { | |
| 6 |   merge_flag[ x0 ][ y0 ] | ae(v) |
| 7 |   if( merge_flag[ x0 ][ y0 ] ) { | |
| 8 |     if( MaxNumMergeCand > 1 ) | |
| 9 |       merge_idx[ x0 ][ y0 ] | ae(v) |
| 10 |   } else { // ! merge_flag[ x0 ][ y0 ] | |
| 11 |     if( slice_type == B ) | |
| 12 |       inter_pred_idc[ x0 ][ y0 ] | ae(v) |
| 13 |     } else { | |
| 14 |       if( inter_pred_idc[ x0 ][ y0 ] != PRED_L1 \|\| intra_bc_flag[ x0 ][ y0 ] ) { | |
| 15 |         if( num_ref_idx_l0_active_minus1 > 0 && !intra_bc_flag[ x0 ][ y0 ] ) | |
| 16 |           ref_idx_l0[ x0 ][ y0 ] | ae(v) |
| 17 |         mvd_coding( x0, y0, 0 ) | |
| 18 |         if(!intra_bc_flag[ x0 ][ y0 ]) | |
| 19 |           mvp_l0_flag[ x0 ][ y0 ] | ae(v) |
| 20 |         else | |
| 21 |           mvp_ibc_flag[ x0 ][ y0 ] | ae(v) |
| 22 |       } // inter_pred_idc[ x0 ][ y0 ] != PRED_L1 | |
| 23 |       if( inter_pred_idc[ x0 ][ y0 ] != PRED_L0 && !intra_bc_flag[ x0 ][ y0 ] ) { | |
| 24 |         if( num_ref_idx_l1_active_minus1 > 0 ) | |
| 25 |           ref_idx_l1[ x0 ][ y0 ] | ae(v) |
| 26 |         if( mvd_l1_zero_flag && inter_pred_idc[ x0 ][ y0 ] == PRED_BI ) { | |
| 27 |           MvdL1[ x0 ][ y0 ][ 0 ] = 0 | |
| 28 |           MvdL1[ x0 ][ y0 ][ 1 ] = 0 | |
| 29 |         } else | |
| 30 |           mvd_coding( x0, y0, 1 ) | |
| 31 |         mvp_l1_flag[ x0 ][ y0 ] | ae(v) |
| 32 |       } // inter_pred_idc[ x0 ][ y0 ] != PRED_L0 | |
| 33 |     } // !intra_bc_flag[x0][y0] | |
| 34 |   } //!merge_flag[ x0 ][ y0 ] | |
| 35 | } | |

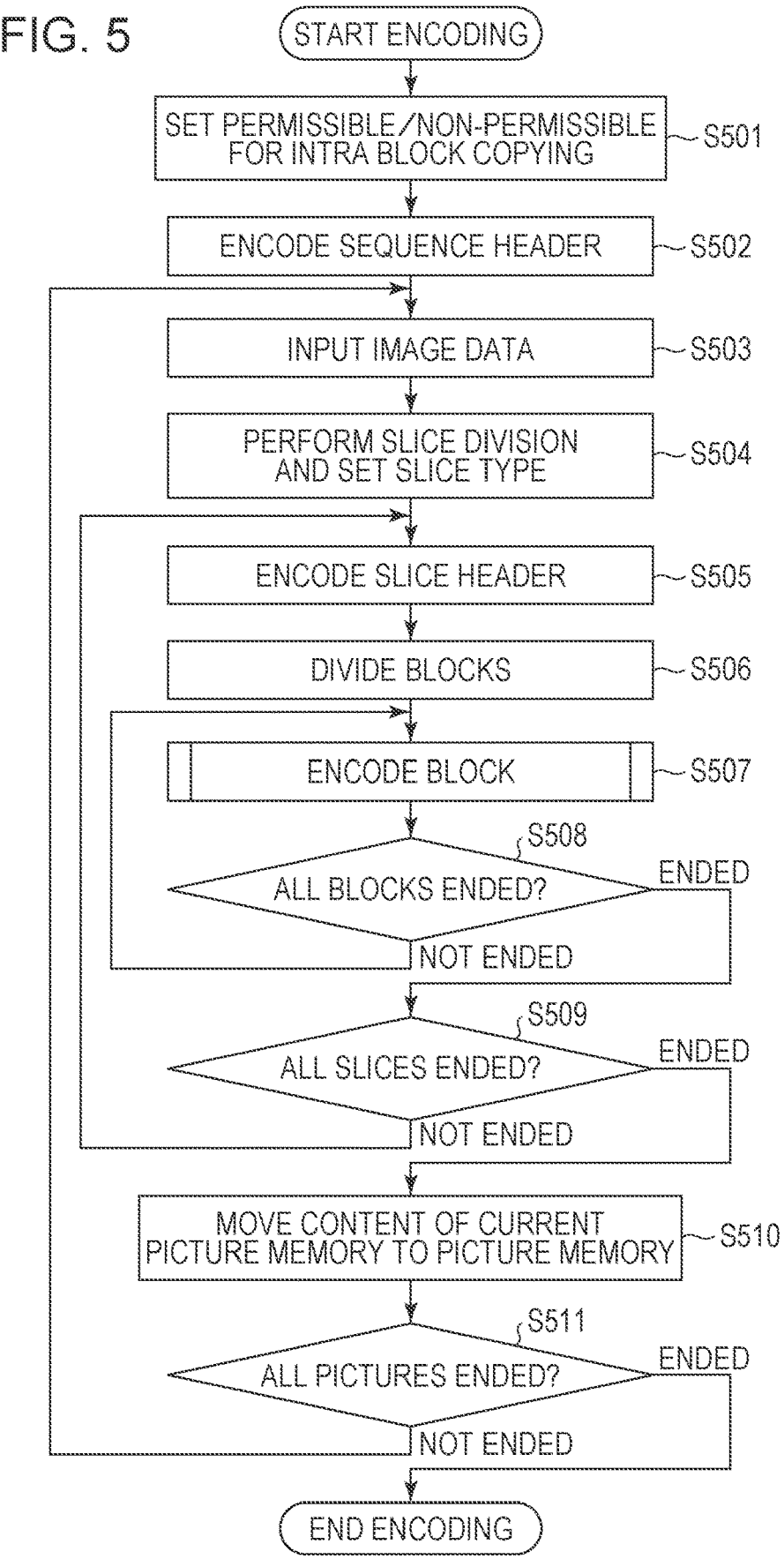

FIG. 10

| No. | | Descriptor |
|---|---|---|
| 1 | slice_segment_header( ) { | |
| 2 | <<<OMITTED>>> | |
| 3 |   if( !dependent_slice_segment_flag ) { | |
| 4 |     for( i = 0; i < num_extra_slice_header_bits; i++ ) | |
| 5 |       slice_reserved_flag[ i ] | u(l) |
| 6 |     slice_type | ue(v) |
| 7 | <<<OMITTED>>> | |
| 8 |   if( slice_type == P \|\| slice_type == B ) { | |
| 9 | <<<OMITTED>>> | |
| 10 |     if( ( weighted_pred_flag && slice_type == P ) \|\|<br>      ( weighted_bipred_flag && slice_type == B ) ) | |
| 11 |       pred_weight_table( ) | |
| 12 |     five_minus_max_num_merge_cand | ue(v) |
| 13 |   } | |
| 14 |   If (intra_block_copy_enabled_flag) | |
| 15 |     five_minus_max_num_merge_cand_intra_bc | ue(v) |
| 16 | <<<OMITTED>>> | |
| 17 | } | |
| 18 | <<<OMITTED>>> | |
| 19 |   byte_alignment( ) | |
| 20 | } | |

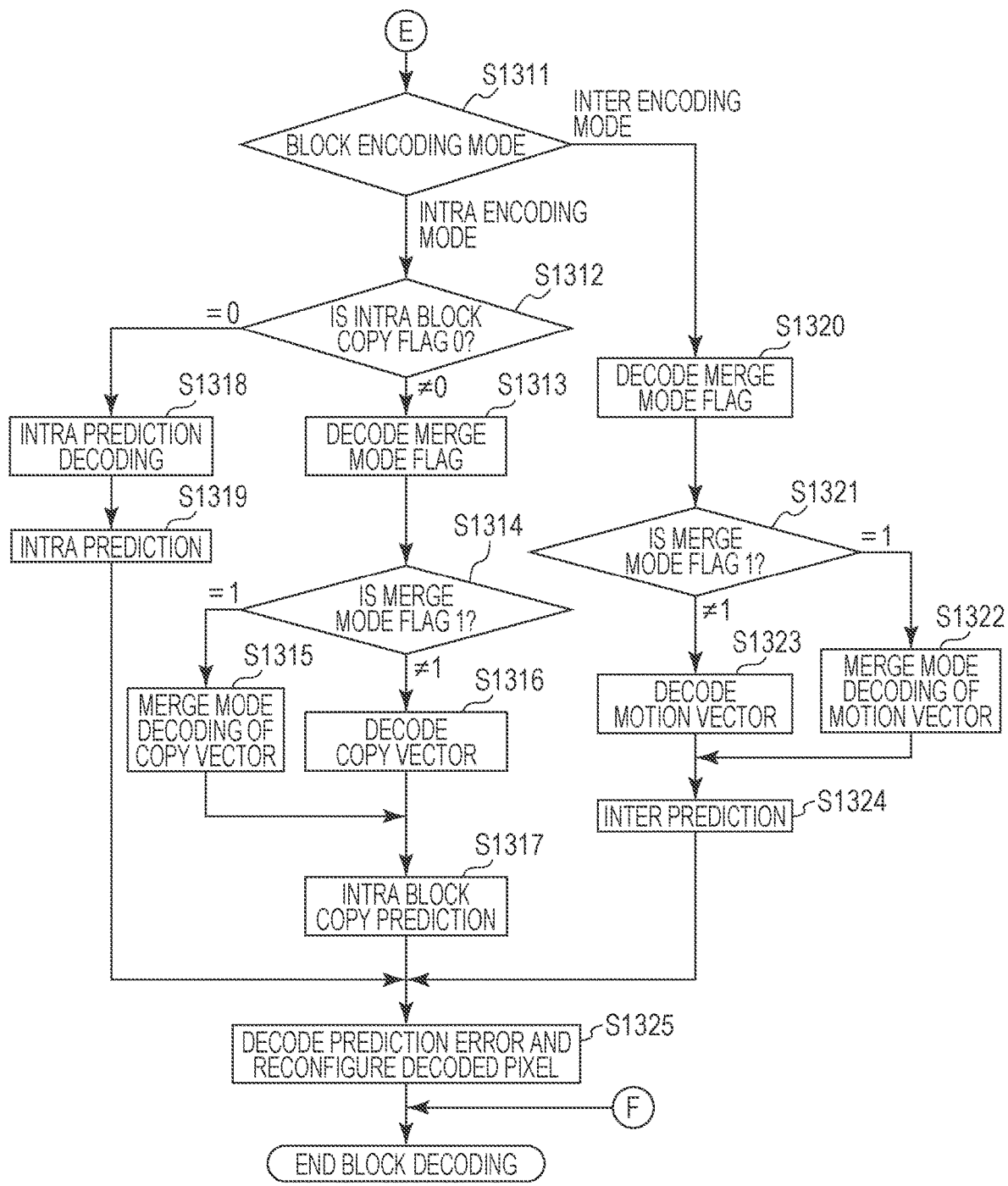

FIG. 14

| No. | | Descriptor |
|---|---|---|
| 1 | coding_unit( x0, y0, log2CbSize ) { | |
| 2 | <<<OMITTED>>> | |
| 3 | cu_skip_flag[ x0 ][ y0 ] | ae(v) |
| 4 | nCbS = ( 1 << log2CbSize ) | |
| 5 | if( cu_skip_flag[ x0 ][ y0 ] ) | |
| 6 |   prediction_unit( x0, y0, nCbS, nCbS ) | |
| 7 | else { | |
| 8 |   if( intra_block_copy_enabled_flag ) | |
| 9 |     intra_bc_flag[ x0 ][ y0 ] | ae(v) |
| 10 |   if( slice_type != I && !intra_bc_flag[ x0 ][ y0 ] ) | |
| 11 |     pred_mode_flag | ae(v) |
| 12 |   if( CuPredMode[ x0 ][ y0 ] != MODE_INTRA \|\| intra_bc_flag[ x0 ][ y0 ] \|\| log2CbSize == MinCbLog2SizeY ) | |
| 13 |     part_mode | ae(v) |
| 14 |   if( CuPredMode[ x0 ][ y0 ] == MODE_INTRA ) { | |
| 15 |     if( PartMode == PART_2Nx2N && pcm_enabled_flag && !intra_bc_flag[ x0 ][ y0 ] && log2CbSize >= Log2MinIpcmCbSizeY && log2CbSize <= Log2MaxIpcmCbSizeY ) | |
| 16 | <<<OMITTED>>> | |
| 17 |   } else if( intra_bc_flag[ x0 ][ y0 ] ) { | |
| 18 |     if( PartMode == PART_2Nx2N ) | |
| 19 |       prediction_unit( x0, y0, nCbS, nCbS ) | |
| 20 |     else if( PartMode == PART_2NxN ) { | |
| 21 |       prediction_unit( x0, y0, nCbS, nCbS / 2 ) | |
| 22 |       prediction_unit( x0, y0 + ( nCbS / 2 ), nCbS, nCbS / 2 ) | |
| 23 |     } else if( PartMode == PART_Nx2N ) { | |
| 24 |       prediction_unit( x0, y0, nCbS / 2, nCbS ) | |
| 25 |       prediction_unit( x0 + ( nCbS / 2 ), y0, nCbS / 2, nCbS ) | |
| 26 |     } else if( PartMode == PART_NxN ) { | |
| 27 |       prediction_unit( x0, y0, nCbS / 2, nCbS / 2 ) | |
| 28 |       prediction_unit( x0 + ( nCbS / 2 ), y0, nCbS / 2, nCbS / 2 ) | |
| 29 |       prediction_unit( x0, y0 + ( nCbS / 2 ), nCbS / 2, nCbS / 2 ) | |
| 30 |       prediction_unit( x0 + ( nCbS / 2 ), y0 + ( nCbS / 2 ), nCbS / 2, nCbS / 2 ) | |
| 31 |     } | |
| 32 |   } else { | |
| 33 |     pbOffset = ( PartMode == PART_NxN ) ? ( nCbS / 2 ) : nCbS | |
| 34 |     for( j = 0; j < nCbS; j = j + pbOffset ) | |
| 35 |       for( i = 0; i < nCbS; i = i + pbOffset ) | |
| 36 |         prev_intra_luma_pred_flag[ x0 + i ][ y0 + j ] | ae(v) |
| 37 |     for( j = 0; j < nCbS; j = j + pbOffset ) | |
| 38 |       for( i = 0; i < nCbS; i = i + pbOffset ) | |
| 39 |         if( prev_intra_luma_pred_flag[ x0 + i ][ y0 + j ] ) | |
| 40 |           mpm_idx[ x0 + i ][ y0 + j ] | ae(v) |
| 41 |         else | |
| 42 |           rem_intra_luma_pred_mode[ x0 + i ][ y0 + j ] | ae(v) |
| 43 | <<<OMITTED>>> | |
| 44 |   } | |
| 45 |   } else { | |
| 46 |     if( PartMode == PART_2Nx2N ) | |
| 47 |       prediction_unit( x0, y0, nCbS, nCbS ) | |
| 48 |     else if( PartMode == PART_2NxN ) { | |
| 49 | <<<OMITTED>>> | |
| 50 |     } | |
| 51 |   } | |
| 52 | <<<OMITTED>>> | |
| 53 | } | |
| 54 | } | |

FIG. 17

| No. | | Descriptor |
|---|---|---|
| 1 | coding_unit( x0, y0, log2CbSize ) { | |
| 2 | <<<OMITTED>>> | |
| 3 | if( slice_type != I || (slice_type == I && intra_block_copy_enabled_flag)) | |
| 4 | cu_skip_flag[ x0 ][ y0 ] | ae(v) |
| 5 | nCbS = ( 1 << log2CbSize ) | |
| 6 | if( cu_skip_flag[ x0 ][ y0 ] ) | |
| 7 | prediction_unit( x0, y0, nCbS, nCbS ) | |
| 8 | else { | |
| 9 | if( intra_block_copy_enabled_flag ) | |
| 10 | intra_bc_flag[ x0 ][ y0 ] | ae(v) |
| 11 | if( slice_type != I && !intra_bc_flag[ x0 ][ y0 ] ) | |
| 12 | pred_mode_flag | ae(v) |
| 13 | if( CuPredMode[ x0 ][ y0 ] != MODE_INTRA || intra_bc_flag[ x0 ][ y0 ] || log2CbSize == MinCbLog2SizeY ) | |
| 14 | part_mode | ae(v) |
| 15 | if( CuPredMode[ x0 ][ y0 ] == MODE_INTRA ) { | |
| 16 | if( PartMode == PART_2Nx2N && pcm_enabled_flag && !intra_bc_flag[ x0 ][ y0 ] && log2CbSize >= Log2MinIpcmCbSizeY && log2CbSize <= Log2MaxIpcmCbSizeY ) | |
| 17 | <<<OMITTED>>> | |
| 18 | } else if( intra_bc_flag[ x0 ][ y0 ] ) { | |
| 19 | if( PartMode == PART_2Nx2N ) | |
| 20 | prediction_unit( x0, y0, nCbS, nCbS ) | |
| 21 | else if( PartMode == PART_2NxN ) { | |
| 22 | prediction_unit( x0, y0, nCbS, nCbS / 2 ) | |
| 23 | prediction_unit( x0, y0 + ( nCbS / 2 ), nCbS, nCbS / 2 ) | |
| 24 | } else if( PartMode == PART_Nx2N ) { | |
| 25 | prediction_unit( x0, y0, nCbS / 2, nCbS ) | |
| 26 | prediction_unit( x0 + ( nCbS / 2 ), y0, nCbS / 2, nCbS ) | |
| 27 | } else if( PartMode == PART_NxN ) { | |
| 28 | prediction_unit( x0, y0, nCbS / 2, nCbS / 2 ) | |
| 29 | prediction_unit( x0 + ( nCbS / 2 ), y0, nCbS / 2, nCbS / 2 ) | |
| 30 | prediction_unit( x0, y0 + ( nCbS / 2 ), nCbS / 2, nCbS / 2 ) | |
| 31 | prediction_unit( x0 + ( nCbS / 2 ), y0 + ( nCbS / 2 ), nCbS / 2, nCbS / 2 ) | |
| 32 | } | |
| 33 | } else { | |
| 34 | pbOffset = ( PartMode == PART_NxN ) ? ( nCbS / 2 ) : nCbS | |
| 35 | for( j = 0; j < nCbS; j = j + pbOffset ) | |
| 36 | for( i = 0; i < nCbS; i = i + pbOffset ) | |
| 37 | prev_intra_luma_pred_flag[ x0 + i ][ y0 + j ] | ae(v) |
| 38 | for( j = 0; j < nCbS; j = j + pbOffset ) | |
| 39 | for( i = 0; i < nCbS; i = i + pbOffset ) | |
| 40 | if( prev_intra_luma_pred_flag[ x0 + i ][ y0 + j ] ) | |
| 41 | mpm_idx[ x0 + i ][ y0 + j ] | ae(v) |
| 42 | else | |
| 43 | rem_intra_luma_pred_mode[ x0 + i ][ y0 + j ] | ae(v) |
| 44 | <<<OMITTED>>> | |
| 45 | } | |
| 46 | } else { | |
| 47 | if( PartMode == PART_2Nx2N ) | |
| 48 | prediction_unit( x0, y0, nCbS, nCbS ) | |
| 49 | else if( PartMode == PART_2NxN ) { | |
| 50 | <<<OMITTED>>> | |
| 51 | } | |
| 52 | } | |
| 53 | <<<OMITTED>>> | |
| 54 | } | |
| 55 | } | |

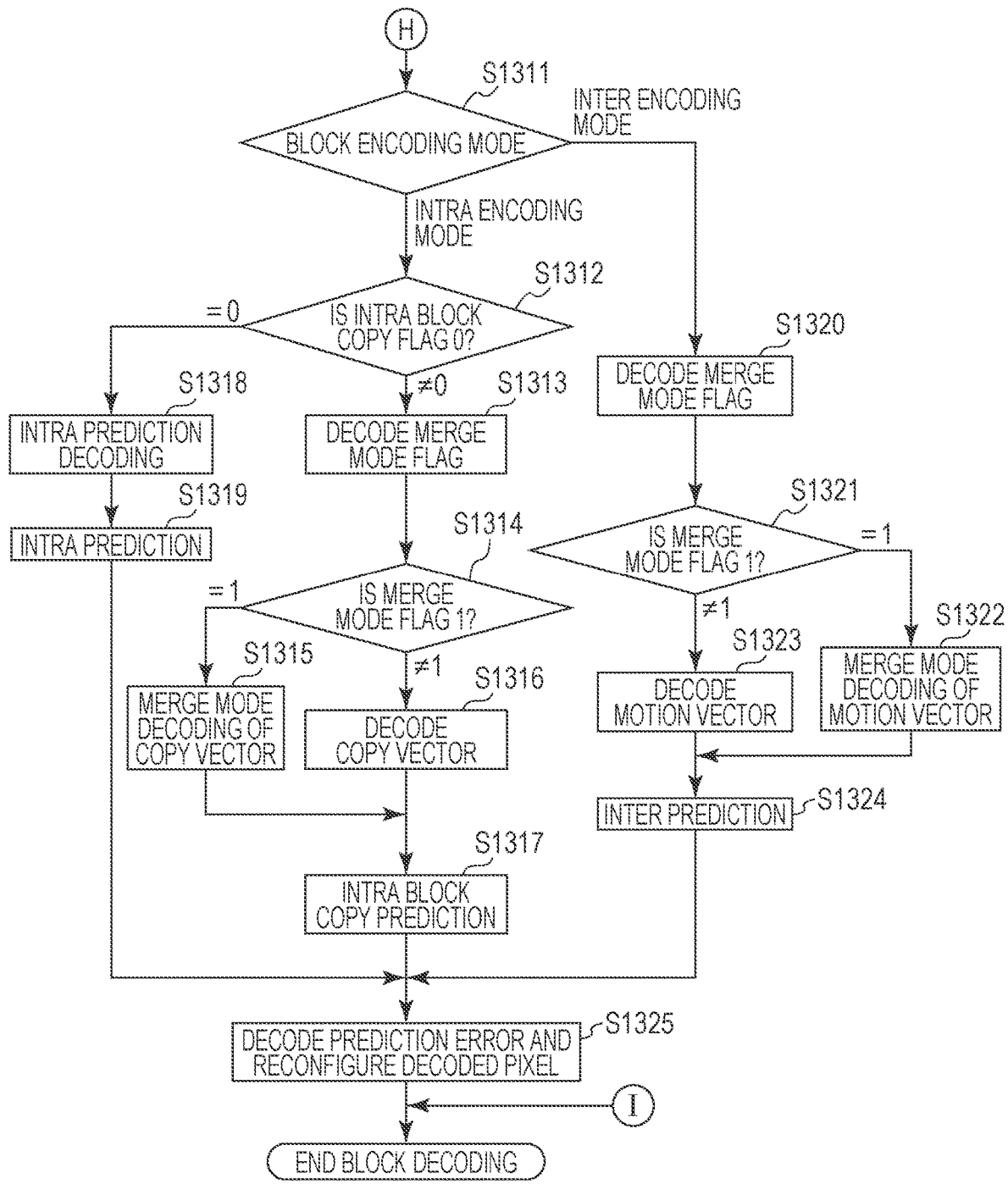

FIG. 19

| No | | Descriptor |
|---|---|---|
| 1 | coding_unit( x0, y0, log2CbSize ) { | |
| 2 | <<<OMITTED>>> | |
| 3 | if( intra_block_copy_enabled_flag ) | |
| 4 |   intra_bc_flag[ x0 ][ y0 ] | ae(v) |
| 5 | if( slice_type != I \|\| intra_bc_flag) | |
| 6 |   cu_skip_flag[ x0 ][ y0 ] | ae(v) |
| 7 | nCbS = ( 1 << log2CbSize ) | |
| 8 | if( cu_skip_flag[ x0 ][ y0 ]) | |
| 9 |   prediction_unit( x0, y0, nCbS, nCbS ) | |
| 10 | else { | |
| 11 |   if( slice_type != I && !intra_bc_flag[ x0 ][ y0 ] ) | |
| 12 |     pred_mode_flag | ae(v) |
| 13 |   if( CuPredMode[ x0 ][ y0 ] != MODE_INTRA \|\| intra_bc_flag[ x0 ][ y0 ] \|\|<br>    log2CbSize == MinCbLog2SizeY ) | |
| 14 |     part_mode | ae(v) |
| 15 |   if( CuPredMode[ x0 ][ y0 ] == MODE_INTRA ) { | |
| 16 |     if( PartMode == PART_2Nx2N && pcm_enabled_flag &&<br>      !intra_bc_flag[ x0 ][ y0 ] &&<br>      log2CbSize >= Log2MinIpcmCbSizeY &&<br>      log2CbSize <= Log2MaxIpcmCbSizeY ) | |
| 17 | <<<OMITTED>>> | |
| 18 |   } else if( intra_bc_flag[ x0 ][ y0 ] ) { | |
| 19 |     if( PartMode == PART_2Nx2N ) | |
| 20 |       prediction_unit( x0, y0, nCbS, nCbS ) | |
| 21 |     else if( PartMode == PART_2NxN ) { | |
| 22 |       prediction_unit( x0, y0, nCbS, nCbS / 2 ) | |
| 23 |       prediction_unit( x0, y0 + ( nCbS / 2 ), nCbS, nCbS / 2 ) | |
| 24 |     } else if( PartMode == PART_Nx2N ) { | |
| 25 |       prediction_unit( x0, y0, nCbS / 2, nCbS ) | |
| 26 |       prediction_unit( x0 + ( nCbS / 2 ), y0, nCbS / 2, nCbS ) | |
| 27 |     } else if( PartMode == PART_NxN ) { | |
| 28 |       prediction_unit( x0, y0, nCbS / 2, nCbS / 2 ) | |
| 29 |       prediction_unit( x0 + ( nCbS / 2 ), y0, nCbS / 2, nCbS / 2 ) | |
| 30 |       prediction_unit( x0, y0 + ( nCbS / 2 ), nCbS / 2, nCbS / 2 ) | |
| 31 |       prediction_unit( x0 + ( nCbS / 2 ), y0 + ( nCbS / 2 ), nCbS / 2, nCbS / 2 ) | |
| 32 |     } | |
| 33 |   } else { | |
| 34 |     pbOffset = ( PartMode == PART_NxN ) ? ( nCbS / 2 ) : nCbS | |
| 35 |     for( j = 0; j < nCbS; j = j + pbOffset ) | |
| 36 |       for( i = 0; i < nCbS; i = i + pbOffset ) | |
| 37 |         prev_intra_luma_pred_flag[ x0 + i ][ y0 + j ] | ae(v) |
| 38 |     for( j = 0; j < nCbS; j = j + pbOffset ) | |
| 39 |       for( i = 0; i < nCbS; i = i + pbOffset ) | |
| 40 |         if( prev_intra_luma_pred_flag[ x0 + i ][ y0 + j ] ) | |
| 41 |           mpm_idx[ x0 + i ][ y0 + j ] | ae(v) |
| 42 |         else | |
| 43 |           rem_intra_luma_pred_mode[ x0 + i ][ y0 + j ] | ae(v) |
| 44 | <<<OMITTED>>> | |
| 45 |   } | |
| 46 | } else { | |
| 47 |   if( PartMode == PART_2Nx2N ) | |
| 48 |     prediction_unit( x0, y0, nCbS, nCbS ) | |
| 49 |   else if( PartMode == PART_2NxN ){ | |
| 50 | <<<OMITTED>>> | |
| 51 |   } | |
| 52 | } | |
| 53 | } | |
| 54 | <<<OMITTED>>> | |
| 55 | } | |
| 56 | } | |

FIG. 24A

| SLICE TYPE | INTRA SLICE (I_slice) | | NON-INTRA SLICE (P_slice/B_slice) | | |
|---|---|---|---|---|---|
| BLOCK ENCODING MODE | INTRA ENCODING MODE (MODE_INTRA) | | INTRA ENCODING MODE (MODE_INTRA) | | INTER ENCODING MODE (MODE_INTER) |
| INTRA BLOCK COPY FLAG | 0 | 1 | 0 | 1 | 0 |
| PREDICTION ENCODING MODE | INTRA PREDICTION ENCODING MODE | INTRA BLOCK COPY ENCODING MODE | INTRA PREDICTION ENCODING MODE | INTRA BLOCK COPY ENCODING MODE | INTER PREDICTION ENCODING MODE |

FIG. 24B

| SLICE TYPE | INTRA SLICE (I_slice) | | NON-INTRA SLICE (P_slice/B_slice) | | |
|---|---|---|---|---|---|
| BLOCK ENCODING MODE | INTRA ENCODING MODE | | INTRA ENCODING MODE | | INTER ENCODING MODE |
| BLOCK ENCODING INDEX | INTRA PREDICTION ENCODING MODE MODE_INTRA (0) | INTRA BLOCK COPY ENCODING MODE MODE_INTRA_BC (1) | INTRA PREDICTION ENCODING MODE MODE_INTRA (0) | INTRA BLOCK COPY ENCODING MODE MODE_INTRA_BC (1) | INTER PREDICTION ENCODING MODE MODE_INTER (2) |

FIG. 25

| No. | | Descriptor |
|---|---|---|
| 1 | coding_unit( x0, y0, log2CbSize ) { | |
| 2 | <<<OMITTED>>> | |
| 3 | if( slice_type != I ) | |
| 4 | cu_skip_flag[ x0 ][ y0 ] | ae(v) |
| 5 | nCbS = ( 1 << log2CbSize ) | |
| 6 | if( cu_skip_flag[ x0 ][ y0 ] ) | |
| 7 | prediction_unit( x0, y0, nCbS, nCbS ) | |
| 8 | else { | |
| 9 | pred_mode_idx | ae(v) |
| 10 | if( CuPredMode[ x0 ][ y0 ] == MODE_INTER \|\| CuPredMode[ x0 ][ y0 ] == MODE_INTRA_BC \|\| log2CbSize == MinCbLog2SizeY ) | |
| 11 | part_mode | ae(v) |
| 12 | if( CuPredMode[ x0 ][ y0 ] == MODE_INTRA \|\| CuPredMode[ x0 ][ y0 ] == MODE_INTRA_BC ) { | |
| 13 | if( PartMode == PART_2Nx2N && pcm_enabled_flag && CuPredMode[ x0 ][ y0 ] == !MODE_INTRA_BC && log2CbSize >= Log2MinIpcmCbSizeY && log2CbSize <= Log2MaxIpcmCbSizeY ) | |
| 14 | <<<OMITTED>>> | |
| 15 | } else if(CuPredMode[ x0 ][ y0 ] == MODE_INTRA_BC ) { | |
| 16 | if( PartMode == PART_2Nx2N ) | |
| 17 | prediction_unit( x0, y0, nCbS, nCbS ) | |
| 18 | else if( PartMode == PART_2NxN ) { | |
| 19 | prediction_unit( x0, y0, nCbS, nCbS / 2 ) | |
| 20 | prediction_unit( x0, y0 + ( nCbS / 2 ), nCbS, nCbS / 2 ) | |
| 21 | } else if( PartMode == PART_Nx2N ) { | |
| 22 | prediction_unit( x0, y0, nCbS / 2, nCbS ) | |
| 23 | prediction_unit( x0 + ( nCbS / 2 ), y0, nCbS / 2, nCbS ) | |
| 24 | } else if( PartMode == PART_NxN ) { | |
| 25 | prediction_unit( x0, y0, nCbS / 2, nCbS / 2 ) | |
| 26 | prediction_unit( x0 + ( nCbS / 2 ), y0, nCbS / 2, nCbS / 2 ) | |
| 27 | prediction_unit( x0, y0 + ( nCbS / 2 ), nCbS / 2, nCbS / 2 ) | |
| 28 | prediction_unit( x0 + ( nCbS / 2 ), y0 + ( nCbS / 2 ), nCbS / 2, nCbS / 2 ) | |
| 29 | } | |
| 30 | } else { | |
| 31 | pbOffset = ( PartMode == PART_NxN ) ? ( nCbS / 2 ) : nCbS | |
| 32 | for( j = 0; j < nCbS; j = j + pbOffset ) | |
| 33 | for( i = 0; i < nCbS; i = i + pbOffset ) | |
| 34 | prev_intra_luma_pred_flag[ x0 + i ][ y0 + j ] | ae(v) |
| 35 | for( j = 0; j < nCbS; j = j + pbOffset ) | |
| 36 | for( i = 0; i < nCbS; i = i + pbOffset ) | |
| 37 | if( prev_intra_luma_pred_flag[ x0 + i ][ y0 + j ] ) | |
| 38 | mpm_idx[ x0 + i ][ y0 + j ] | ae(v) |
| 39 | else | |
| 40 | rem_intra_luma_pred_mode[ x0 + i ][ y0 + j ] | ae(v) |
| 41 | <<<OMITTED>>> | |
| 42 | } | |
| 43 | } else { | |
| 44 | if( PartMode == PART_2Nx2N ) | |
| 45 | prediction_unit( x0, y0, nCbS, nCbS ) | |
| 46 | else if( PartMode == PART_2NxN ) { | |
| 47 | <<<OMITTED>>> | |
| 48 | } | |
| 49 | } | |
| 50 | <<<OMITTED>>> | |
| 51 | } | |
| 52 | } | |

FIG. 26

| No. | | Descriptor |
|---|---|---|
| 1 | prediction_unit( x0, y0, nPbW, nPbH ) { | |
| 2 | if( cu_skip_flag[ x0 ][ y0 ] ) { | |
| 3 | if( MaxNumMergeCand > 1 ) | |
| 4 | merge_idx[ x0 ][ y0 ] | ae(v) |
| 5 | } else { | |
| 6 | merge_flag[ x0 ][ y0 ] | ae(v) |
| 7 | if( merge_flag[ x0 ][ y0 ] ) { | |
| 8 | if( MaxNumMergeCand > 1 ) | |
| 9 | merge_idx[ x0 ][ y0 ] | ae(v) |
| 10 | } else { // ! merge_flag[ x0 ][ y0 ] | |
| 11 | if( slice_type = = B ) | |
| 12 | inter_pred_idc[ x0 ][ y0 ] | ae(v) |
| 13 | if(CuPredMode[ x0 ][ y0 ] == MODE_INTRA_BC ) { | |
| 14 | mvd_coding( x0, y0, 0 ) | |
| 15 | mvp_ibc_flag[ x0 ][ y0 ] | ae(v) |
| 16 | } else { | |
| 17 | if( inter_pred_idc[ x0 ][ y0 ] != PRED_L1 ) { | |
| 18 | if( num_ref_idx_l0_active_minus1 > 0 ) | |
| 19 | ref_idx_l0[ x0 ][ y0 ] | ae(v) |
| 20 | mvd_coding( x0, y0, 0 ) | |
| 21 | mvp_l0_flag[ x0 ][ y0 ] | ae(v) |
| 22 | } // inter_pred_idc[ x0 ][ y0 ] != PRED_L1 | |
| 23 | if( inter_pred_idc[ x0 ][ y0 ] != PRED_L0 ) { | |
| 24 | if( num_ref_idx_l1_active_minus1 > 0 ) | |
| 25 | ref_idx_l1[ x0 ][ y0 ] | ae(v) |
| 26 | if( mvd_l1_zero_flag && inter_pred_idc[ x0 ][ y0 ] = = PRED_BI ) | |
| 27 | MvdL1[ x0 ][ y0 ][ 0 ] = 0 | |
| 28 | MvdL1[ x0 ][ y0 ][ 1 ] = 0 | |
| 29 | } else | |
| 30 | mvd_coding( x0, y0, 1 ) | |
| 31 | mvp_l1_flag[ x0 ][ y0 ] | ae(v) |
| 32 | } // inter_pred_idc[ x0 ][ y0 ] != PRED_L0 | |
| 33 | } // !intra_bc_flag[x0][y0] | |
| 34 | } //!merge_flag[ x0 ][ y0 ] | |
| 35 | } | |

IMAGE ENCODING APPARATUS, IMAGE ENCODING METHOD AND PROGRAM, IMAGE DECODING APPARATUS, AND IMAGE DECODING METHOD AND PROGRAM

CROSS-REFERENCE TO RELATED APPLICATIONS

This application is a continuation of U.S. patent application Ser. No. 16/840,184, filed on Apr. 3, 2020, which is a continuation of U.S. patent application Ser. No. 15/317,926, filed on Dec. 9, 2016, now issued as U.S. Pat. No. 10,652,568, issued on May 12, 2020, which is a national phase application of international patent application PCT/JP2015/002906 filed on Jun. 10, 2015, and claims the benefit of, and priority to, Japanese Patent Application No. 2014-121903 filed Jun. 12, 2014, all of which are hereby incorporated by reference herein in their entireties.

TECHNICAL FIELD

The present invention relates to encoding technology and decoding technology for videos. More particularly, the present invention relates to a technology for dividing an image into multiple blocks, and performing encoding and decoding of slices made up of a plurality of the blocks obtained by dividing, in units of the blocks obtained by dividing.

BACKGROUND ART

Activity has begun in recent years for international standardization of a high-efficiency encoding method to serve as a successor to H.264/MPEG-4 AVC (hereinafter, "H.264"). To this end, JCT-VC (Joint Collaborative Team on Video Coding) has been established between ISO/IEC and ITU-T. JCT-VC is proceeding with standardization of High Efficiency Video Coding (hereinafter, "HEVC"). ITU-T was ratified as the H.265 encoding format in April 2013. Addition of functions such as scalable coding, range extensions, screen content coding, and so forth continue to be studied for standardization of HEVC.

Various encoding tools have been developed for the standardization of HEVC, realizing high encoding efficiency. HEVC also employs the intra coding mode and inter encoding mode as block coding modes, such as the encoding formats that have been employed up to H.264. The inter coding mode references image data encoded/decoded before in time, and performs encoding by performing calculation regarding similar blocks. The intra encoding mode predicts blocks from already-decoded pixels nearby a block to be encoded/decoded, without referencing image data encoded/decoded before in time.

HEVC also has newly employed the merge mode for motion vector prediction in the inter coding mode. Merge mode is a technology where a block spatially/temporally nearby, regarding which motion information can be used as it is, is selected, and an index indicating the position thereof is encoded. This has been done to improve coding efficiency. Further, the image data of the block can be used as it is. That is to say, in a case where prediction error in the image data is 0, skip coding can be used. In this case, encoding can be performed simply by sending a flag indicating whether or not skip coding was performed, and merge mode code, so further improvement in coding efficiency was enabled.

A format is being proposed for the intra coding mode as well, where similar blocks in already encoded/decoded data is used for prediction in image data to be encoded/decoded, as a new function. This function is called Intra Block Copying coding. A particular aim thereof is to improve coding efficiency in an image taken by a camera which is not a natural image, such as an artificial image like a computer screen for example, by performing prediction from an already-encoded image in image data to be encoded/decoded. This takes advantage of the fact that there is repetitive image data, such as characters and textures in the image data to be encoded/decoded, in such an artificial image. To perform prediction within a picture, a regenerated image of already-encoded image data is searched for, a similar block is taken to be a prediction block, that position is represented by a vector, a prediction error block is calculated from the image data of the prediction block and the image data of the block to be encoded, and encoded. This vector is called a copy vector, to distinguish from a motion vector in the inter coding mode, in particular.

In copy vector coding, the encoding is performed by mvd_coding( ), as described in NPL 1. The syntax of mvd_coding( ) encodes the difference as to a copy vector predicted from a neighboring copy vector, as described in NPL 2. Accordingly, no improvement could be expected in coding efficiency by selecting a block temporally/spatially nearby a block to be encoded of which block the motion information can be used as it is, and encoding an index indicating the position thereof, as in the merge mode.

CITATION LIST

Non Patent Literature

[NPL 1]
Chapter 7.3.8.5, Coding Unit Syntax, Recommendation ITU-T H.265
[NPL 2]
Chapter 7.3.8.9, Motion Vector Difference Syntax, Recommendation ITU-T H.265

SUMMARY OF INVENTION

The present invention has been made in light of the above-described problem, and realizes skip coding using the merge mode in intra block copying coding as well.

Solution to Problem

An image encoding apparatus divides images making up a video into blocks made up of a plurality of pixels, and encodes the blocks. The image encoding apparatus includes: a first encoding unit configured to encode data indicating an coding mode to encode a block to be encoded in an image to be encoded; a second encoding unit configured to encode an index indicating a vector representing a spatial relationship between the block to be encoded and at least one block spatially at the periphery of the block to be encoded, in a case where the coding mode to encode the block to be encoded is a first coding mode; and a third encoding unit configured to encode an index indicating a vector representing a spatial relationship between the block to be encoded and at least one block spatially at the periphery of the block to be encoded, and a vector correlated with a block within an image that is different from the image to be encoded, in a case where the coding mode to encode the block to be encoded is a second coding mode.

Further features of the present invention will become apparent from the following description of exemplary embodiments with reference to the attached drawings.

BRIEF DESCRIPTION OF DRAWINGS

FIG. 2 is a diagram illustrating a partial syntax example of a bit stream according to first and second embodiments.

FIG. 3 is a diagram illustrating a partial syntax example of a bit stream according to first and second embodiments.

FIG. 4 is a diagram illustrating a partial syntax example of a bit stream according to first and second embodiments.

FIG. 5 is a flowchart illustrating image encoding processing of an entire video according to the first, third, fifth, and seventh embodiments.

FIG. 10 is a diagram illustrating a partial syntax example of a bit stream according to the first embodiment.

FIG. 13B is a continuation of the flowchart in FIG. 13A.

FIG. 14 is a diagram illustrating a partial syntax example of a bit stream according to the third and fourth embodiments.

FIG. 17 is a diagram illustrating a partial syntax example of a bit stream according to the third embodiment.

FIG. 18B is a continuation of the flowchart in FIG. 18A.

FIG. 19 is a diagram illustrating a partial syntax example of a bit stream according to the fifth and sixth embodiments.

FIG. 24A is a diagram illustrating selection of block coding mode.

FIG. 24B is a diagram illustrating selection of block coding mode.

FIG. 25 is a diagram illustrating a partial syntax example of a bit stream according to the seventh and eighth embodiments.

FIG. 26 is a diagram illustrating a partial syntax example of a bit stream according to the seventh and eighth embodiments.

DESCRIPTION OF EMBODIMENTS

First Embodiment

Figure 1:
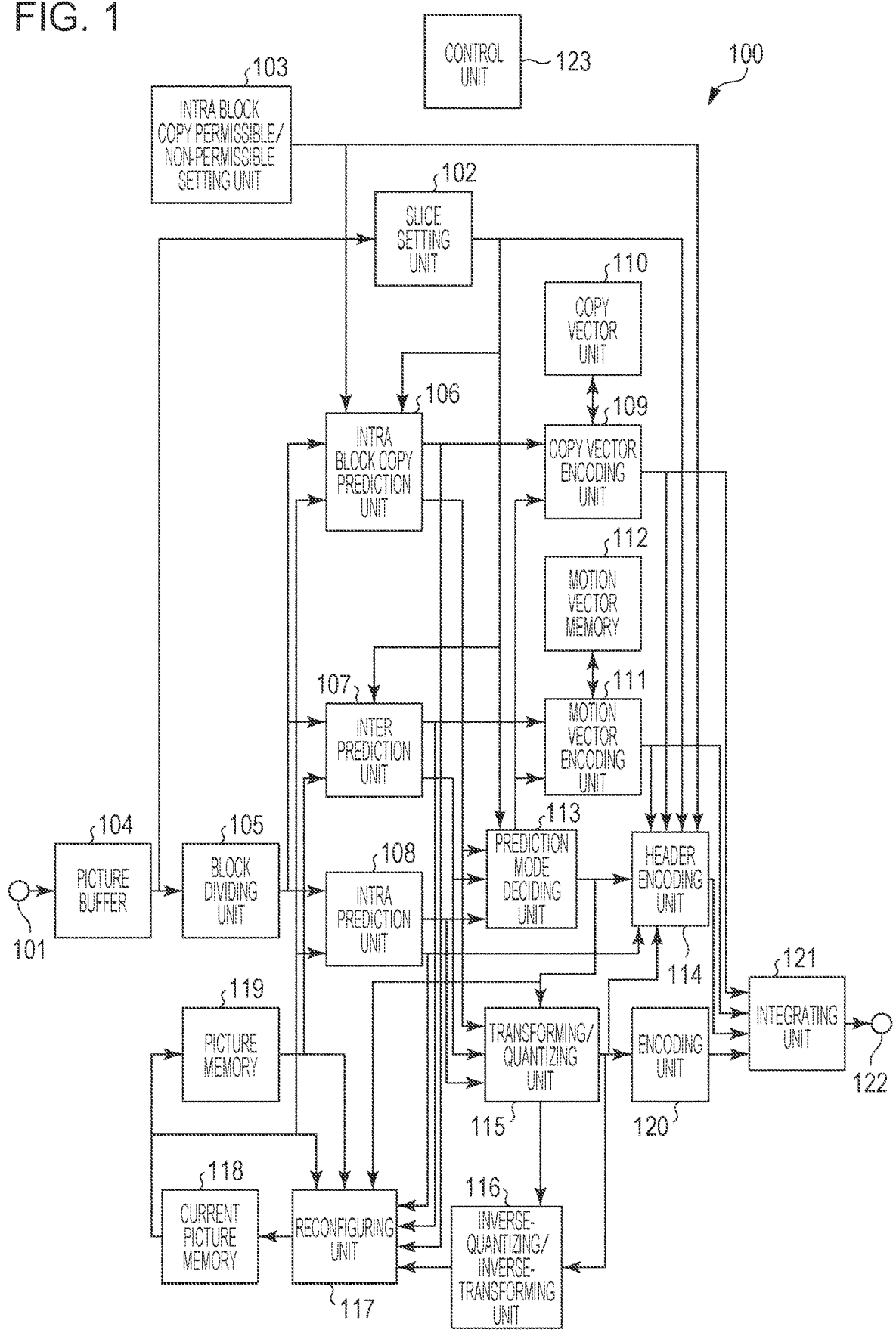
FIG. 1 is a block diagram illustrating the configuration of an image encoding apparatus according to first, third, fifth, and seventh embodiments.

A first embodiment will be described with reference to FIGS. 1 through 10. FIG. 1 is a block diagram illustrating the configuration of an image encoding apparatus. The configuration of image encoding apparatus in the second and subsequent embodiments described later is also the same as that in FIG. 1. In FIG. 1, reference numeral 101 denotes an input unit for input of image data, hereafter referred to simply as "input unit 101". Reference numeral 102 denotes a slice setting unit which decides the size, position, and so forth of slices within an input image in accordance with the properties of the input image and timing determined beforehand, and sets the slice type of each slice.

Reference numeral 103 denotes an intra block copy permissible/non-permissible setting unit, which sets intra block copy permissible/non-permissible information regarding whether or not intra block copying is permissible. Decision of whether or not to perform intra block copying is not restricted in particular. The intra block copy permissible/non-permissible setting unit 103 may be set based on the functions of the image encoding apparatus that generates bit streams or the image decoding apparatus that decodes bit streams, or may be set by the user.

Reference numeral 104 denotes a picture buffer that is used as a buffer to store an input video in units of pictures. Reference numeral 105 denotes a block dividing unit that inputs images from the picture buffer 104 in units of blocks, divides these into sub-blocks as necessary, and outputs each to processing downstream. Downstream, blocks and sub-block will be referred to as "blocks", implying that these are units of processing.

Figure 34:
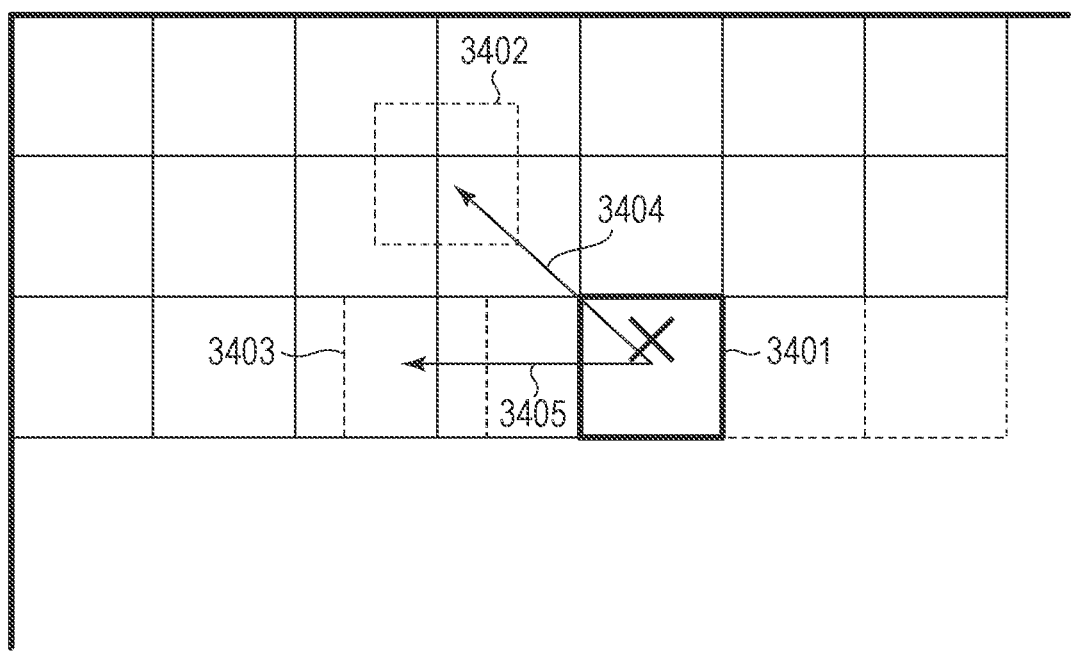
FIG. 34 is a diagram illustrating an example of a copy vector in the intra block copying coding mode.

Reference numeral 106 denotes an intra block copy prediction unit that references a regenerated image of an already-encoded block in a picture to be encoded and calculates copy vectors, and calculates intra block copy prediction block data to serve as a prediction image for a block to be encoded. This is illustrated in FIG. 34. Reference numeral 3401 represents a block made up of eight pixels by eight pixels, for example, which will be referred to as block X here. Image data that has already been encoded within a predetermined search range from the block X is referenced, and the position of the block that is most similar is decided. This similar block will be referred to as a prediction block here. Note that a range of encoded image data including above and to the left of the current block X is the search range in the example in FIG. 34. In a case where one of blocks 3402 and 3403 indicated by dotted lines is the most-similar prediction block, the one of the arrows 3404 and 3405 is the calculated copy vector. That is to say, the copy vector represents a spatial relationship between the block to be encoded (block to be decoded in a decoding apparatus) and the prediction block within the picture. The predetermined search range is not restricted in particular. For example, all image data that has already been encoded may be referenced, or just already-encoded image data in the same block line may be referenced. In the case of the former, one of the copy vectors 3104 and 3105 is calculated, and in the case of the latter, the copy vector 3405 is calculated. In HEVC, the search range may be restricted to the image data of the largest coding unit (LCU) encoded immediately before and the encoded image data in the LCU currently being encoded. The intra block copy prediction unit 106 generates and outputs intra block copy prediction error block data from the generated intra block copy prediction block data and image data of the block to be encoded.

Reference numeral 107 denotes an inter prediction unit that references regenerated images in pictures encoded before the picture to be encoded and calculates motion vectors, and calculates inter prediction block data serving as prediction data of the block to be encoded. The inter prediction unit 107 also generates and outputs inter prediction error block data from the generated inter prediction block data and the image data of the block to be encoded.

Figure 33A:
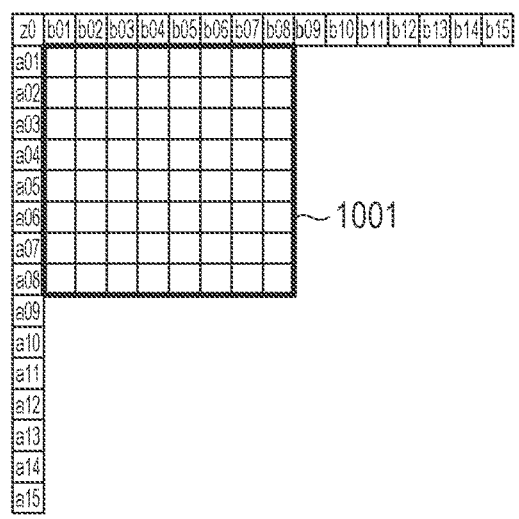
FIG. 33A is a diagram illustrating an example of pixel referencing in the intra prediction coding mode.
Figure 33B:
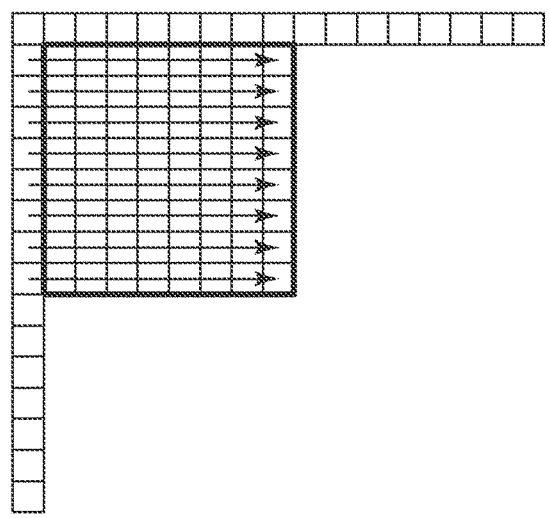
FIG. 33B is a diagram illustrating an example of pixel referencing in the intra prediction coding mode.
Figure 33C:
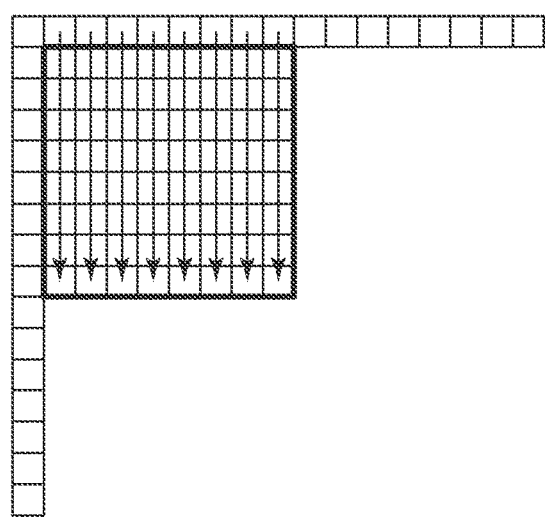
FIG. 33C is a diagram illustrating an example of pixel referencing in the intra prediction coding mode.
Figure 33D:
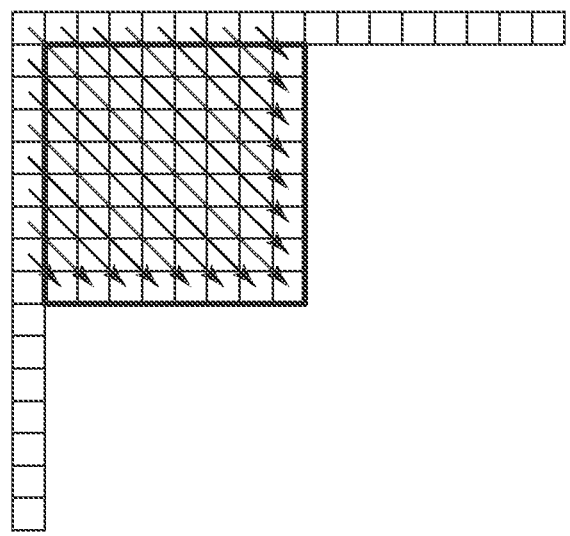
FIG. 33D is a diagram illustrating an example of pixel referencing in the intra prediction coding mode.
Figure 33E:
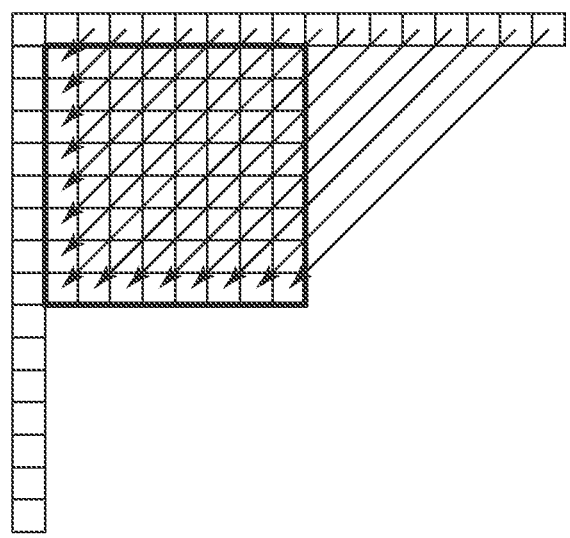
FIG. 33E is a diagram illustrating an example of pixel referencing in the intra prediction coding mode.

Reference numeral 108 denotes an intra prediction unit that references pixel values of already-encoded regenerated images in the periphery of the block to be encoded in the picture to be encoded, based on intra prediction mode, and decides an optimal intra prediction mode. FIG. 33A illustrates an example of the intra prediction mode. Reference numeral 3301 represents a block. Description will be made here with reference to a block that is eight pixels by eight pixels, but the block size is not restricted to this. In FIG. 33A, z0, a01, a02, and so on through a15, and b01, b02, and so on through b15, represent already-encoded pixels. FIG. 33B illustrates the way in which prediction is performed from neighboring encoded pixels in the horizontal direction. FIG. 33C illustrates the way in which prediction is performed from neighboring encoded pixels in the vertical direction. FIG. 33D illustrates the way in which prediction is performed from neighboring encoded pixels toward the lower right direction. FIG. 33E illustrates the way in which prediction is performed from neighboring encoded pixels toward the lower left direction. The intra prediction unit 108 further calculates intra prediction block data to serve as a prediction image for the block to be encoded, according to the optimal intra prediction mode. The intra prediction unit 108 then generates and outputs intra prediction error block data from the generated intra prediction block data and image data of the block to be encoded.

Reference numeral 113 denotes a prediction mode deciding unit that decides and outputs the optimal coding mode out of the prediction coding modes which can be used for that slice type. Selection is made from intra block copying coding mode where intra block copying encoding is performed, the inter prediction coding mode where motion compensation is performed, and the intra prediction coding mode where intra prediction is performed in the present embodiment. Although the method of determination is not restricted in particular, a method of selecting that where the amount of code or the like is the smallest when encoding, or the like, is conceivable.

Reference numeral 109 denotes a copy vector encoding unit that references a copy vector stored in copy vector memory 110 in a case where the intra block copying coding mode has been selected, and encodes the copy vector. The copy vector memory 110 is memory that stores the encoded vector for use when performing copy vector prediction.

Reference numeral 111 denotes a motion vector encoding unit that references a motion vector stored in motion vector memory 112 in a case where the inter coding mode has been selected in the prediction coding mode, and encodes the motion vector. The motion vector memory 112 is memory that stores an already-encoded motion vector to referencing when performing motion vector prediction in encoding.

Reference numeral 114 denotes a header encoding unit that generates and outputs code data of a sequence header, slice header, and block header. In particular, an intra_block__copy_enabled_flag, which is intra block copy permissible/non-permissible information, is encoded in increments of video sequences when encoding the sequence header. A slice_type, which represents the slice_type, is encoded in slice header encoding. A pred_mode_flag, which represents the block coding mode, is encoded in block header encoding. In a case where the block coding mode is the intra coding mode, intra_bc_flag code representing an intra block copy flag indicating that the intra block copying coding mode has been selected, and code representing the intra prediction mode, are also encoded.

Reference numeral 115 denotes a transforming/quantizing unit that takes input of prediction error block data output from the intra block copy prediction unit 106, inter prediction unit 107, and intra prediction unit 108, according to the prediction coding mode decided at the prediction mode deciding unit 113. The transforming/quantizing unit 115 performs orthogonal transform on input prediction error block data, calculates orthogonally-transformed coefficients, further quantizes the orthogonally-transformed coefficients by a predetermined method using quantization parameters, thus calculating and outputting quantized coefficients. The transforming/quantizing unit 115 also outputs quantization parameters used for quantization to an inverse-quantizing/inverse-transforming unit 116. The inverse-quantizing/inverse-transforming unit 116 performs inverse quantization on input quantized coefficients using quantization parameters to regenerate the orthogonally-transformed coefficients, and further performs inverse orthogonal transform thereupon to regenerate the prediction error block data.

Reference numeral 117 denotes a reconfiguring unit that takes input of the decoded prediction error, and copy vectors, motion vectors, and intra prediction modes, depending on the prediction coding mode decided by the prediction mode deciding unit 113, generates prediction block data based thereupon, and generates a decoded regenerated image. Reference numeral 118 denotes current picture memory that stores image data of regenerated images of the picture to be encoded that has been regenerated. Reference numeral 119 denotes picture memory that stores image data of regenerated images of pictures encoded before the picture to be encoded.

Reference numeral 120 denotes an encoding unit that encodes quantized coefficients, and generates and outputs prediction error code data. Reference numeral 121 denotes an integrating unit that configures and outputs a bit stream for the code data output from the header encoding unit 114, copy vector encoding unit 109, motion vector encoding unit 111, and encoding unit 120. Reference numeral 122 denotes an output unit that externally outputs bit streams.

The processing units in FIG. 1 may be configured as a single physical integrated circuit, or each may be individual circuits. Reference numeral 123 denotes a control unit that controls each of the above-described processing units of the image encoding apparatus, and is configured including a central processing unit (CPU) or the like.

Image encoding operations in the image encoding apparatus will be described below. The encoding operations will be described with reference to the flowcharts illustrated in FIGS. 5 through 9.

FIG. 5 is a flowchart illustrating the overall encoding operations. In step S501, the intra block copy permissible/non-permissible setting unit 103 sets intra block copy permissible/non-permissible information representing whether or not performing intra block copying coding is permissible in the overall sequence, before the encoding. In a case where intra block copying coding is to be performed for a sequence to be encoded, the value 1 is set to the intra block copy permissible/non-permissible information, and 0 if not. The method of setting is not restricted in particular, and may be set by a user, omitted from illustration, or may be set by the configuration of the encoding apparatus.

Next, in step S502, the header encoding unit 114 encodes the intra block copy permissible/non-permissible information decided in step S501 as intra_block_copy_enabled_flag code, and inserts this into the code data of the sequence header. The generated code data of the sequence is input to the integrating unit 121, formed into a bit stream, and externally output from the output unit 122. Encoding processing of each picture is performed in step S503 and thereafter.

In step S503, the input unit 101 inputs image data of a picture to be encoded, and stores in the picture buffer 104. In step S504, the slice setting unit 102 decides the configuration of the slice division of the input image data, and sets the slice type for each slice. The method of setting the configuration of slice division is not restricted in particular. The picture may be divided into equal parts, or may be divided according to image properties. The method of setting the slice type also is not restricted in particular. For example, the slice type may be decided in increments of pictures, or may be decided according to properties of image data within the slice.

Encoding processing of the slices is performed in step S505 and thereafter. In step S505, the header encoding unit 114 executes encoding of the slice header. The header encoding unit 114 encodes the slice_type code representing the slice type in the slice header encoding. The slice_type code includes I_slice, which represents a slice which can be encoded only by intra prediction encoding (hereinafter referred to as "intra slice"). The slice_type code further includes P_slice and B_slice, which represent slices which can be encoded by the inter coding mode (hereinafter collectively referred to as "non-intra slice").

In step S506, the block dividing unit 105 divides the slice into blocks. For example, in HEVC a slice is first divided into LCUs, and parts thereof are further divided into coding units (CU) as necessary. Both of these will be referred to as blocks in the present embodiment, to facilitate description. Encoding is performed in increments of blocks in steps S507 and S508.

Figure 6A:
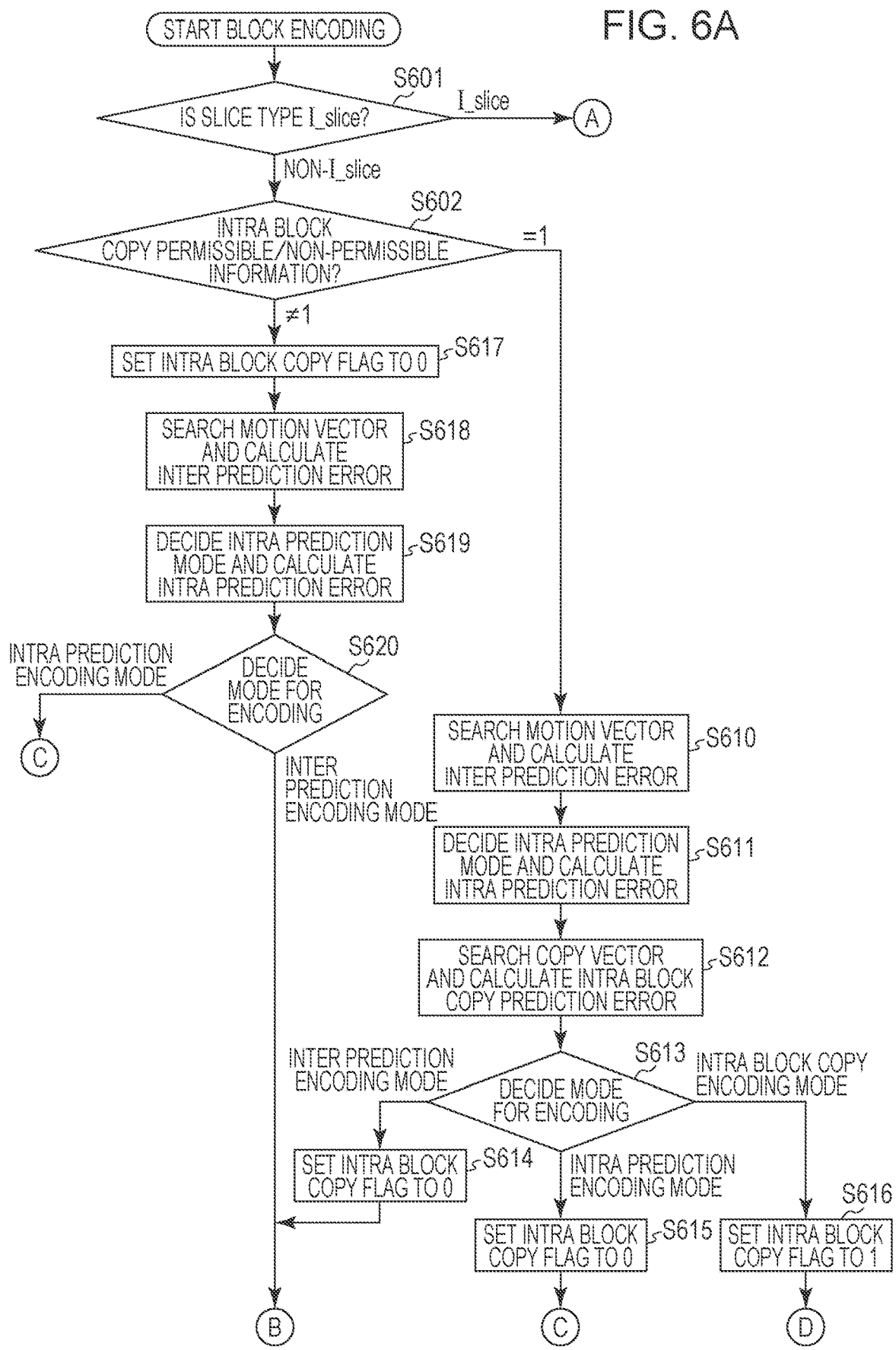
FIG. 6A is a flowchart illustrating image encoding processing of a block according to the first, fifth, and seventh embodiments.
Figure 6B:
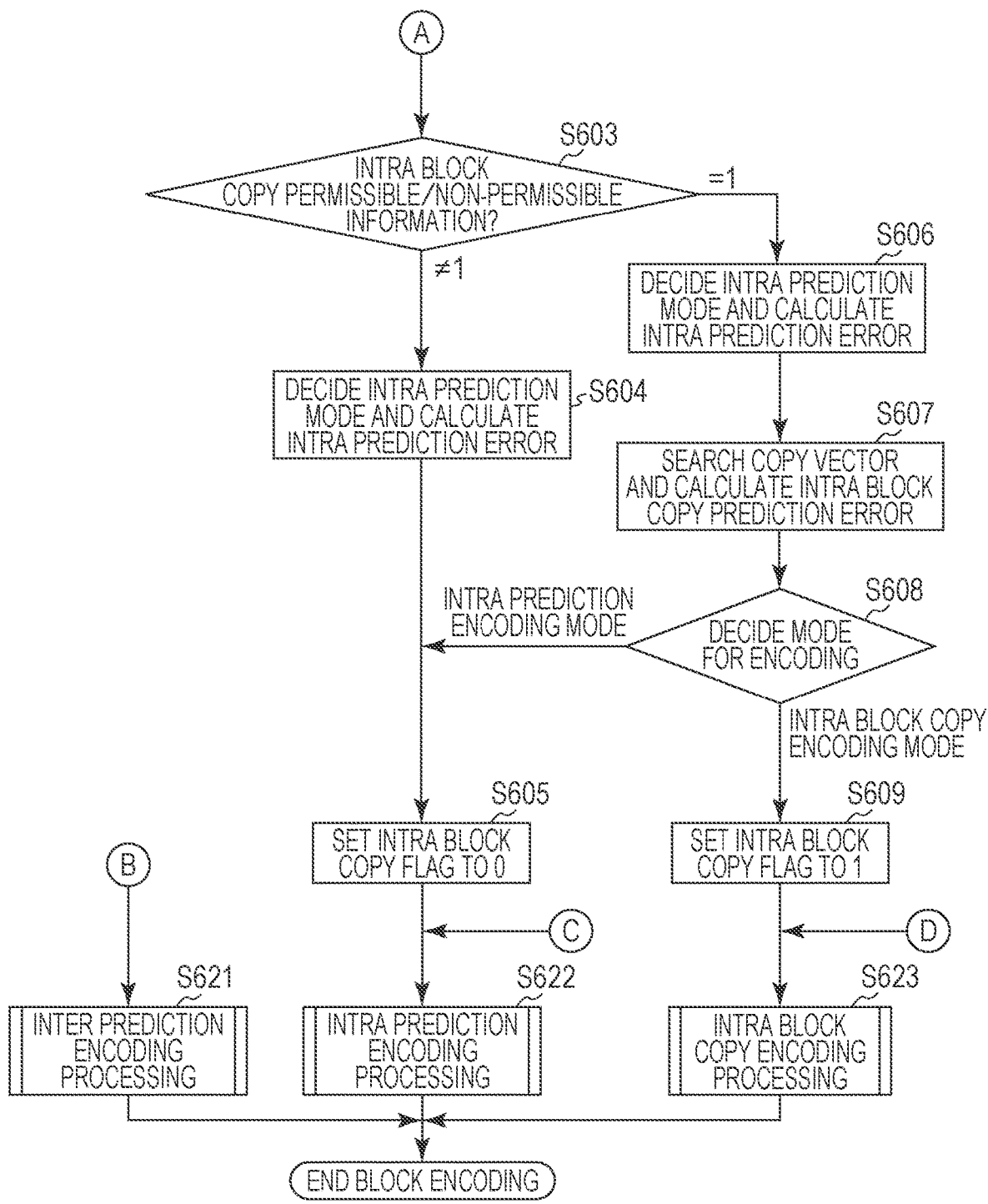
FIG. 6B is a continuation of the flowchart in FIG. 6A.

Each of the blocks are encoded in step S507. FIGS. 6A and 6B illustrate a flowchart illustrating encoding operations of encoding of a block.

In step S601, the slice setting unit 102 performs determination based on the slice type which it has set itself. In a case where an I_slice has been set, the flow advances to step S603, and otherwise, to step S602.

First, in a case where determination is made in step S601 that the slice setting unit 102 has set an I_slice as the slice type, the flow advances to step S603. In step S603, the intra block copy prediction unit 106 and intra prediction unit 108 determine the intra block copy permissible/non-permissible information set in step S501. In a case where the intra block copy permissible/non-permissible information is 1, the flow advances to step S606, and otherwise, to step S604.

In a case where the intra block copy permissible/non-permissible information is 1 in step S603, the flow advances to step S606. In step S606, the intra prediction unit 108 references image data of regenerated images in the periphery of the block to be encoded in the picture to be encoded, that is stored in the current picture memory 118, and decides the intra prediction mode. The intra prediction unit 108 also generates intra prediction block data, that is a prediction image of the block to be encoded, based on the intra prediction mode that has been decided. The intra prediction unit 108 further generates intra prediction error block data from the generated intra prediction block data and the image data of the block to be encoded. The calculated intra prediction mode is output to the header encoding unit 114 and the reconfiguring unit 117, and the intra prediction error block data is output to the prediction mode deciding unit 113 and the transforming/quantizing unit 115.

In step S607 the intra block copy prediction unit 106 references the regenerated image of the already-encoded blocks in the picture to be encoded, that is stored in the current picture memory 118, to calculate a copy vector. The intra block copy prediction unit 106 further generates intra block copy prediction block data which is a prediction image of the block to be encoded, based on the calculated copy vector. Thereafter, the intra block copy prediction unit 106 generates intra block copy prediction error block data from generated intra block copy prediction block data and the image data of the block to be encoded. The calculated copy vector is output to the copy vector encoding unit 109 and the reconfiguring unit 117, and the intra block copy prediction error block data is output to the prediction mode deciding unit 113 and the transforming/quantizing unit 115.

In step S608, the prediction mode deciding unit 113 decides the prediction coding mode to be used for encoding. Note however, that the method of deciding is not restricted in particular. For example, the prediction mode deciding unit 113 may estimate the encoding cost from each prediction error block data, and decide the mode of which the encoding cost is smaller to be the prediction coding mode to be used for encoding, by comparing the amount of each. The prediction coding mode which can be selected here is the intra prediction coding mode and the intra block copying coding mode. In a case where the intra prediction coding mode has been decided, the flow advances to step S605, and if the intra block copying coding mode, to step S609.

In a case where the intra block copying coding mode has been selected in step S608, the flow advances to step S609. The header encoding unit 114 sets the intra block copy flag to 1 in step S609, and thereafter the flow advances to step S623.

Figure 9:
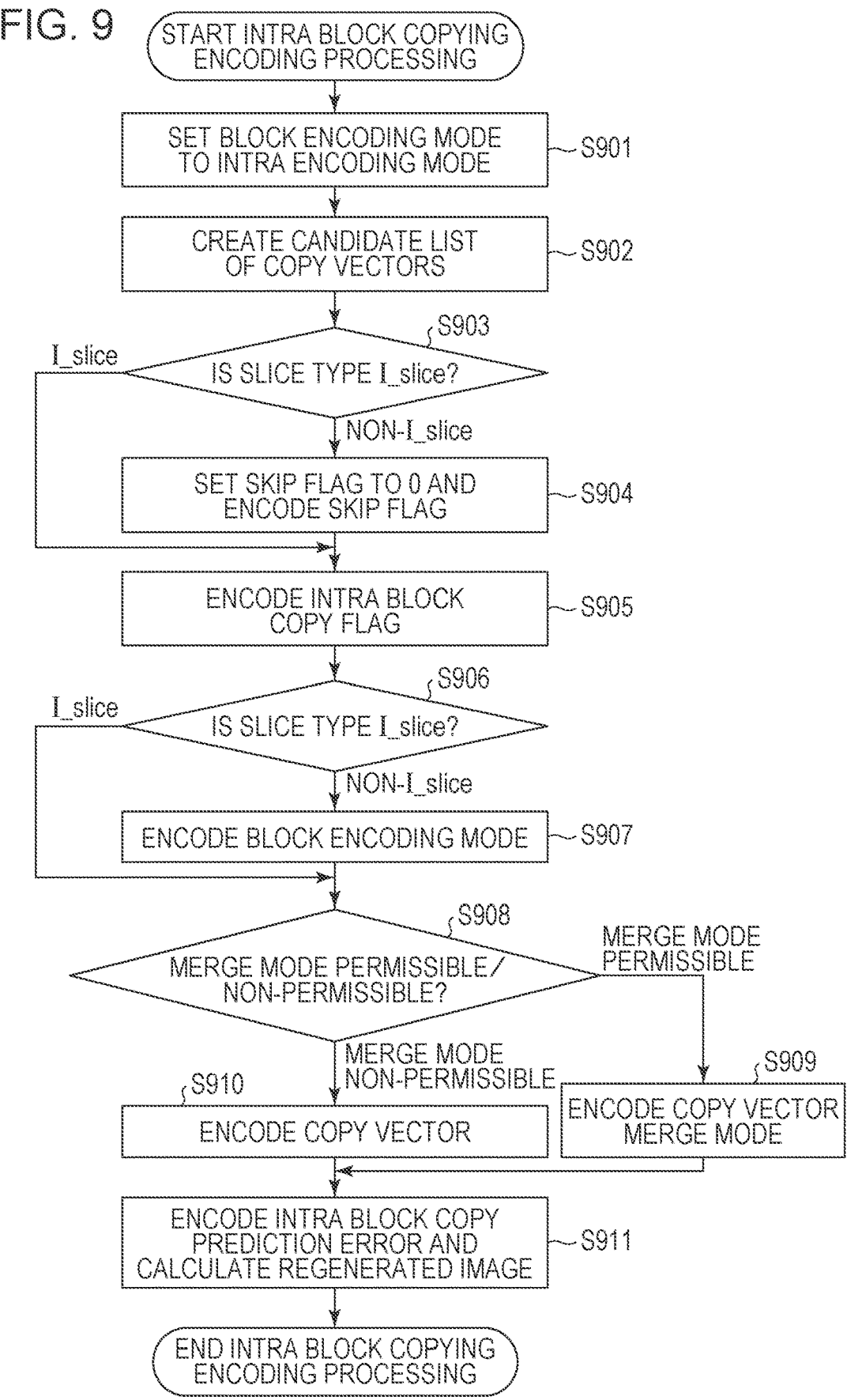
FIG. 9 is a flowchart illustrating intra block copying encoding processing of a block according to the first embodiment.
Figure 32:
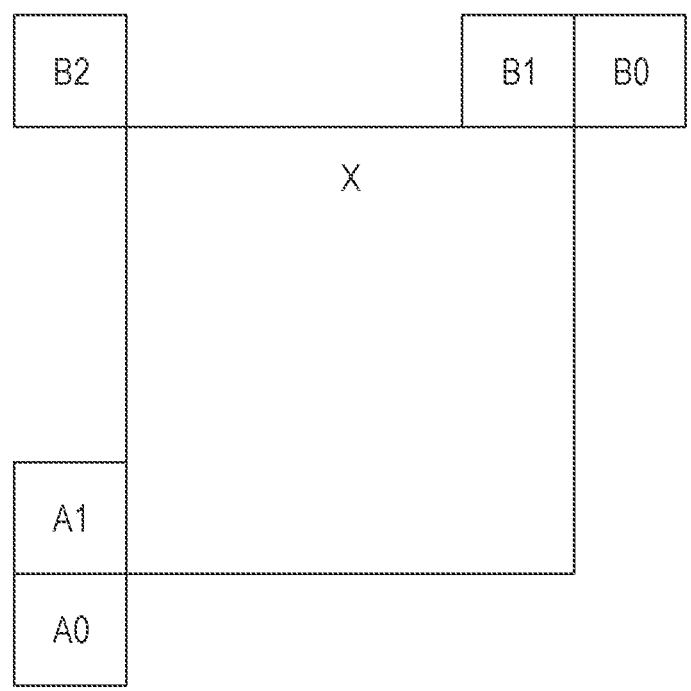
FIG. 32 is a diagram illustrating block referencing.

In step S623, the block is subjected to intra block copying encoding processing. FIG. 9 is a flowchart illustrating intra block copying encoding processing of a block. In step S901, the header encoding unit 114 sets the block coding mode to the intra coding mode (MODE_INTRA). In step S902, the copy vector encoding unit 109 compiles a candidate list of copy vectors for the merge mode, from the copy vectors stored in the copy vector memory 110. The copy vector candidate list is generated with reference to spatially-nearby copy vectors, in the same way as with the merge mode in the inter prediction coding mode. FIG. 32 illustrates referencing neighboring blocks in more detail. The copy vector encoding unit 109 references the blocks A0, A1, B0, B1, and B2, in FIG. 32, which are spatially near X, which is the block to be encoded, and have already been encoded. The copy vector encoding unit 109 determines whether or not each of the blocks exist, and whether or not each block has been encoded by the intra block copying coding mode. If these blocks are determined to have been encoded by the intra block copying coding mode, the copy vector encoding unit 109 registers the copy vectors correlated with the blocks encoded by the intra block copying mode in the copy vector candidate list. Thereafter, the copy vector encoding unit 109 groups copy vectors of the same vector value into one. In a case where the number of the registered copy vectors is smaller than a maximum copy vector registration number for the copy vector candidate list that has been decided beforehand, the copy vector encoding unit 109 adds copy vectors as appropriate. For example, copy vectors are added in the order of vector values (−w, 0), (0, −h), (−w, −h), w, −h), (−2w, 0), and so on, where h represents the height of the block and w represents the width. Note however, that additional copy vectors are not restricted to this.

In step S903, the header encoding unit 114 determines the slice type. In a case where I_slice has been set as the slice type, the flow advances to step S905, and otherwise, to step S904. In step S904, the header encoding unit 114 sets the value of a skip flag indicating whether or not to perform skip encoding to 0, and encodes cu_skip_flag code representing this. The value of the skip flag is 1 in a case where the block to be encoded is to be subjected to skip encoding, and 0 if not. The operation of step S904 is necessary, since the cu_skip_flag code is encoded in a case where the slice type is not I_slice in the syntax illustrated in FIG. 2.

In step S905, the header encoding unit 114 encodes the value 1 of the intra block copy flag set in step S609 or step S616 as the intra_bc_flag code. The code data of the intra_bc_flag code is input to the integrating unit 121, formed into a bit stream, and externally output from the output unit 122. In the same way as in step S903, the header encoding unit 114 determines the slice type in step S906 and advances to step S908 if I_slice has been set, and to step S907 if not. In step S907, the header encoding unit 114 encodes the intra coding mode (MODE_INTRA) set in step S901 as the pred_mode_flag code.

In step S908, the copy vector encoding unit 109 determines whether or not the copy vector calculated in step S607 or step S612 can be encoded in the merge mode. While the method of determining is not restricted in particular here, determination may be made by determining whether the vector values of a copy vector registered in the copy vector candidate list and the calculated copy vector match, for example. In a case of performing encoding in merge mode, the flow advances to step S909, and otherwise, to step S910. In step S909, the copy vector encoding unit 109 sets the merge mode flag representing whether or not the merge mode is permissible to 1, and this is encoded as merge_flag code. Further, the copy vector encoding unit 109 encodes a vector candidate index of a copy vector in the copy vector candidate list having a matching vector value with the copy vector to be encoded as merge_idx code.

In step S910, the header encoding unit 114 sets the merge mode flag to 0, and encodes this as merge_flag code. Next, the copy vector encoding unit 109 performs prediction of the calculated copy vector, from the copy vectors at the periphery, which are stored in the copy vector memory 110, and decides the direction of prediction of the copy vector. The copy vector encoding unit 109 obtains a difference vector which is the difference as to the predicted copy vector, and encodes a copy vector reference flag representing the vector value of the difference vector and the predicted direction thereof, as mvp_ibc_flag code. For example, in a case where a copy vector selected from blocks A0 and A1 in the A0, A1, B0, B1, and B2 in FIG. 32, is used, the value of the copy vector reference flag is set to 0. In a case where a copy vector selected from blocks B0, B1, and B2 is used, the value of the copy vector reference flag is set to 1. This value is encoded as mvp_ibc_flag code.

In step S911, the transforming/quantizing unit 115 subjects the intra block copy prediction error block data generated in step S605 or step S612 to orthogonal transform and quantization to calculate quantized coefficients. The calculated quantized coefficients are input to the encoding unit 120, inverse-quantizing/inverse-transforming unit 116, and header encoding unit 114. The quantized coefficients input to the inverse-quantizing/inverse-transforming unit 116 are subjected to inverse quantization and inverse transform, and regenerated as intra block copy prediction error block data. The reconfiguring unit 117 also calculates intra block copy prediction block data from the current picture memory 118, based on the copy vector. The reconfiguring unit 117 further uses this intra block copy prediction block data and the intra block copy prediction error block data to calculate image data of the regenerated image for the decoded image of the block to be encoded. The calculated image data of the regenerated image is stored in the current picture memory 118. The encoding unit 120 also encodes the quantized coefficient of the intra block copy prediction error block data and generates code data thereof. The generated code data is input to the integrating unit 121, formed into a bit stream, and externally output from the output unit 122. The encoding processing of the block to be encoded thus ends.

Returning to FIG. 6B, in a case where the intra prediction encoding mode has been selected in step S608, the flow advances to step S605. The header encoding unit 114 sets the intra block copy flag to 0 in step S605. Thereafter, the flow advances to step S622.

Figure 8:
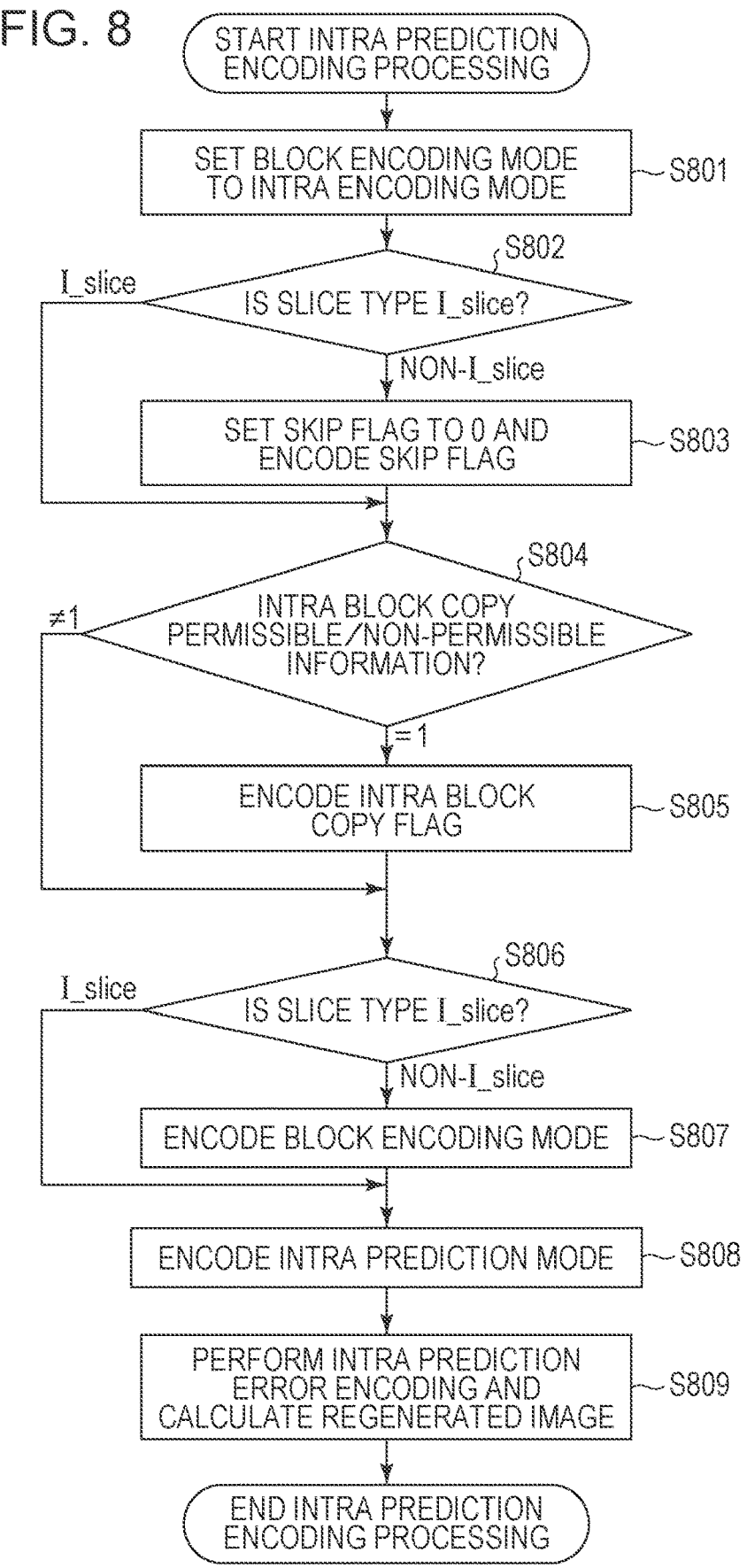
FIG. 8 is a flowchart illustrating intra prediction encoding processing of a block according to the first embodiment.

In step S622, intra prediction encoding processing of the block is performed. FIG. 8 is a flowchart illustrating the encoding operations for the intra prediction encoding of the block. In step S801, the header encoding unit 114 sets the intra coding mode (MODE_INTRA) for the block coding mode. In step S802, the header encoding unit 114 determines whether or not the slice type is I_slice. If I_slice, the flow advances to step S804, and if not, to step S803. In step S803, the header encoding unit 114 sets the value of the skip flag indicating whether or not to perform skip encoding to 0, and encodes a cu_skip_flag representing this. In step S804, the header encoding unit 114 determines the intra block copy permissible/non-permissible information set in step S501, and if the intra block copy permissible/non-permissible information is 1, advances to step S805, and if not, to step S806.

In step S805, the header encoding unit 114 encodes 0, which is the value of the intra block copy flag set in step S609, step S615, or step S617, as the intra_bc_flag. In step S806, the header encoding unit 114 determines whether or not the slice type is I_slice. If I_slice, the flow advances to step S808, and if not, to step S807. In step S807, the header encoding unit 114 encodes the intra coding mode (MODE_INTRA) set in step S801 as the pred_mode_flag code. In step S808, the header encoding unit 114 encodes the intra prediction mode calculated in step S604, step S606, step S611, or step S619.

In step S809, the transforming/quantizing unit 115 subjects the intra prediction error block data generated in step S604, step S606, step S611, or step S619 to orthogonal transform and quantization to calculate quantized coefficients. The calculated quantized coefficients are input to the encoding unit 120, inverse-quantizing/inverse-transforming unit 116, and header encoding unit 114. The quantized coefficients input to the inverse-quantizing/inverse-transforming unit 116 are subjected to inverse quantization and inverse transform, and regenerated as intra prediction error block data. The reconfiguring unit 117 also calculates intra prediction block data from the current picture memory 118, based on the intra prediction mode. The reconfiguring unit 117 further uses intra prediction error block data to calculate image data of the regenerated image for the decoded image of the block to be encoded. The calculated image data of the regenerated image is stored in the current picture memory 118. The encoding unit 120 also encodes the quantized coefficient of the intra prediction error block data and generates code data of the prediction error. The generated code data is input to the integrating unit 121, formed into a bit stream, and externally output from the output unit 122. The encoding processing of the block to be encoded thus ends.

Returning to FIG. 6B, in a case where the intra block copy permissible/non-permissible information is not 1 in step S603, the flow advances to step S604. In step S604, the intra prediction unit 108 decides the intra prediction mode, in the same way as in step S606, generates intra prediction block data, and generates intra prediction error block data using the image data of the block to be encoded. The calculated intra prediction mode is output to the header encoding unit 114 and the reconfiguring unit 117, and the intra prediction error block data is output to the prediction mode deciding unit 113 and the transforming/quantizing unit 115. Thereafter, encoding processing the same as a case where the intra prediction coding mode has been selected is performed in step S608.

Next, a case will be described where determination is made in step S601 that the slice setting unit 102 has set the slice type to a slice type other than I_slice. In step S602, the intra block copy prediction unit 106, intra prediction unit 108, and inter prediction unit 107 determine the intra block copy permissible/non-permissible information set in step S501. In a case where the intra block copy permissible/non-permissible information is 1, the flow advances to step S610, and otherwise, to step S617.

In a case where the intra block copy permissible/non-permissible information is 1 in step S602, the flow advances to step S610. In step S610, the inter prediction unit 107 references image data of regenerated images in decoded pictures encoded before the picture to be encoded, stored in the picture memory 119, and calculates a motion vector. The inter prediction unit 107 also generates inter prediction block data, which is a prediction image of the block to be encoded, based on the calculated motion vector. The inter prediction unit 107 further generates inter prediction error block data from the generated inter prediction block data and the image data of the block to be encoded. The calculated motion vector is output to the motion vector encoding unit 111 and the reconfiguring unit 117, and the inter prediction error block data is output to the prediction mode deciding unit 113 and the transforming/quantizing unit 115.

In step S611, the intra prediction unit 108 decides the intra prediction mode, generates intra prediction block data, and generates intra prediction error block data using the image data of the block to be encoded, in the same way as in step S606. In step S612, the intra block copy prediction unit 106 decides a copy vector, in the same way as in step S607. The intra block copy prediction unit 106 generates intra block copy prediction block data based on the decided copy vector, and generates intra block copy prediction error block data using the image data of the block to be encoded.

In step S613, the prediction mode deciding unit 113 decides which of the intra prediction coding mode, the intra block copying coding mode, and the inter prediction coding mode will be used. Note however, that the method of deciding is not restricted in particular. For example, the prediction mode deciding unit 113 may estimate the encoding cost from each prediction error, and based on the amount of each. In a case where the intra prediction coding mode is selected, the flow advances to step S614, if the intra prediction coding mode is selected, the flow advances to step S615, and if the intra prediction block copying coding mode is selected, the flow advances to step S616.

In step S613, in a case where the prediction coding mode is the inter prediction coding mode, the flow advances to step S614. In step S614, the header encoding unit 114 sets the intra block copy flag to 0, and the flow advances to step S621. Inter prediction encoding processing of the block is performed in step S621.

Figure 7:
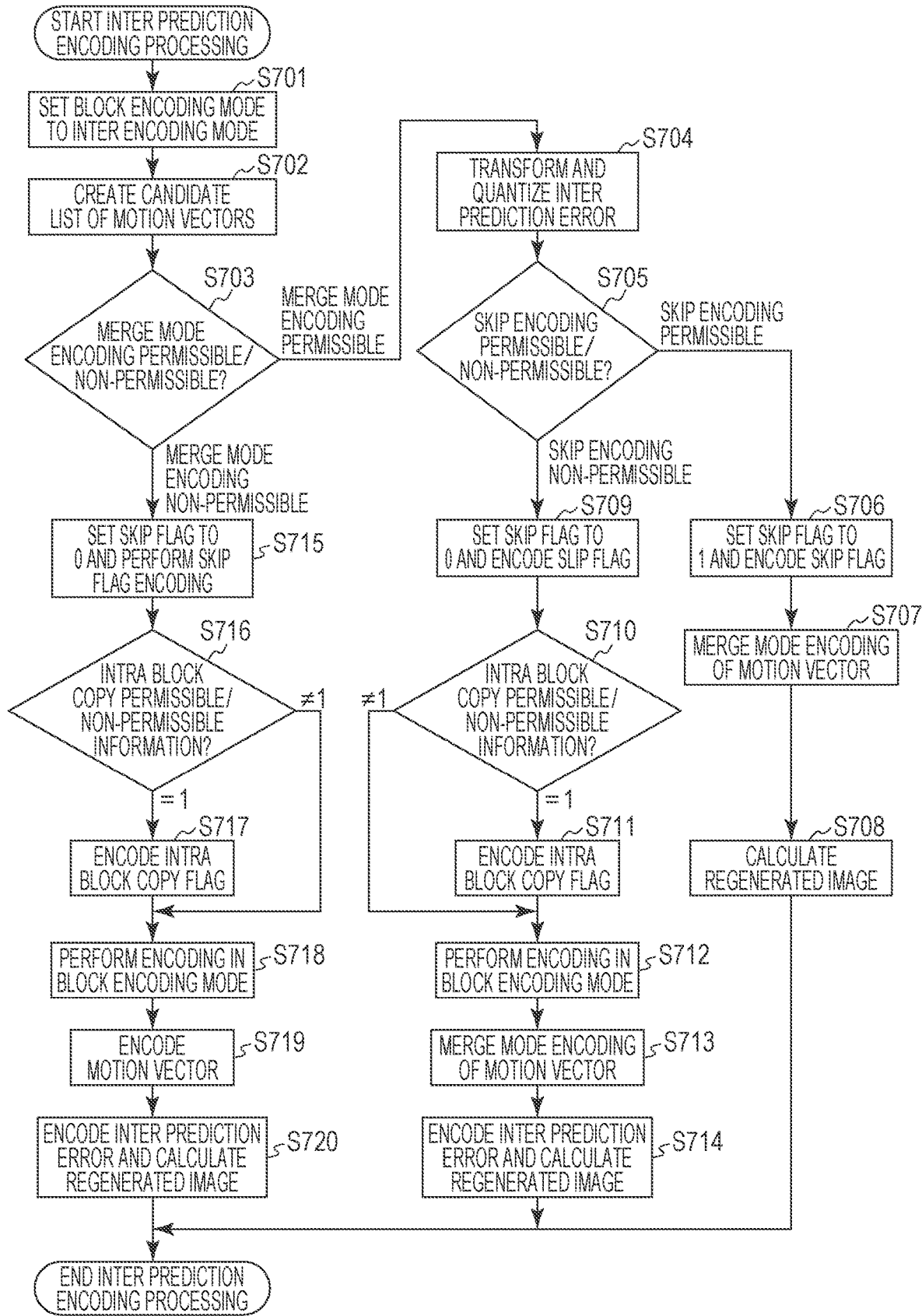
FIG. 7 is a flowchart illustrating inter prediction encoding processing of a block according to the first embodiment.

FIG. 7 is a flowchart representing encoding operations in inter prediction encoding coding of a block. In step S701, the header encoding unit 114 sets the block coding mode to inter coding mode (MODE_INTER).

In step S702, the motion vector coding unit 111 generates a candidate list of motion vectors for merge mode. The motion vector candidate list is generated by referencing motion vectors spatially and temporally nearby from the motion vectors stored in the motion vector memory 112. Specifically, the motion vector encoding unit 111 adds to the blocks A0, A1, B0, B1, and B2, in FIG. 32, which are spatially near X which is the block to be encoded, motion vectors of blocks at the same position and temporally nearby, and references these. Description will be made here regarding a case of motion compensation which is not bidirectional, to facilitate description. If each of the blocks exist, and each block has been encoded by the inter prediction coding mode, the motion vector encoding unit 111 registers the motion vectors in the motion vector candidate list. Thereafter, the motion vector encoding coding unit 111 groups motion vectors of the same value into one. If the slice type is B_slice, bidirectional merge candidates are generated where the motion vector candidates registered in the motion vector candidate list are combined. In a case where the number of the registered motion vectors is smaller than a maximum registration number for the motion vector candidate list that has been decided beforehand, the motion vector encoding unit 111 adds zero vectors where the vector value is (0, 0) as motion vectors, as appropriate.

In step S703, the motion vector encoding unit 111 determines whether or not the motion vector calculated in step S610 or step S618 can be encoded in the merge mode. Determination may be made by determining whether the vector values of a motion vector registered in the motion vector candidate list and the calculated motion vector match, for example. In a case of performing encoding in merge mode, the flow advances to step S704, and otherwise, to step S715.

In a case where the motion vector encoding unit 111 determines in step S703 that encoding will be performed in merge mode, the flow advances to step S704. The transforming/quantizing unit 115 subjects the intra prediction error block data generated in step S610 or step S618 to orthogonal transform and quantization to calculate quantized coefficients in step S704.

In step S705, the header encoding unit 114 performs determination regarding whether or not to perform skip encoding. The conditions for performing skip encoding here is that coding of the motion vector can be performed in merge mode, and that the values of the quantized coefficients of the inter prediction error block data calculated in step S704 are all 0. Whether or not encoding can be performed in the merge mode is determined in step S703, and the quantized coefficients calculated in step S704 are used for the quantized coefficients. In a case where skip encoding can be performed, the flow advances to step S706, and if not, to step S709.

In a case where determination is made in step S705 to perform skip encoding, the flow advances to step S706. The header encoding unit 114 sets the value of the skip flag to 1 in step S706, and encodes this as cu_skip_flag code. In step S707, the motion vector encoding unit 111 encodes the vector candidate index of the relevant motion vector candidate in the motion vector candidate list generated in step S702 as merge_idx code. The cu_skip_flag code and merge_idx code are input to the integrating unit 121, formed into a bit stream, and externally output from the output unit 122. Calculated motion vectors are stored in the motion vector memory 112. In step S708, the reconfiguring unit 117 calculates inter prediction block data from the picture memory 119 based on the motion vectors, and takes the inter prediction block data to be the image data of the regenerated image of the decoded image in the block to be encoded. The image data of the regenerated image is stored in the current picture memory 118. Thus, the encoding processing of the block to be encoded ends.

In a case where determination is made in step S705 that skip encoding will not be performed, the flow advances to step S709. The header encoding unit 114 sets the value of the skip flag to 0 in step S709, and encodes this as cu_skip_flag code. In step S710, the intra block copy prediction unit 106 determines the intra block copy permissible/non-permissible information set in step S501. If the intra block copy permissible/non-permissible information is 1, determination is made that intra block copying is permissible, and advances to step S711, if not, to step S712. In step S711, the header encoding unit 114 encodes 0 which is the value of the intra block copy flag set in step S614 or step S617 as intra_bc_flag code. The code data of the intra_bc_flag code is input to the integrating unit 121, formed into a bit stream, and externally output from the output unit 122. In step S712, the header unit 114 encodes the inter coding mode (MODE_INTER) set in step S701 as pred_mode_flag code. The code data of the pred_mode_flag code is input to the integrating unit 121, formed into a bit stream, and externally output from the output unit 122.

In step S713, the motion vector encoding unit 111 encodes the merge_idx code, and stores the encoded motion vectors in the motion vector memory 112, in the same way as in step S707. In step S714, the inter prediction unit 107 inputs the quantized coefficients calculated in step S704 to the encoding unit 120 and the inverse-quantizing/inverse-transforming unit 116. The inverse-quantizing/inverse-transforming unit 116 subjects the input quantized coefficients to inverse quantization and inverse transform, thereby regenerating inter prediction error block data. The reconfiguring unit 117 calculates inter prediction block data from the picture memory 119 based on the motion vectors. The reconfiguring unit 117 further calculates the image data of the regenerated image of the decoded image in the block to be encoded, using the inter prediction block data and the regenerated inter prediction error block data. The image data of the regenerated image is stored in the current picture memory 118. The encoding unit 120 encodes the quantized coefficients of the inter prediction error block data and generates code data of the prediction error. The generated encoded data is input to the integrating unit 121, formed into a bit stream and externally output from the output unit 122. Thus, the encoding processing of the block to be encoded ends.

In a case where determination is made in step S703 that the motion vector encoding unit 111 will not perform encoding in merge mode, the flow advances to step S715. The header encoding unit 114 sets the value of the skip flag to 0 in step S715, in the same way as in step S709, and encodes this as cu_skip_flag code. The code data of the cu_skip_flag code is input to the integrating unit 121, formed into a bit stream, and externally output from the output unit 122.

In step S716, the header encoding unit 114 determines the intra block copy permissible/non-permissible information in the same way as in step S710. If the intra block copy permissible/non-permissible information is 1, determination is made that intra block copying encoding is permissible, and advances to step S717, if not, to step S718. In step S717, the header encoding unit 114 encodes the intra block copy flag as intra_bc_flag code, in the same way as in step S711. The code data of the intra_bc_flag code is input to the integrating unit 121, formed into a bit stream, and externally output from the output unit 122. In step S718, the header encoding unit 114 encodes the pred_mode_flag in the same way as in step S712, and outputs. In step S719, the motion vector encoding unit 111 performs prediction of the calculated motion vector from neighboring motion vectors that are stored in the motion vector memory 112, obtains the predicted direction and a difference vector therewith, and encodes this. The predicted direction is encoded as mvp_l0_flag code or mvp_l1_flag code.

In step S720, the transforming/quantizing unit 115 subjects the inter prediction error block data generated in step S610 or step S618 to orthogonal transform and quantization to calculate quantized coefficients. The calculated quantized coefficients are input to the encoding unit 120 and the inverse-quantizing/inverse-transforming unit 116. The quantized coefficients input to the inverse-quantizing/inverse-transforming unit 116 are subjected to inverse quantization and inverse transform, and regenerated as inter prediction error block data. The reconfiguring unit 117 calculates inter prediction block data from the current picture memory 118, based on the motion vector, and uses this inter prediction error block data to calculate image data of the regenerated image for the decoded image of the block to be encoded. The calculated image data of the regenerated image is stored in the current picture memory 118. The encoding unit 120 also encodes the quantized coefficient of the inter prediction error block data and generates code data thereof. The generated code data is input to the integrating unit 121, formed into a bit stream, and externally output from the output unit 122. The encoding processing of the block to be encoded thus ends.

Returning to FIG. 6A, a case where the coding mode is the intra prediction coding mode in step S613 will be described. The intra block copy flag is set to 0 in step S615, and the flow advances to step S622. Intra prediction encoding processing of the block is performed in step S622, as described earlier.

Description will be made regarding a case where the coding mode is the intra block copying encoding mode in step S613. In step S616 the header encoding unit 114 sets the intra block copy flag to 1, and the flow advances to step S623. Intra block copying encoding processing is performed on the block in step S623, as described earlier.

Description will be made regarding a case where the intra block copy permissible/non-permissible information is not 1 in step S602. In step S617, the header encoding unit 114 sets the intra block copy flag to 0, in the same way as in step S614. In step S618, the inter prediction unit 107 calculates a motion vector, in the same way as in step S610. The inter prediction unit 107 also generates inter prediction block data based on the calculated motion vector. The inter prediction unit 107 further generates inter prediction error block data from the generated inter prediction block data and the image data of the block to be encoded. The calculated motion vector is output to the motion vector encoding unit 111 and the reconfiguring unit 117, and the inter prediction error block data is output to the prediction mode deciding unit 113 and the transforming/quantizing unit 115. In step S619, the intra prediction unit 108 decides the intra prediction mode in the same way as in step S606, generates intra prediction block data, and generates intra prediction error block data using the image data of the block to be encoded. In step S620, the prediction mode deciding unit 113 decides which of the intra prediction coding mode and the inter prediction coding mode is to be used for the coding mode. Note however, that the method of determining is not restricted in particular. For example, the prediction mode deciding unit 113 may estimate encoding cost from the prediction error of each, and determine the one of which the encoding cost is smaller to be the prediction mode. If the inter prediction coding mode, the flow advances to step S621. In step S621, inter prediction encoding processing of the block is performed, as described above. If the intra prediction coding mode, the flow advances to step S622. In step S622, intra prediction encoding processing of the block is performed, as described above.

Returning to FIG. 5, in step S508, the control unit 123 which controls the entire image encoding apparatus determines whether or not encoding of all blocks within the slice has ended. In a case where encoding of all blocks within the slice has ended, the flow advances to step S509, and if not, the next block in the scan order of blocks is encoded in step S507. In step S509, the control unit 123 determines whether or not encoding of all slices within the picture has ended. In a case where encoding of all slices within the picture has ended, the flow advances to step S510, and if not, the flow returns to step S505 and encoding processing of the next slice is performed. In step S510, the image data of the regenerated image of the picture which was the image to be encoded is moved from the current picture memory 118 to the picture memory 119. Image data which is not to be referenced is deleted from the picture memory 119 as necessary. In step S511, the control unit 123 determines whether or not encoding of all pictures in the sequence has ended. In a case where encoding of all pictures in the sequence has not ended, the flow goes to step S503 and encoding processing is performed for the next picture. If ended, all encoding operations end.

FIGS. 2 and 3 illustrate examples of syntax relating to block encoding, in a bit stream generated by the above-described configuration and operations. FIG. 2 illustrates a block encoding syntax. The syntax of the present embodiment is an improvement of the syntax in NPL 2. Lines 19 through 31 have been changed from the conventional syntax. The conventional syntax is as illustrated in Table 1.

TABLE 1

```
mvd_coding( x0, y0, 2)
    if( PartMode = = PART_2NxN )
mvd_coding( x0, y0 + ( nCbS / 2 ), 2)
    else if( PartMode = = PART_Nx2N )
mvd_coding( x0 + ( nCbS / 2 ), y0, 2)
    else if( PartMode = = PART_NxN ) {
mvd_coding( x0 + ( nCbS / 2 ), y0, 2)
mvd_coding( x0, y0 + ( nCbS / 2 ), 2)
mvd_coding( x0 + ( nCbS / 2 ), y0 + ( nCbS / 2 ), 2)
    }
```

This has been changed so that mvd_coding( ), which was a function of difference vector encoding of the motion vector, is prediction_unit( ) performing vector encoding which can be used in the merge mode, as illustrated in Table 2.

TABLE 2

```
if( PartMode = = PART_2Nx2N )
    prediction_unit( x0, y0, nCbS, nCbS )
    else if( PartMode = = PART_2NxN ) {
        prediction_unit( x0, y0, nCbS, nCbS / 2 )
prediction_unit( x0, y0 + ( nCbS / 2 ), nCbS, nCbS / 2 )
    } else if( PartMode = = PART_Nx2N )
        prediction_unit( x0, y0, nCbS / 2, nCbS )
        prediction_unit( x0 + ( nCbS / 2 ), y0, nCbS / 2, nCbS )
    } else if( PartMode = = PART_NxN ) {
prediction_unit( x0, y0, nCbS / 2, nCbS / 2 )
prediction_unit( x0 + ( nCbS / 2 ), y0, nCbS / 2, nCbS / 2 )
prediction_unit( x0, y0 + ( nCbS / 2 ), nCbS / 2, nCbS / 2 )
prediction_unit( x0 + ( nCbS / 2 ), y0 + ( nCbS / 2), nCbS / 2, nCbS / 2 )
    }
```

FIG. 3 represents syntax for a block where prediction is performed. Lines 13 through 16 and line 33 have been added in FIG. 3. The merge_idx code in line 4 is restricted a non-intra slice type of P_slice and B_slice alone. Looking at line 9, the vector candidate list for the vector candidate index that the merge_idx code represents differs depending on whether the inter prediction coding mode or the intra block copying coding mode. In a case where the prediction coding mode is the inter prediction coding mode, a motion vector candidate list is compile referencing spatially nearby blocks and temporally nearby blocks, as described in step S702 in FIG. 7. In a case where the prediction coding mode is the intra block copying coding mode, a copy vector candidate list is compiled referencing spatially nearby blocks as described in step S902 in FIG. 9. In line 14 of FIG. 3, motion vector encoded data is configured for a case of intra block copying coding that is not merge mode. The mvp_ibc_flag code in line 15 is obtained by encoding a copy vector reference flag, representing of which block the copy vector has been referenced at the time of encoding a difference vector.

Description will be made with reference to FIG. 4 regarding a different configuration by changing the prediction_unit( ). Conditions according to the intra block copy flag have been added in lines 14 and 15. Lines 18, 20, and 21 have also been added. Thus, the mvp_l0_flag code and the mvp_ibc_flag code can be used differently.

Accordingly, merge mode can thus be used with copy vectors in intra block copying encoding according to the above-described device configuration and method, enabling improvement in coding efficiency using copy vectors.

Now, deciding on the intra prediction mode and calculating intra prediction error block data in intra prediction may be performed prior to step S601, and steps S604, S606, S612, and S619 may be omitted.

Referencing blocks for vectors to serve as candidates for copy vectors in the copy vector reference list decided beforehand is not restricted to the above description. Also, copy vectors to be added in a case where the number is smaller than the maximum registration number are not restricted to this. Zero vectors where the vector value is (0, 0) may be added as copy vectors until reaching the maximum registration number. Note however, the zero vectors are not referenced in the copy vectors, since the vector value of (0, 0) represents the block to be encoded itself.

While the copy vectors and motion vectors have been described as being separately stored in the copy vector memory 110 and the motion vector memory 112 in the present embodiment, this is not restrictive, and both may be stored in the same memory. The two can be distinguished between by referencing the intra_bc_flag code of the block being referenced. Further, NPL 1 has the maximum registration number of motion vectors in the merge mode inserted to the slice header as five_minus_max_num_merge_cand code. Candidate vectors for copy vectors are obtained by referencing copy vectors in blocks spatially nearby, so the number is smaller than the maximum registration number of motion vectors in the merge mode. Accordingly, addition of needless vectors can be suppressed by separately providing five_minus_max_num_merge_bc code representing the maximum registration number of merge vectors in the merge mode as illustrated in FIG. 10, and sending the number thereof.

An arrangement may be made where the maximum registration number of copy vectors in the merge mode is not encoded, and a number obtained by subtracting a predetermined number (e.g., 1) from the maximum registration number of motion vectors in the merge mode is used, for example.

Conditions for determining whether or not skip encoding is permissible in the present embodiment are not restricted to the above-described. For example, decision may be made according to image features, amount of generated data, or the like.

Second Embodiment

A second embodiment of the present invention will be described with reference to FIGS. 11 through 13. Description will be made in the present embodiment with regard to an example of a case where the bit stream generated in the first embodiment is decoded.

Figure 11:
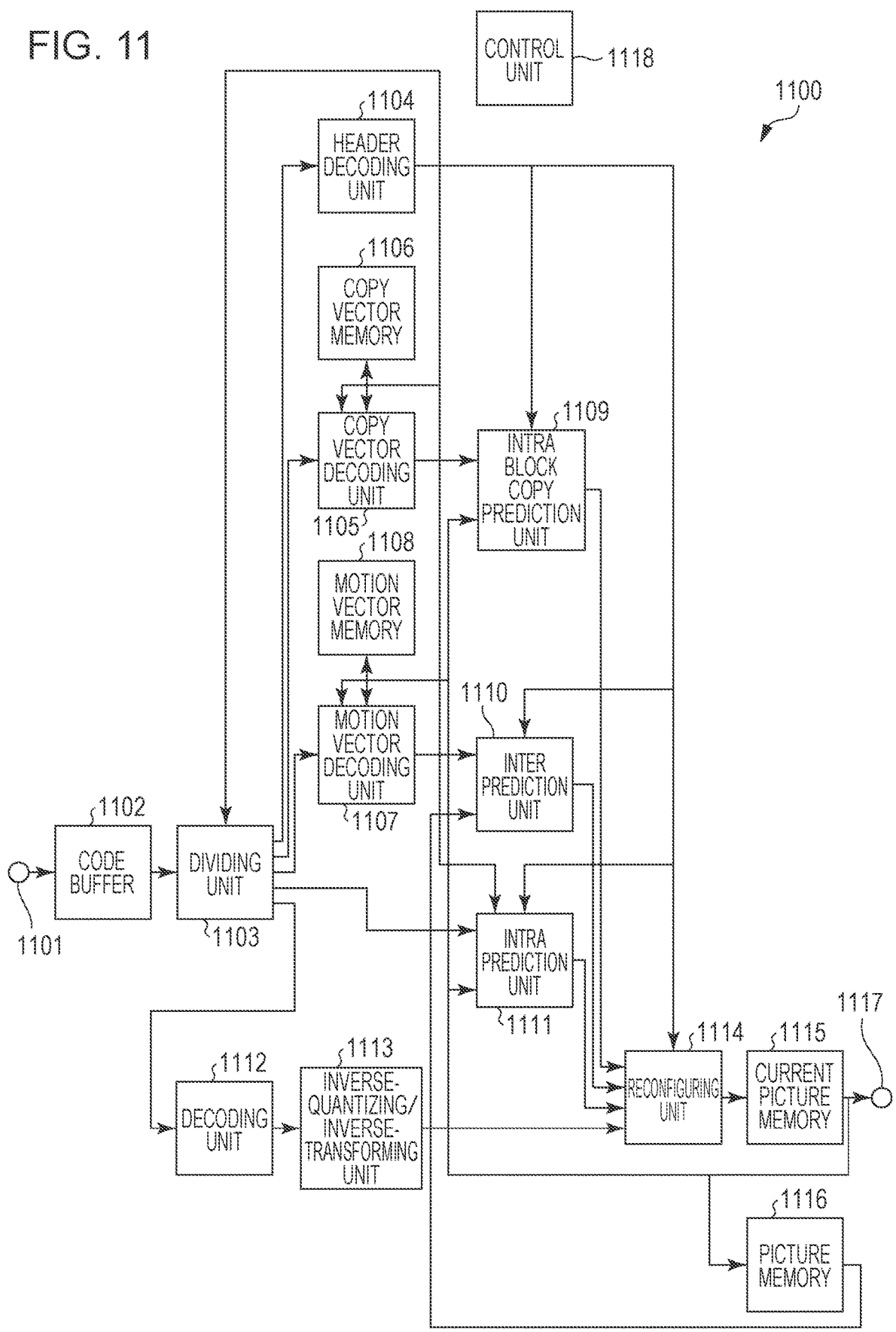
FIG. 11 is a block diagram illustrating the configuration of an image decoding apparatus according to second, fourth, sixth, and eighth embodiments.

FIG. 11 is a block diagram illustrating the configuration of an image decoding apparatus according to an embodiment of the present invention. Reference numeral 1101 in FIG. 11 denotes an input unit for input of bit streams which are encoded data. The syntax of bit streams that are input is that which has been described with reference to FIGS. 2 and 3, but is not restricted to this. Note that the coding order of blocks within the picture by the image encoding apparatus in FIG. 1 and the decoding order of blocks within the picture by the image decoding apparatus in FIG. 11 are the same. Reference numeral 1102 denotes a code buffer that stores input bit streams. Reference numeral 1103 denotes a dividing unit that extracts various code data from the input bit streams, and outputs these to decoding units and the like downstream that process them.

Reference numeral 1104 denotes a header decoding unit that decodes code data of sequence headers, slice headers, and block headers, and outputs necessary information to the units. In particular, in decoding of a sequence header, intra_block_copy_enabled_flag code that indicates whether or not to perform intra block copying as a sequence is decoded, and intra block copy permissible/non-permissible information is obtained. In decoding of a slice header, slice_type code that represents the slice type is decoded. In block header decoding, cu_skip_flag code, pred_mode_flag code, intra_bc_flag code, and code representing the intra prediction mode are decoded.

Reference numeral 1105 denotes a copy vector decoding unit that regenerates copy vectors by decoding code data relating to copy vectors. Reference numeral 1106 denotes copy vector memory that stores already-decoded copy vectors, for referencing when performing copy vector prediction at the time of decoding. Reference numeral 1107 denotes a motion vector decoding unit that regenerates motion vectors by decoding code data relating to motion vectors. Reference numeral 1108 denotes motion vector memory that stores already-decoded motion vectors, for referencing when performing motion vector prediction at the time of decoding.

Reference numeral 1109 denotes an intra block copy prediction unit that references image data of an already-decoded regenerated image of a picture to be encoded using decoded copy vectors, and calculates intra block copy prediction block data to serve as a prediction image of a block to be decoded. The calculated intra block copy prediction block data is output to a reconfiguring unit 1114 downstream.

Reference numeral 1110 denotes an inter prediction unit that references image data of a regenerated image decoded before the picture to be decoded using the regenerated motion vector, calculates inter prediction block data to serve as a prediction image of a block to be decoded, and outputs to the reconfiguring unit 1114 downstream. Reference numeral 1111 denotes an intra prediction unit that decodes code data of the intra prediction mode input via the dividing unit 1103, and regenerates the intra prediction mode. The intra prediction unit 1111 further calculates intra prediction block data from neighboring pixel values of the block to be decoded, out of the image data of the already-decoded regenerated image of the picture to be decoded, following the intra prediction mode. The calculated intra prediction block data is output to the reconfiguring unit 1114 downstream.

Reference numeral 1112 denotes a decoding unit that decodes code data relating to input quantized coefficients, and regenerates the quantized coefficients. Reference numeral 1113 denotes an inverse-quantizing/inverse-transforming unit that subjects input quantized coefficients to inverse quantization to regenerate orthogonally-transformed coefficients, and further subjects the orthogonally-transformed coefficients to inverse orthogonal transform to generate prediction error block data of the block to be decoded.

The reconfiguring unit 1114 selects and acquires prediction block data in accordance with the decoded prediction error block data, and the block coding mode or intra block copy prediction coding mode decoded at the header decoding unit 1104. That is to say, the reconfiguring unit 1114 selects and inputs prediction block data output from the intra block copy prediction unit 1109, inter prediction unit 1110, and intra prediction unit 1111. A decoded regenerated image is generated from the decoded prediction error and prediction block data.

Reference numeral 1115 denotes current picture memory that stores image data of the regenerated image of the picture to be decoded that has been regenerated. Reference numeral 1116 denotes picture memory that stores image data of a regenerated image of a picture that has been decoded before the picture to be decoded. Reference numeral 1117 denotes an output unit that externally outputs image data of regenerated images.

The processing units in FIG. 11 may be configured as a single physical integrated circuit, or each may be individual circuits. Reference numeral 1118 denotes a control unit that controls each of the above-described processing units of the image encoding apparatus, and is configured including a CPU or the like.

Image decoding operations in the image decoding apparatus will be described with reference to the flowcharts in FIG. 12 through 13B. FIG. 12 is a flowchart illustrating the overall decoding operations. Although not mentioned in particular in the flowchart in FIG. 12, bit streams are sequentially input to the image decoding apparatus via the input unit 1101, and stored in the code buffer 1102. In step S1201, the header decoding unit 1104 decodes code data of a sequence header input via the dividing unit 1103. In the process thereof, the header decoding unit 1104 decodes intra_block_copy_enabled_flag code, and decodes the intra block copy permissible/non-permissible information. In a case where encoding in the intra block copying prediction coding mode has been performed on the sequence to be decided, 1 is regenerated as the value for the intra block copy permissible/non-permissible information, and if not, 0 is regenerated. Decoding processing of each picture is performed in step S1202 and thereafter.

Decoding processing of each slice is performed in step S1202 and thereafter. In step S1202, the header decoding unit 1104 decodes the slice header. The slice_type code representing the slice type is decoded in the slice header decoding processing. In a case of the five_minus_max_num_merge_cand code and the code data of the syntax in FIG. 10, five_minus_max_num_merge_cand_bc code is decoded.

Figure 13A:
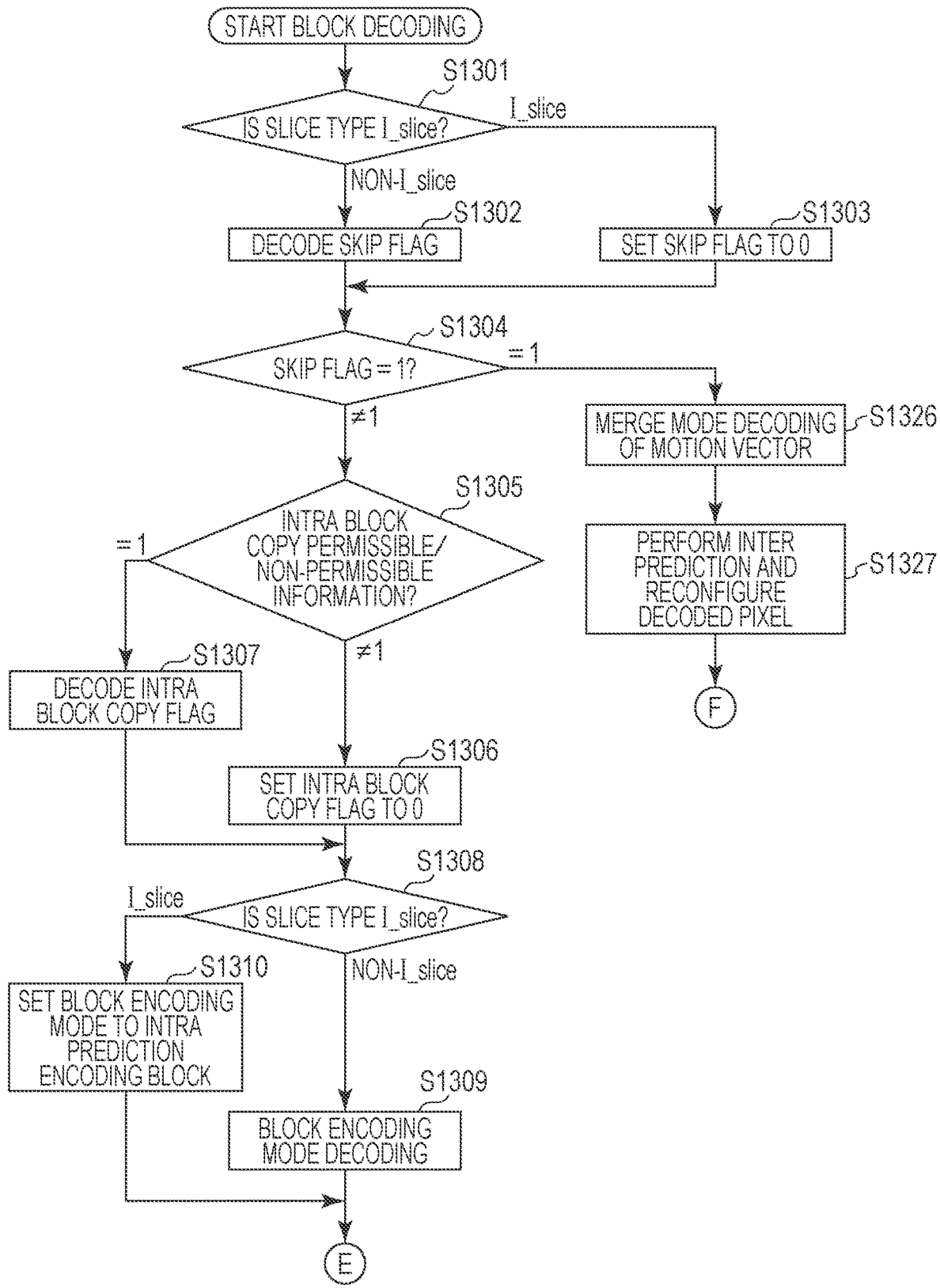
FIG. 13A is a flowchart illustrating the image decoding processing of a block according to the second embodiment.

Next, each block is decoded in step S1203. FIGS. 13A and 13B are flowcharts representing block decoding operations. Input/output of block code data at the dividing unit 1103 will be described later. In step S1301, the header decoding unit 1104 references the slice_type code decoded in step S1202. If the slice type is I_slice, the flow advances to step S1303, and if not, to step S1302.

In step S1302, the header decoding unit 1104 decodes the cu_skip_flag code input via the dividing unit 1103, and sets the value thereof to the skip flag. In step S1303, the header decoding unit 1104 sets the skip flag to 0. This indicates that the decoding processing of skip coding is to be performed only by non-intra slice of P_slice or B_slice for the slice type. In step S1304, the header decoding unit 1104 determines the value of the skip flag. If the value is 1, the flow advances to step S1326, and if not, to step S1305.

In step S1304, in a case where the value of the skip flag is 1, determination is made that skip coding has been performed, and the flow advances to step S1326. In step S1326, the motion vector decoding unit 1107 performs motion vector decoding. Skip coding has been performed, so the code data of the motion vector has been encoded by merge mode. Accordingly, in step S1326 the motion vector decoding unit 1107 decodes the merge_idx code input via the dividing unit 1103. The skip coding is only for non-intra slices is the present embodiment, so the vector candidate index which the merge_idx code indicates is the vector candidate index of the motion vector candidate list. The motion vector decoding unit 1107 references the motion vector memory 1108 and generates a motion vector candidate list using motion vectors of blocks which a spatially/temporally nearby the block to be decoded. The motion vector decoding unit 1107 decodes the merge_idx code and regenerates the vector candidate index, and further regenerates a motion vector from the motion vector candidate list following the vector candidate index. The regenerated motion vector is input to the inter prediction unit 1110. The regenerated motion vector is also stored in the motion vector memory 1108.

In step S1327, the inter prediction unit 1110 generates inter prediction block data by referencing the regenerated image of a picture decoded before the picture to be decoded that is stored in the picture memory 1116, based on the input motion vector. The generated inter prediction block data is input to the reconfiguring unit 1114. The reconfiguring unit 1114 takes the input inter prediction block data as the image data of a regenerated image of a decoded image of the block to be decoded. The image data of the block to be decoded is output to the current picture memory 1115. Thereafter, decoding processing of the block to be decoded is ended.

In a case where the value of the skip flag is not 1 in step S1304, determination is made that skip coding has not been performed, and the flow advances to step S1305. In step S1305, the header decoding unit 1104 determines the intra block copy permissible/non-permissible information obtained by decoding in step S1201. In a case where the value of the intra block copy permissible/non-permissible information is 1, determination is made that decoding corresponding to intra block copying prediction is possible, and the flow advances to step S1306, and if not, to step S1307. In step S1307, the header decoding unit 1104 decodes the intra_bc_flag code input from the code buffer 1102 via the dividing unit 1103, and regenerates the intra block copy flag. In step S1306, the header decoding unit 1104 sets the value of the intra block copy flag to 0.

In step S1308, the header decoding unit 1104 determines the slice type in the same way as in step S1301, and if the slice type is I_slice, the flow advances to step S1310, and if not, to step S1309. In step S1310, the header decoding unit 1104 sets the block coding mode to the intra coding mode (MODE_INTRA). In step S1309, the header decoding unit 1104 decodes the pred_mode_flag code representing the block coding mode, and sets the value thereof as the value of the block coding mode.

In step S1311, the header decoding unit 1104 determines the value of the block coding mode set in step S1309 or step S1310. In a case where the value of the block coding mode is MODE_INTRA that represents the intra coding mode, the flow advances to step S1312, and if not, to step S1320.

Description will be made regarding a case where determination of the intra coding mode is made in step S1311. In step S1312, the header decoding unit 1104 determines the intra block copy flag set in step S1306 or step S1307. In a case where the value of the intra block copy flag is 0, the flow advances to step S1318, and if not, to step S1313.

Description will be made regarding a case where the value of the intra block copy flag is 0 in step S1312. This is a case of decoding in the intra prediction coding mode. In step S1318, the intra prediction unit 1111 inputs code data of intra prediction from the code buffer 1102 via the dividing unit 1103, decodes, and regenerates the intra prediction mode. Next, in step S1319, the intra prediction unit 1111 references the current picture memory 1115 based on the regenerated intra prediction mode, calculates intra prediction block data from pixel values at the periphery of the block to be decoded, and outputs the calculated intra prediction block data to the reconfiguring unit 1114.

In step S1325, the decoding unit 1112 decodes code data of quantized coefficients of the prediction error input via the dividing unit 1103, and regenerates quantized coefficients. The regenerated quantized coefficients are input to the inverse-quantizing/inverse-transforming unit 1113. The inverse-quantizing/inverse-transforming unit 1113 subjects the input quantized coefficients to inverse quantization to regenerate orthogonally-transformed coefficients, and further inverse orthogonal transform, to regenerate decoded intra prediction error block data of the block to be encoded, which is output to the reconfiguring unit 1114. The reconfiguring unit 1114 uses the intra prediction block data generated in step S1319 and the intra prediction error block data, and regenerates image data of a decoded image of the block to be decoded. The regenerated image data is output to the current picture memory 1115. Thus, decoding processing of the block to be decoded is ended.

Description will be made regarding a case where the value of the intra block copy flag is not 0, i.e., the value is 1, in step S1312. This is a deciding to perform decoding in the intra block copying coding mode. In step S1313, the copy vector decoding unit 1105 inputs the merge_flag code from the code buffer 1102 via the dividing unit 1103, decodes, and regenerates the value of the merge mode flag. In step S1314, the copy vector decoding unit 1105 determines the value of the merge mode that has been regenerated, and if the value thereof is 1 advances to step S1315, and if not, to step S1316. In step S1315, the copy vector decoding unit 1105 decodes the merge_idx code input via the dividing unit 1103, and regenerates the vector candidate index. The copy vector decoding unit 1105 references the copy vector memory 1106 and uses the copy vectors of blocks spatially nearby the block to be decoded, to generate a copy vector candidate list. The copy vector decoding unit 1105 regenerates a copy vector from the copy vector candidate list, following the regenerated vector candidate index. The regenerated copy vector is input to the intra block copy prediction unit 1109. In step S1316, the copy vector decoding unit 1105 decodes the code data of the difference vector input from the code buffer 1102 via the dividing unit 1103, and generates a difference vector. The copy vector decoding unit 1105 also decodes the mvp_ibc_flag code, and regenerates the direction of prediction. The copy vector decoding unit 1105 performs copy vector prediction based on the direction of prediction regenerated from the neighboring copy vectors, stored in the copy vector memory 1106. The copy vector decoding unit 1105 further regenerates the copy vector of the block to be decoded from this difference vector and the predicted copy vector.

In step S1317, the intra block copy prediction unit 1109 references the regenerated image of the picture to be decoded, stored in the current picture memory 1115, based on the regenerated copy vector. The intra block copy prediction unit 1109 generates intra block copy prediction block data, based on the regenerated image of the picture to be decoded that has been referenced. The generated intra block copy prediction block data is input to the reconfiguring unit 1114.

In step S1325, the decoding unit 1112 decodes the code data of the quantized coefficients of the intra block copy prediction error block data input via the dividing unit 1103, and regenerates quantized coefficients. The regenerated quantized coefficients are input to the inverse-quantizing/inverse-transforming unit 1113 performs inverse quantization and inverse orthogonal transform on the input quantized coefficients, generates intra block copy prediction error block data, and outputs to the reconfiguring unit 1114. The reconfiguring unit 1114 uses the intra block copy prediction block data and the intra block copy prediction error block data generated in step S1317 to generate image data of the regenerated image of the decoded image in the block to be decoded. The image data of the block to be decoded is output to the current picture memory 1115. Thus, decoding processing of the block to be decoded is ended.

A case will be described where determination is made in step S1311 that the mode is not the intra prediction coding mode, i.e., that the mode is the inter prediction coding mode. In step S1320, the motion vector decoding unit 1107 inputs the merge_flag code from the code buffer 1102 via the dividing unit 1103, decodes, and regenerates the value of the merge mode flag. In step S1321, the motion vector decoding unit 1107 determines the value of the merge mode that has been regenerated, and if the value is 1, determination is made of the merge mode and the flow advances to step S1322, and if not, to step S1323. In step S1322, the motion vector decoding unit 1107 decodes the merge_idx code input via the dividing unit 1103, and regenerates a vector candidate index for the motion vector. The motion vector decoding unit 1107 references the motion vector memory 1108, and uses motion vectors in blocks spatially/temporally nearby the block to be decoded, to generate a motion vector candidate list. The motion vector decoding unit 1107 then following the vector candidate index to select a motion vector from the motion vector candidate list. The selected motion vector is input to the inter prediction unit 1110. In step S1323, the motion vector decoding unit 1107 decodes the code data of the difference vector input from the code buffer 1102 via the dividing unit 1103, and generates a difference vector. The motion vector decoding unit 1107 also decodes the mvp_l0_flag code and so forth, and regenerates the direction of prediction. The motion vector decoding unit 1107 further performs motion vector prediction based on the direction of prediction, from the motion vectors at the periphery, stored in the motion vector memory 1108. The motion vector decoding unit 1107 moreover regenerates a motion vector of the block to be decoded, from this difference vector and the predicted motion vector. The regenerated motion vector is input to the inter prediction unit 1110.

In step S1324, the inter prediction unit 1110 generates inter prediction block data, referencing image data of the regenerated image of pictures decoded before the picture to be decoded, stored in the picture memory 1116, based on the input motion vector. The generated inter prediction block data is input to the reconfiguring unit 1114. The decoding unit 1112 decodes the code data of quantized coefficients of the inter prediction error block data input via the dividing unit 1103, thereby regenerating the quantized coefficients. The regenerated quantized coefficients are input to the inverse-quantizing/inverse-transforming unit 1113. The inverse-quantizing/inverse-transforming unit 1113 subjects the input quantized coefficients to inverse quantization to regenerate orthogonally-transformed coefficients, and further inverse orthogonal transform, to generate decoded inter prediction error block data of the block to be encoded, which is output to the reconfiguring unit 1114. The reconfiguring unit 1114 uses the inter prediction block data and the inter prediction error block data generated in step S1324 to regenerate image data of the regenerated image of the decoded image in the block to be decoded. The image data of the regenerated image is output to the current picture memory 1115. Thus, the decoding processing of the block to be decoded is ended.

Returning to FIG. 12, in step S1204, the control unit 1118 determines whether or not decoding of all blocks within the slice has ended. In a case where decoding of all blocks has ended, the flow advances to step S1205, and if not, the next block in the scan order of blocks is decoded in step S1203. In step S1205, the control unit 1118 determines whether or not decoding of all slices within the picture has ended. In a case where decoding of all slices within the picture has ended, the flow advances to step S1206, and if not, the flow returns to step S1202 and encoding processing of the next slice is performed. In step S1206, the image data of the regenerated image stored in the current picture memory 1115 is externally output by the control unit 1118 via the output unit 1117. The image data of the picture memory 1116 is also updated using image data of the regenerated image as necessary. In step S1207, the control unit 1118 determines whether or not decoding of all pictures in the sequence has ended. In a case where decoding of all pictures in the sequence has not ended, the flow goes to step S1202 and decoding processing is performed for the next picture. If ended, all decoding operations end.

Input/output of bock code data at the dividing unit 1103 will be described using the syntax in FIGS. 2 and 3. The coding_unit( ) in FIG. 2 represents block syntax. In a case where the slice type is not I_slice, the dividing unit 1103 inputs cu_skip_flag code, and outputs to the header decoding unit 1104. In a case where the intra block copy permissible/non-permissible information is 1, the dividing unit 1103 inputs intra_bc_flag code, and outputs to the header decoding unit 1104. That is to say, in a case of executing the intra block copy prediction coding mode, intra_bc_flag code is input regardless of the slice type. Also, intra block copying coding is possible even for intra coding mode blocks that are non-intra slice, such as those with the slice type of P_slice or B_slice. Next, in a case where the slice is non-intra slice (P_slice or B_slice), and also the intra block copy flag is 0, the dividing unit 1103 inputs pred_mode_flag code, and outputs to the header decoding unit 1104.

In FIG. 3, prediction_unit( ) represents the syntax for blocks regarding which prediction is performed. In a case where the cu_skip_flag code in FIG. 2 is 1, merge_idx code is input, and is input to the copy vector decoding unit 1105 or the motion vector decoding unit 1107 depending on the slice type. In a case where the slice type is I_slice, output is made to the copy vector decoding unit 1105. Otherwise, output is made to the motion vector decoding unit 1107. Also, if the value of the cu_skip_flag code is 0, merge_flag code is input, and is input to the copy vector decoding unit 1105 or the motion vector decoding unit 1107 depending on the slice type. The output destinations according to the slice type are the same as with the merge_idx code. Next, if the value of the merge_flag code is 1, merge_idx code is input, and is input to the copy vector decoding unit 1105 or the motion vector decoding unit 1107 depending on the slice type. The output destinations according to the slice type are the same as above, as well. Thereafter, for code not in the merge mode, if the value of the intra_bc_flag code is 1, the code data of the difference vector and the mvp_ibc_flag code are output to the copy vector decoding unit 1105 using the mvd_coding( ) function. If the value of the intra_bc_flag code is not 1, these code data are output to the motion vector decoding unit 1107.

According to the apparatus configuration and method described above, a bit stream with copy vectors encoded in the merge mode can be decoded in intra block copying. Accordingly, images compressed to a smaller amount of data can be decoded.

Further, the coding format used for generating each code data is not restricted in particular. For example arithmetic coding formats or Huffman coding formats can be used for decoding.

Further, an example has been described in the present embodiment where the functions are realized by hardware, but this is not restrictive, and part or all of the operations thereof may be realized by software using a processor such as a CPU or the like.

Although external output of image data of regenerated images has been described as being performed in increments of pictures in the present embodiment, this is not restrictive, and external output may be performed in increments of slices or increments of blocks, as a matter of course.

Although the operations of the dividing unit 1103 using the prediction_unit( ) function has been described with reference to FIG. 3, this is not restrictive, and input and output can be performed in the same way using the prediction_unit( ) function in FIG. 4 as well.

While the copy vectors and motion vectors have been described as being separately stored in the copy vector memory 1106 and the motion vector memory 1108 in the present embodiment, this is not restrictive, and both may be stored in the same memory. The two can be distinguished between by referencing the intra_bc_flag code of the block being referenced. The number of candidate vectors for copy vectors can be increased or reduced in the copy vector candidate list, in a case where five_minus_max_num_merge_bc code representing the maximum registration number of copy vectors is provided separately, as illustrated in FIG. 4. Accordingly, the number of candidate vectors in the intra block copy prediction coding mode can be set low, and bit streams of shorter code data can be decoded.

Third Embodiment

A third embodiment of the present invention will be described with reference to FIGS. 14 through 17. The configuration of the image encoding apparatus in the present embodiment is the same as in FIG. 1, so description will be omitted. However, the operations of the intra block copy prediction unit 106, the copy vector encoding unit 109, the header encoding unit 114, and the integrating unit 121 differ from the first embodiment. Image encoding operations of the present embodiment will be described below. The encoding operations will be described based on the flowcharts in FIGS. 15 and 16. The flowchart illustrating the overall encoding operations is the same as FIG. 5, with the block encoding operations in step S507 being different.

Figure 15:
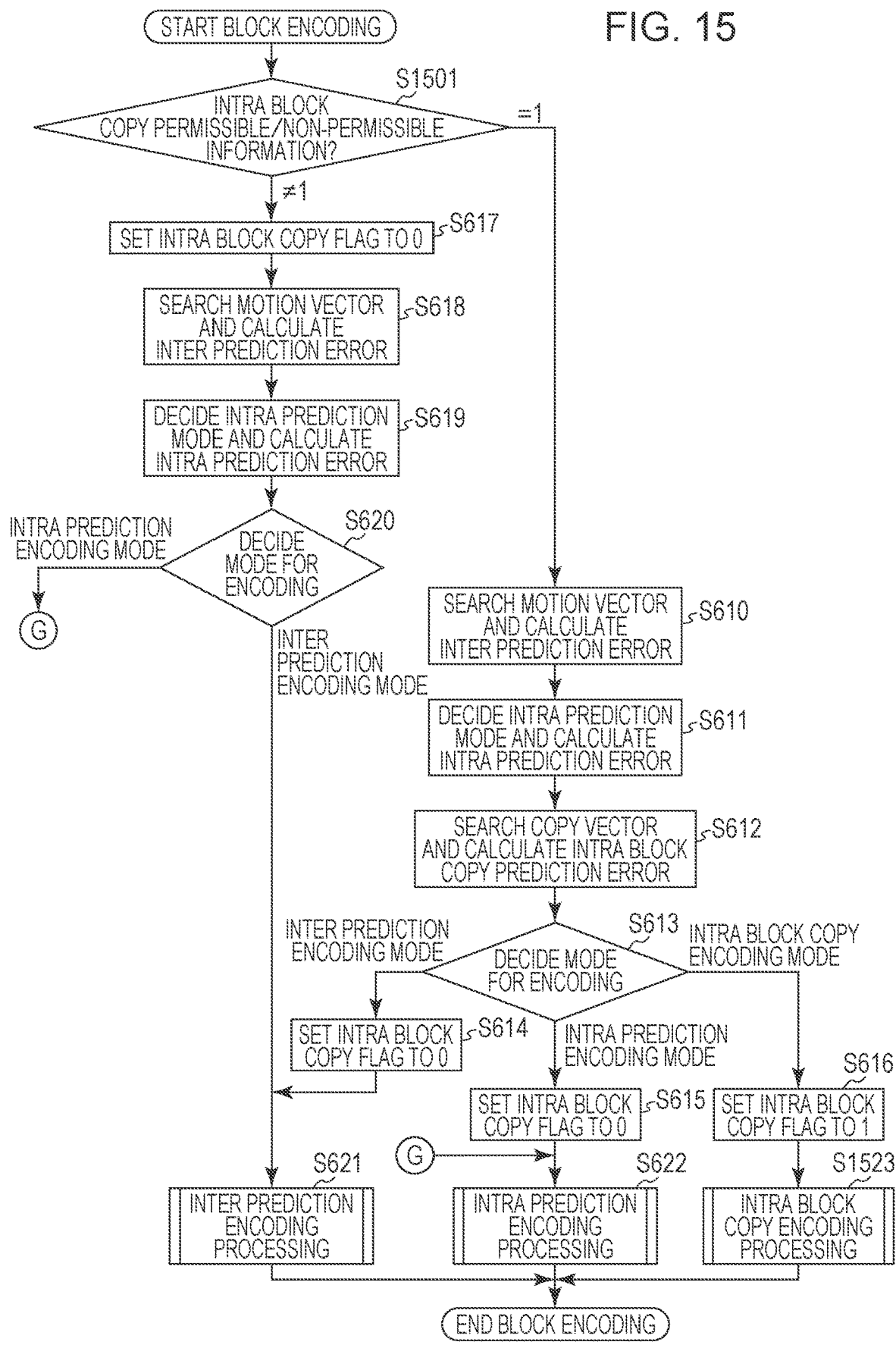
FIG. 15 is a flowchart illustrating the image encoding processing of a block according to the third embodiment.

FIG. 15 is a flowchart illustrating the block encoding operations. Steps in FIG. 15 which have the same function as the flowchart in FIG. 6 are denoted by the same step numbers, and description thereof will be omitted. In step S1501, the intra block copy prediction unit 106, inter prediction unit 107, and intra prediction unit 108 determine the intra block copy permissible/non-permissible information set in step S501. If the intra block copy permissible/non-permissible information is 1, determination is made that intra block copying coding is permissible, and the flow advances to step S610, and if not, to step S617.

In a case where the intra block copy permissible/non-permissible information is not 1 in step S1501, i.e., is 0, the flow advances to step S617. Encoding processing from step S617 through step S620 is the same as in the first embodiment, so description will be omitted. Inter prediction encoding processing illustrated in FIG. 7 in the first embodiment is performed in step S621. Step S622 differs from the intra prediction encoding processing illustrated in FIG. 8 with regard to the point that the processing in step S802 is not performed, and that step S803 is performed for all slice types.

A case will be described where the intra block copy permissible/non-permissible information is found to be 1 in step S1501. In step S610 through step S612, the respective prediction error block data and motion vectors, copy vectors, and intra prediction mode, used in each prediction coding mode, are each calculated, in the same way as in the first embodiment. In step S613, the prediction mode deciding unit 113 decides regarding which of the intra prediction coding mode, the intra block copying coding mode, and the inter prediction coding mode will be used as the prediction coding mode, in the same way as in the first embodiment. If the inter prediction coding mode is selected, the flow advances to step S614, if the intra prediction copying coding mode is selected, the flow advances to step S615, and encoding processing is performed in step S621 and S622 in the same way as in the first embodiment, so description will be omitted. If the intra prediction coding mode is selected, the flow advances to step S616.

In a case where the prediction coding mode is decided to be the intra block copying coding mode in step S613 will be described. In step S616, the header encoding unit 114 sets 1 to the intra block copy flag, in the same way as the first embodiment. In step S1523, intra block copying encoding of the block is executed.

Figure 16:
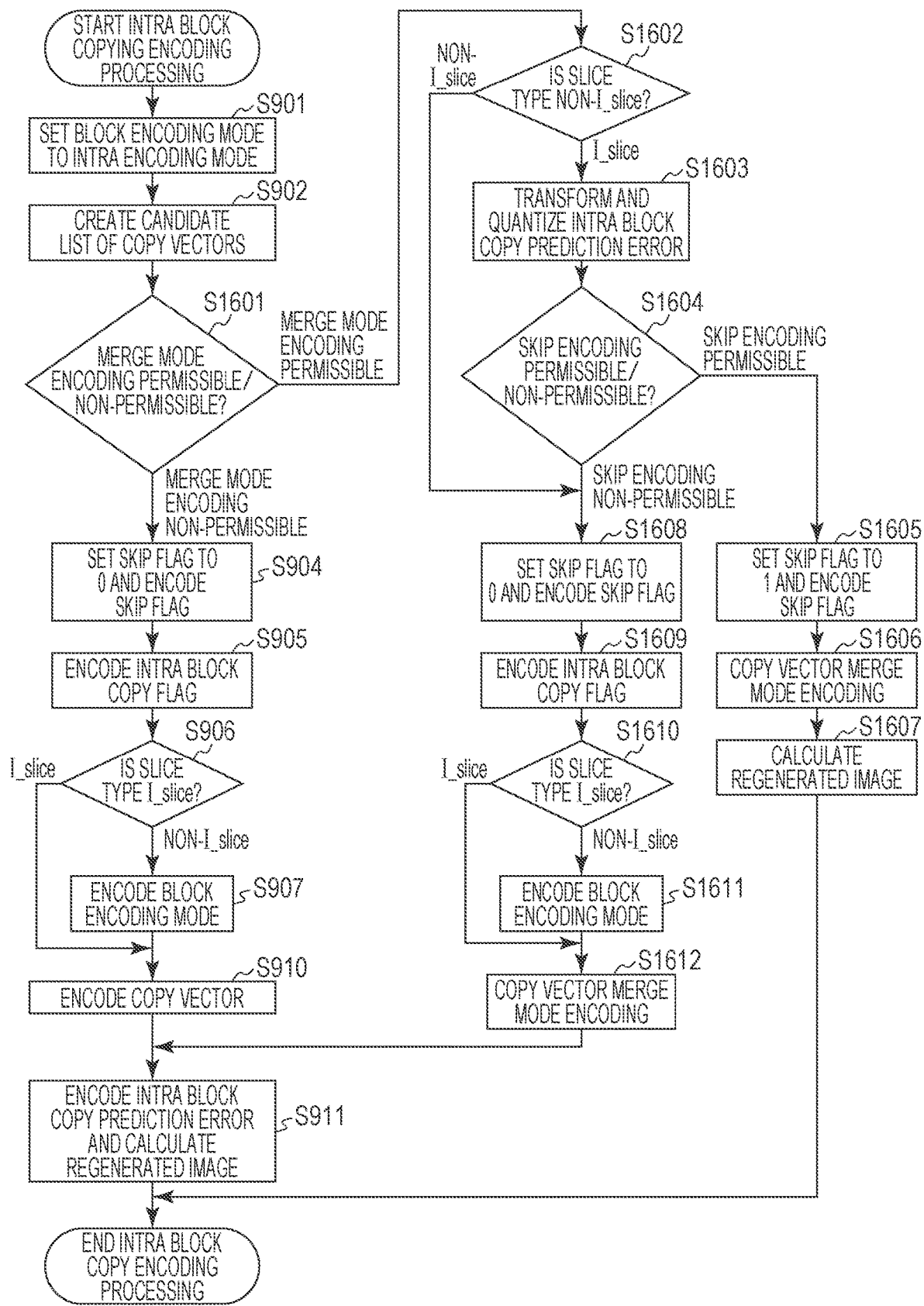
FIG. 16 is a flowchart illustrating intra block copy encoding processing of a block according to the third embodiment.

FIG. 16 is a flowchart illustrating the intra block copying encoding of a block. Steps in FIG. 16 which have the same function as the flowchart in FIG. 9 are denoted by the same step numbers, and description thereof will be omitted. Insteps S901 and S902, the header encoding unit 114 sets the block coding mode to the intra coding mode, and the copy vector encoding unit 109 compiles a copy vector candidate list in the same way as in the first embodiment. In step S1601, the copy vector encoding unit 109 determines whether or not the copy vector calculated in step S612 can be encoded by merge mode, in the same way as in step S908. Specifically, the copy vector encoding unit 109 determines whether or not the vector values of a copy vector registered in the copy vector candidate list and the calculated copy vector match. In a case of performing encoding in merge mode, the flow advances to step S1602, and if not, to step S904.

Ina case where decision is made in step S1601 to encode in merge mode, the flow advances to step S1602. In step S1602, the header encoding unit 114 determines the slice type. If I_slice has been set as the slice type, the flow advances to step S1603, and if not, to step S1608.

Description will be made regarding a case where determination is made in step S1602 that the slice type is I_slice. In step S1603, the transforming/quantizing unit 115 subjects the intra block copy prediction error block data calculated in step S612 in FIG. 15 to orthogonal transform and quantization, thereby calculating quantized coefficients. In step S1603, the header encoding unit 114 performs determined of whether or not to perform skip coding. The conditions for performing skip encoding are that copy vector coding can be performed in the merge mode, and that the values of the quantized coefficients of the inter prediction error block data calculated in step S612 of FIG. 15 are all 0. Note however, that this is not restrictive. Whether or not copy vector coding can be performed in the merge mode can be determined in step S1601, and determination can be made based on the values of the quantized coefficients calculated in step S1603. In a case of performing skip coding, the header encoding unit 114 advances to step S1605, and if not, to step S1608.

A case where skip coding has been decided to be performed in step S1604 will be described. In step S1605, the header encoding unit 114 sets 1 as the value of the skip flag, and encodes this as cu_skip_flag code. In step S1606, the copy vector encoding unit 109 encodes the vector candidate index of a relevant copy vector candidate from the copy vector candidate list generated in step S902, as merge_idx code. The encoded copy vector is stored in the copy vector memory 110. The cu_skip_flag code and merge_idx code are input to the integrating unit 121, and integrated code data is externally output from the output unit 122 as a bit stream. The calculated copy vector is also stored in the copy vector memory 110. In step S1607, intra block copy prediction block data is calculated at the reconfiguring unit 117 by referencing the current picture memory 118, based on the copy vector. The intra block copy prediction block data is taken as the image data of the regenerated image of the decoded image in the block to be encoded. The image data of the regenerated image is stored in the current picture memory 118. Thus encoding processing of the block to be encoded is ended.

A case where skip coding has been decided not to be performed in step S1604 will be described. The following description also holds for a case where the slice_type has been found not to be I_slice in step S1602. In step S1608, the header encoding unit 114 sets the value of the skip flag to 0, and encodes this as cu_skip_flag code. Further in step S1609, the header encoding unit 114 encodes the intra block copy flag set in step S616 as intra_bc_flag code. The code data of the intra_bc_flag code is input to the integrating unit 121, formed into a bit stream, and externally output from the output unit 122.

In step S1610, the header encoding unit 114 determines the slice type. In a case where I_slice has been set as the slice type, the flow advances to step S1612, and if not, to step S1611. In step S1611, the header encoding unit 114 encodes the intra coding mode (MODE_INTRA) set in step S901 as pred_mode_flag code. The pred_mode_flag code is input to the integrating unit 121, formed into a bit stream, and externally output from the output unit 122. In step S1612, the copy vector encoding unit 109 encodes the vector candidate index of a relevant copy vector candidate as merge_idx code, in the same way as in step S1606. The selected copy vector is stored in the copy vector memory 110. In step S911, the transforming/quantizing unit 115 calculates quantized coefficients of the intra block copy prediction error block data, and the inverse-quantizing/inverse-transforming unit 116 calculates a regenerated image of a decoded image in the block to be decoded, which is stored in the current picture memory 118, in the same way as in the first embodiment. The encoding unit 120 also encodes the intra block copy prediction error block data and generates code data of the intra block copy prediction error block data, which is input to the integrating unit 121, formed into a bit stream, and externally output from the output unit 122. The encoding processing of the block to be encoded thus ends.

A case will be described where the slice type has been determined to be P_slice or B_slice in step S1602. The above-described encoding processing is performed in step S1608 and thereafter. That is to say, encoding of the cu_skip_flag, intra_bc_flag, and pred_mode_flag is performed. Further, the copy vector of the block to be encoded is encoded by encoding of the difference vector, and quantized coefficients of the intra block copy prediction error block data are encoded. The copy vector and image data of the regenerated image are stored in the copy vector memory 110 and the current picture memory 118, and encoding processing of the block to be encoded ends.

Description will be made regarding a case where determination has been made in step S1601 not to perform encoding in merge mode. In step S904, the header encoding unit 114 sets the value of a skip flag indicating whether or not to perform skip coding to 0, and encodes cu_skip_flag code representing this. In step S905, the value 1 of the intra block copy flag is encoded as intra_bc_flag code. The header encoding unit 114 determines the slice type in step S906 and advances to step S910 if I_slice has been set, and to step S907 if not. In step S907, the header encoding unit 114 encodes the intra encoding mode (MODE_INTRA) set in step S901 as the pred_mode_flag. In step S910, copy vector encoding unit 109 obtains the direction of prediction of the difference vector, and encodes this. In step S911, the transforming/quantizing unit 115 calculates quantized coefficients of the intra block copy prediction error block data. The calculated quantized coefficients input to the inverse-quantizing/inverse-transforming unit 116 are subjected to inverse quantization and inverse transform, and regenerated as intra block copy prediction error block data, in the same way as in the first embodiment. The reconfiguring unit 117 also calculates intra block copy prediction block data, and uses this intra block copy prediction error block data to regenerate image data of the regenerated image for the decoded image in the block to be encoded. The image data of the regenerated image is stored in the current picture memory 118. The encoding unit 120 also encodes the quantized coefficient of the intra block copy prediction error block data and generates code data of the prediction error. These are input to the integrating unit 121, formed into a bit stream, and externally output from the output unit 122. The encoding processing of the block to be encoded thus ends. The flow returns to FIG. 5, all pictures in the video sequence are encoded in the same way as in the first embodiment, and the overall encoding processing ends.

FIG. 14 illustrates an example of syntax relating to block coding, in the bit stream generated by the above-described configuration and operations. In FIG. 14, the condition
if(slice_type!=I)
in front of the cu_skip_flag code has been removed from the syntax in FIG. 2. Accordingly, skip coding of blocks in slices of all slice types is enabled. Note however, that if the slice type is I_slice, skip coding is performed only for blocks in the intra block copying coding mode. Also, if the slice type is P_slice or B_slice, skip coding is performed only for blocks in the inter prediction coding mode. This is realized by whether the vector candidate index, which is the value of the merge_idx for when performing the skip coding in FIG. 3, is a copy vector candidate index or a motion vector candidate index, being determined by the slice type.

Thus, according to the above-described apparatus configuration and method, the merge mode can be used for copy vectors in intra block copying coding as well. Further, skip coding is enabled in intra block copying encoding for slices of which the slice type is I_slice, enabling coding efficiency to be improved.

Note that the syntax illustrated in FIG. 17 may be used instead of the syntax in FIG. 14 in the present embodiment. The condition
if(slice_type!=I)
in FIG. 2 is replaced by
if(slice_type!=∥intra_block_copy_enabled_flag)
in FIG. 17. This yields the advantage that even if the slice type is I_slice, the cu_skip_flag code can be omitted if intra block copying coding cannot be performed.

In a case where determination is made in step S1604 of FIG. 16 that skip coding will not be performed, the intra block copy prediction error block data calculated in step S1603 may be used in step S911.

Also, when performing skip coding in the intra block copying coding in the present embodiment, a vector candidate index of a copy vector candidate decided beforehand may be used. For example, if the block to the left side of the block can be referenced, the copy vector of the block to the left side is taken as the copy vector of the block to be encoded. Also, if the block to the left side of the block cannot be referenced, the copy vector of the block above is taken as the copy vector of the block to be encoded. The following change is made to line 3 in FIG. 4 in the syntax for the block regarding which prediction is to be performed, thus enabling the amount of data to be further reduced.

TABLE 3

| No. | | Descriptor |
|---|---|---|
| 1 | prediction_unit( x0, y0, nPbW, nPbH ) { | |
| 2 | if( cu_skip_flag[ x0 ][ y0 ] ) { | |
| 3 | if( (MaxNumMergeCand > 1 ) && (slice_type != I)) | |
| 4 | merge_idx[ x0 ][ y0 ] | ae(v) |
| 5 | } else { | |

Fourth Embodiment

A fourth embodiment of the present invention will be described with reference to FIGS. 18A and 18B. Description will be made in the present embodiment regarding an example of a case where a bit stream generated in the third embodiment is to be decoded.

The configuration of the image decoding apparatus according to the present embodiment is the same as that in FIG. 11, so description thereof will be omitted. Note however, the operations of the dividing unit 1103, the header decoding unit 1104, the copy vector decoding unit 1105, the intra block copy prediction unit 1109, and the reconfiguring unit 1114 differ from those in the second embodiment. The image decoding operations according to the present embodiment will be described below. The flowchart illustrating the overall encoding operations is the same as FIG. 12, with the block decoding operations in step S1203 being different.

Figure 18A:
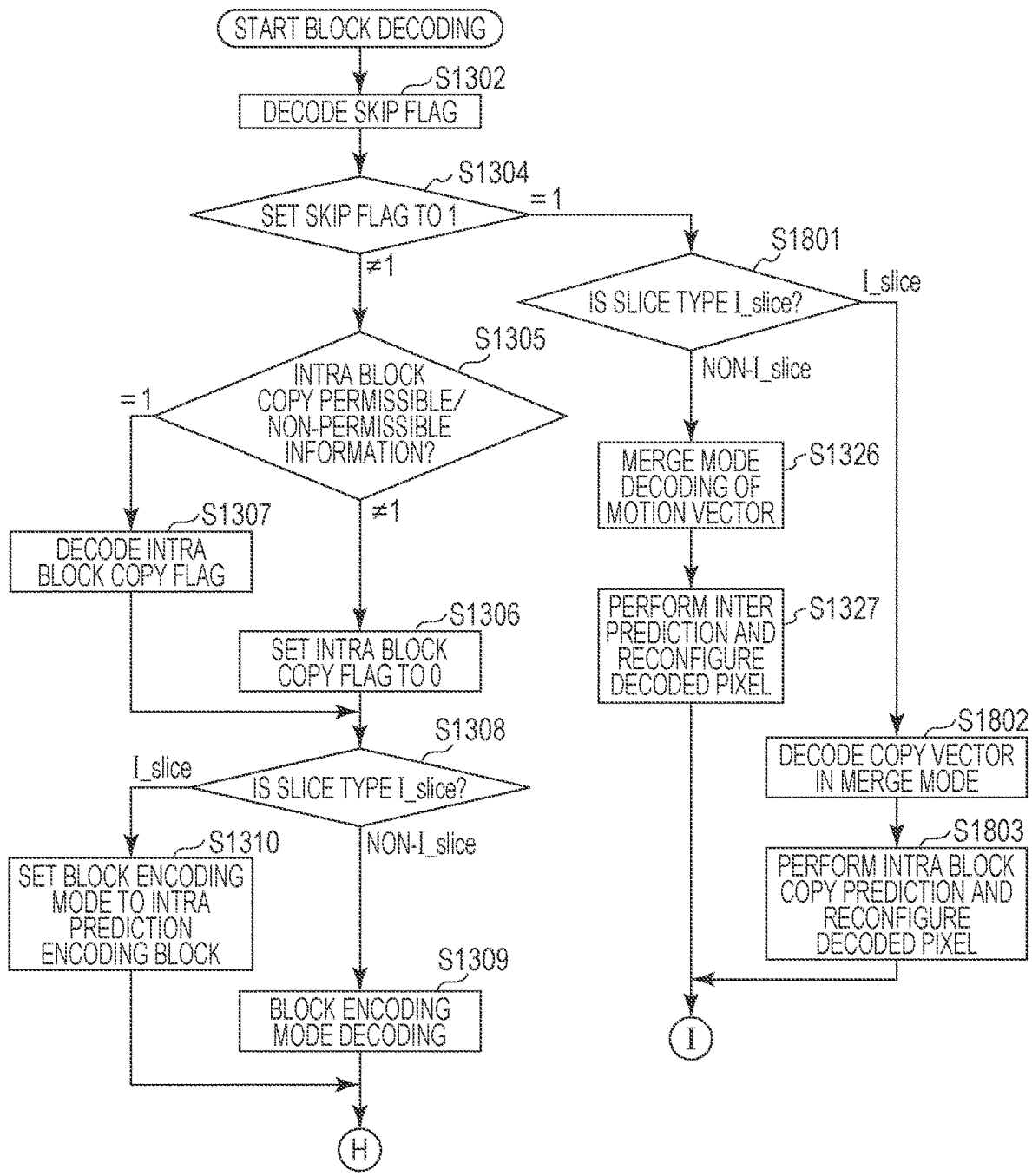
FIG. 18A is a flowchart illustrating the image decoding processing of a block according to the fourth embodiment.

FIGS. 18A and 18B illustrate a flowchart illustrating the block decoding operations in step S1203 of the present embodiment. Steps in FIGS. 18A and 18B which have the same function as the flowchart in FIGS. 13A and 13B are denoted by the same step numbers, and description thereof will be omitted. In step S1302, the header decoding unit 1104 regenerates the value of the skip flag, in the same way as in the second embodiment. In step S1304, the header decoding unit 1104 determines the value of the skip flag, and in a case where the value of the skip flag is 1, determination is made that skip coding has been performed, and the flow advances to step S1801, and if not, to step S1305.

Description will be made in step S1304 regarding a case where the value of the skip flag is 1. In step S1801, the copy vector decoding unit 1105, motion vector decoding unit 1107, intra block copy prediction unit 1109, and inter prediction unit 1110 determine the slice type. In a case where the slice type is I_slice, the flow advances to step S1802, and if not, to step S1326.

Description will be made regarding a case where determination is made in step S1801 that the slice type is I_slice. In step S1802, the copy vector decoding unit 1105 inputs and decodes merge_idx code via the dividing unit 1103. Since this is a case of an intra slice, the vector candidate index which the merge_idx code represents is a vector candidate index of a copy vector candidate list. The copy vector decoding unit 1105 references the copy vector memory 1106 to generate the copy vector candidate list, using copy vectors of blocks spatially nearby the block to be decoded. The copy vector decoding unit 1105 decodes the merge_idx code and generates the vector candidate index, and regenerates a copy vector from the copy vector candidate list according to the vector candidate index. The regenerated copy vector is input to the copy vector memory 1106. In step S1803, the intra block copy prediction unit 1109 references image data of the regenerated image in the picture to be decoded that is stored in the current picture memory 1115 and generates intra block copy prediction block data, based on this copy vector. The intra block copy prediction unit 1109 takes this intra block copy prediction block data as the image data of the regenerated image of the block to be decoded. The image data of the regenerated image of the block to be decoded is output to the current picture memory 1115. Thus, decoding processing of the block to be decoded is ended.

A case where determination is made in step S1801 that the slice type is other than I_slice will be described. In step S1326, the motion vector decoding unit 1107 decodes the merge_idx code, regenerates the motion vector candidate index, and regenerates the motion vector from the generated motion vector candidate list, in the same way as in the second embodiment. The generated motion vector is stored in the motion vector memory 1108. In step S1327, the inter prediction unit 1110 generates inter prediction block data by referencing the regenerated data of a picture decoded before the picture to be decoded that is stored in the picture memory 1116, based on the input motion vector. The reconfiguring unit 1114 uses the inter prediction block data as the image data of a regenerated image of a decoded image of the block to be decoded. The image data of the block to be decoded is output to the current picture memory 1115. Thus, decoding processing of the block to be decoded is ended. Operations in a case where the skip flag value is not 1 in step S1304 is the same as in the second embodiment, so description will be omitted.

Input of block code data to the dividing unit 1103 will be described with reference to the syntax in FIG. 14. In FIG. 14, coding_unit( ) represents the syntax for the block. The dividing unit 1103 inputs the cu_skip_flag code and outputs to the header decoding unit 1104, non-dependent on the slice type. Thereafter, the dividing unit 1103 inputs intra_bc_flag code and outputs to the header decoding unit 1104 in a case where the intra block copy permissible/non-permissible information is 1, in the conventional manner. In a case where the slice is a non-intra slice (P_slice or B_slice), and also the intra block copy flag is 0, the dividing unit 1103 inputs the pred_mode_flag and outputs to the header decoding unit 1104.

The syntax in FIG. 17 is as follows. In a case where the slice type is not, or is I_slice but the intra_block_copy_enabled_flag is 1, the dividing unit 1103 inputs the cu_skip_flag code and outputs to the header decoding unit 1104. That is to say, in a case where the slice_type is I_slice and the intra_block_copy_enabled_flag is 0, the cu_skip_flag code is not input. Thereafter, input and output is performed in the conventional manner.

According to the apparatus configuration and method described above, skip coding is enabled in intra block copying and further in intra block copying coding where the slice_type of the slice is I_slice, thereby enabling improved coding efficiency. Accordingly, images compressed to a smaller amount of data can be decoded.

Further, an example has been described in the present embodiment where the functions are realized by hardware, but this is not restrictive, and part or all of the operations thereof may be realized by software using a processor such as a CPU or the like.

Further, the coding format used for generating each code data is not restricted in particular. For example arithmetic coding formats or Huffman coding formats can be used for decoding.

Although external output of image data of regenerated images has been described as being performed in increments of pictures in the present embodiment, this is not restrictive, and external output may be performed in increments of slices or increments of blocks, as a matter of course.

Also, when performing skip coding in the intra block copying coding mode in the present embodiment, a vector candidate index of a copy vector candidate decided beforehand may be used. For example, if the block to the left side of the block can be referenced, the copy vector of the block to the left side is taken as the copy vector of the block to be decoded. Also, if the block to the left side of the block cannot be referenced, the copy vector of the block above is taken as the copy vector of the block to be decoded. Further, the copy vector of the block to the left side or the copy vector of the block decoded immediately before the block to be decoded may be specifically taken as the copy vector of the block to be decoded. Restricting the vectors for the copy vector candidates enables decoding of bit streams with less data amount.

Fifth Embodiment

A fifth embodiment of the present invention will be described with reference to FIGS. 19 through 22. The configuration of the image encoding apparatus in the present embodiment is the same as in FIG. 1, so description will be omitted. However, the operations of the intra block copy prediction unit 106, the copy vector encoding unit 109, the header encoding unit 114, and the integrating unit 121 differ from the third embodiment. Image encoding operations of the present embodiment will be described below. The encoding operations will be described based on the flowcharts in FIGS. 20 and 21. The flowchart illustrating the overall encoding operations is the same as FIG. 5, with the block encoding operations in step S507 being different. The flowchart illustrating the block encoding operations is the same as FIG. 6, with the block encoding operations in steps S621, S622, and S623 being different.

Figure 20:
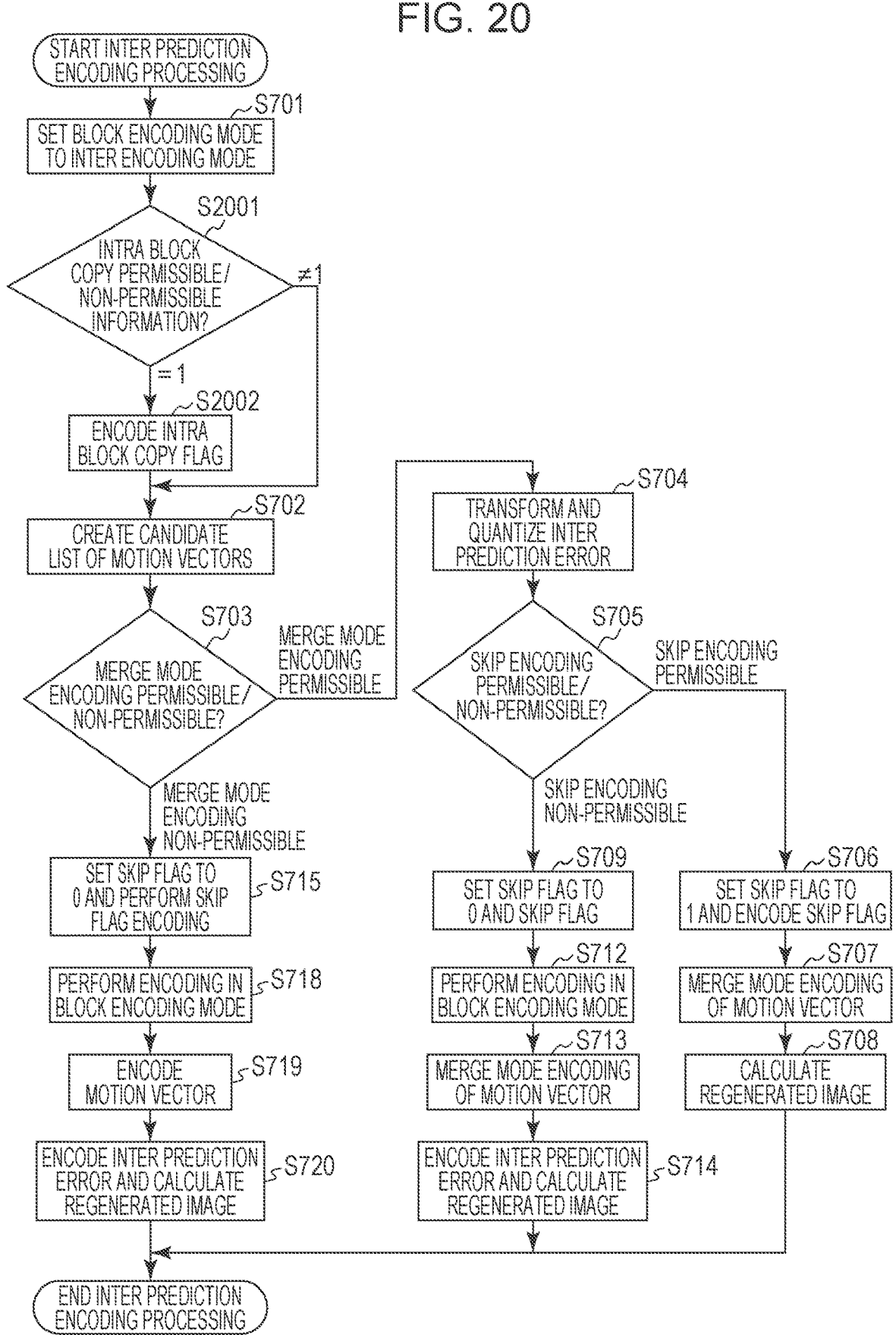
FIG. 20 is a flowchart illustrating inter prediction encoding processing of a block according to the fifth embodiment.

FIG. 20 is a flowchart illustrating the inter prediction encoding processing according to the present embodiment in step S621 in FIG. 6. Steps in FIG. 20 which have the same function as the flowchart in FIG. 7 are denoted by the same step numbers, and description thereof will be omitted. In step S701, the header encoding unit 114 sets the block coding mode to inter coding mode (MODE_INTER), in the same way as in the first embodiment.

In step S2001, the header encoding unit 114 determines the intra block copy permissible/non-permissible information. If the intra block copy permissible/non-permissible information is 1, the flow advances to step S2002, and if not, to step S702. In step S2002, the header encoding unit 114 encodes the intra block copy flag as intra_bc_flag code, in the same way as in step S717 in FIG. 7. The code data of the intra_bc_flag code is input to the integrating unit 121, formed into a bit stream, and externally output from the output unit 122. In step S703, the motion vector encoding unit 111 determines whether or not the merge mode can be used, in the same way as in the first embodiment. In step S705, the header encoding unit 114 performs determination regarding whether or not to perform skip coding, in the same way as in the first embodiment. Thereafter, skip flag encoding is performed in step S706, step S709, or step S715. Thus, motion vector encoding, inter prediction error block data encoding, regenerated image calculation, and movement vector storage are performed, and the encoding processing of the block to be encoded ends.

Figure 21:
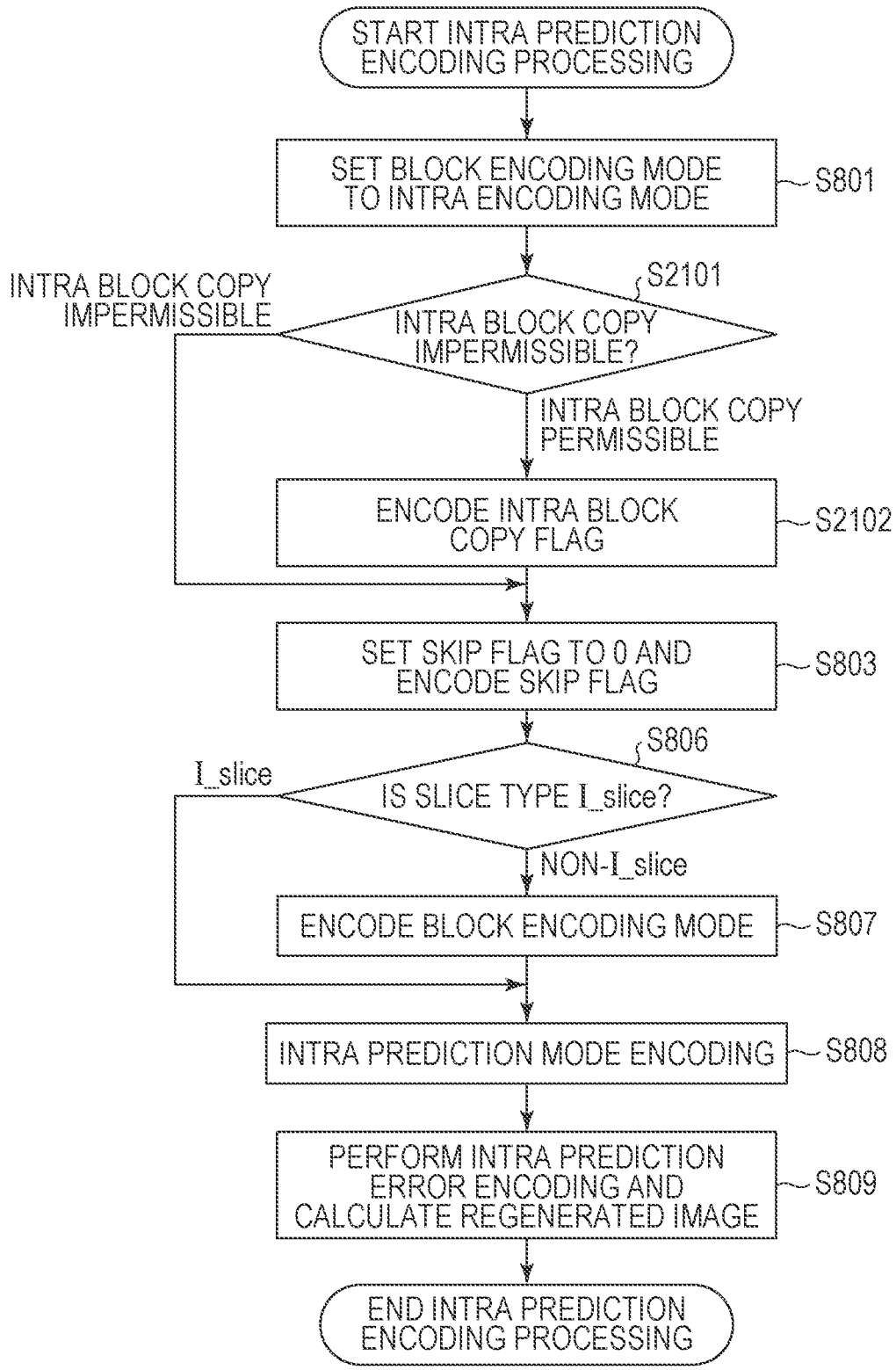
FIG. 21 is a flowchart illustrating intra prediction encoding processing of a block according to the fifth embodiment.

FIG. 21 is a flowchart illustrating intra prediction encoding processing according to the present embodiment, in step S622 of FIG. 6. Steps in FIG. 21 which have the same function as the flowchart in FIG. 8 are denoted by the same step numbers, and description thereof will be omitted. In step S801, the header encoding unit 114 sets the intra coding mode (MODE_INTRA) for the block coding mode in the same way as in the first embodiment. In step S2101, the header encoding unit 114 determines the intra block copy permissible/non-permissible information. If the intra block copy permissible/non-permissible information is 1, the flow advances to step S2102, and if not, to step S803. In step S2102, the header encoding unit 114 encodes the intra block copy flag as intra_bc_flag code, in the same way as step S805 in FIG. 8. The code data of the intra_bc_flag code is input to the integrating unit 121, formed into a bit stream, and externally output from the output unit 122. Skip flag encoding is performed in step S803, in the same way as in the first embodiment. Intra prediction mode, intra prediction error block data encoding, and regenerated image calculation are then performed in the same way as in the first embodiment, and the encoding processing of the block to be encoded ends.

Figure 22:
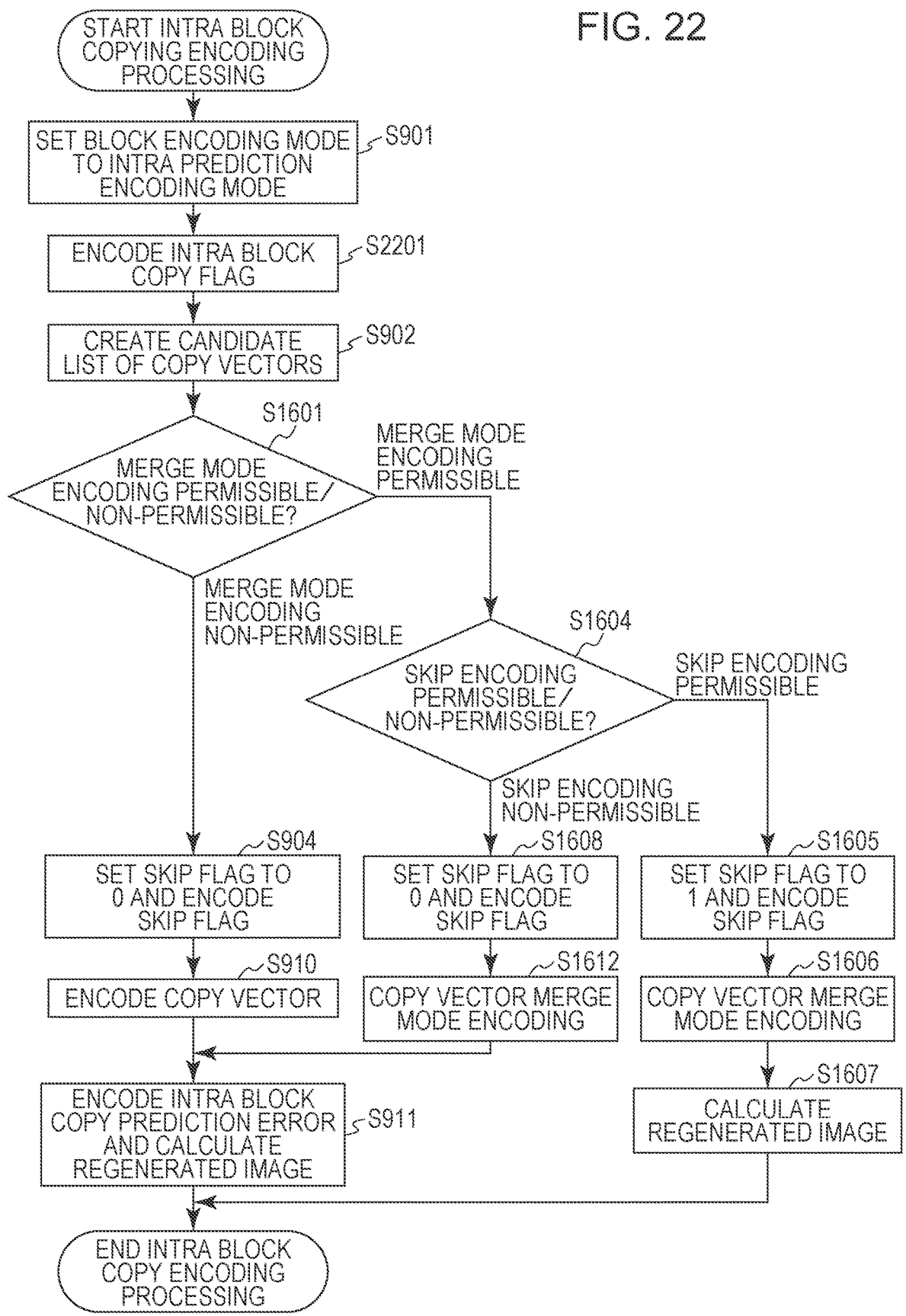
FIG. 22 is a flowchart illustrating intra block copying encoding processing of a block according to the fifth embodiment.

FIG. 22 is a flowchart illustrating the intra block copying encoding processing according to the present embodiment in step S623 in FIG. 6. Steps in FIG. 22 which have the same function as the flowchart in FIG. 16 are denoted by the same step numbers, and description thereof will be omitted. In step S901, in the same way as in the first embodiment, the header encoding unit 114 sets the block coding mode to the intra coding mode (MODE_INTRA). In step S2201, the header encoding unit 114 encodes the intra block copy flag as intra_bc_flag code, in the same way as in step S904 in FIG. 9. The value of the intra block copy flag here is 1. The code data of the intra_bc_flag code is input to the integrating unit 121, formed into a bit stream, and externally output from the output unit 122. Next, in step S902, the copy vector encoding unit 109 compiles a copy vector candidate list in the same way. In step S1601, determination is made regarding whether or not he copy vector can be encoded in the merge mode, in the same way as with the second embodiment.

Description will be made regarding a case where determination is made in step S1601 to perform encoding in the merge mode. In step S1604, the header encoding unit 114 determines whether or not to perform skip encoding, in the same way as in the second embodiment.

Description will be made regarding a case where determination has been made in step S1604 that skip coding can be performed. In step S1605, the header encoding unit 114 sets 1 as the value of the skip flag, and encodes this as cu_skip_flag code in the same way as in the first embodiment. In step S1606, the copy vector encoding unit 109 encodes the vector candidate index of a relevant copy vector candidate as merge_idx code. In step S1607, the intra block copy prediction block data is taken as the image data of the regenerated image of the decoded image in the block to be encoded. The image data of the regenerated image is stored in the current picture memory 118. Thus encoding processing of the block to be encoded is ended.

A case where skip coding has been decided to be performed in step S1604 will be described. In step S1608, the header encoding unit 114 sets the value of the skip flag to 0, and encodes this as cu_skip_flag code. In step S1612, the copy vector encoding unit 109 encodes the vector candidate index of a relevant copy vector candidate as merge_idx code. In step S911, in the same way as in the first embodiment, the transforming/quantizing unit 115 calculates quantized coefficients of the intra block copy prediction error block data, the inverse-quantizing/inverse-transforming unit 116 regenerates image data of a regenerated image in the block to be decoded, which is stored in the current picture memory 118. The encoding unit 120 encodes the quantized coefficient of the intra block copy prediction error block data and generates code data of the prediction error. The code data is input to the integrating unit 121, formed into a bit stream, and externally output from the output unit 122. The encoding processing of the block to be encoded thus ends.

A case where skip coding has been decided not to be performed in step S1604 will be described. In step S1608, the header encoding unit 114 sets the value of the skip flag to 0, and encodes this as cu_skip_flag code, in the same way as in the second embodiment. In step S1612, the copy vector encoding unit 109 encodes the vector candidate index of a relevant copy vector candidate as merge_idx code, in the same way as in step S1606. Next, in step S911, image data of the regenerated image in the block to be encoded is regenerated, quantized coefficients of the intra block copy prediction error block data are encoded, and prediction error code data is generated, as described above.

Description will be made regarding a case where determination has been made in step S1601 not to perform encoding in merge mode. In step S904, the header encoding unit 114 sets the value of the skip flag to 0, and encodes this as cu_skip_flag code. In step S910, the copy vector encoding unit 109 obtains the difference vector, and encodes this. In step S911, image data of the regenerated image in the block to be encoded is regenerated, quantized coefficients of the intra block copy prediction error block data are encoded, and prediction error code data is generated, as described above. All pictures in the video sequence are thus encoded in the same way as in the second embodiment, and the overall encoding processing ends.

FIG. 19 illustrates an example of syntax relating to block encoding, in the bit stream generated by the above-described configuration and operations. In FIG. 19,
if(intra_block_copy_enabled_flag)
intra_bc_flag[x0] [y0]
has been added in front of the cu_skip_flag code in the syntax in FIG. 2. Thus, the intra_bc_flag code is encoded based on the intra_block_copy_enabled_flag code, which is the intra block copy permissible/non-permissible information.

Further,
if(slice_type !=I)
which is the condition for the cu_skip_flag code has been changed to
if(slice_type !=I||intra_bc_flag).

This enables skip coding to be used for the cu_skip_flag code in all coding modes where the slice type is a non-intra slice, and in intra block copying coding mode where the slice type is I_slice.

According to the above-described apparatus configuration and method, skip coding can be used in not only slices of which the slice type is I_slice, but also in intra block copying coding for P_slice and B_slice as well, thereby enabling improvement in coding efficiency.

Further, an example has been described in the present embodiment where the functions are realized by hardware, but this is not restrictive, and part or all of the operations thereof may be realized by software using a processor such as a CPU or the like.

Further, the coding format used for generating each code data is not restricted in particular. For example arithmetic coding formats or Huffman coding formats can be used for decoding.

Also, when performing skip coding in the intra block copying coding mode in the present embodiment, a vector candidate index of a copy vector candidate decided beforehand may be used. For example, if the block to the left side of the block can be referenced, the copy vector of the block to the left side is taken as the copy vector of the block to be decoded. Also, if the block to the left side of the block cannot be referenced, the copy vector of the block above is taken as the copy vector of the block to be decoded. In this case, the syntax for the block regarding which prediction is to be performed is changed in the same way as with the third embodiment. Thus, further reduction of data amount can be realized.

Sixth Embodiment

Figure 23A:
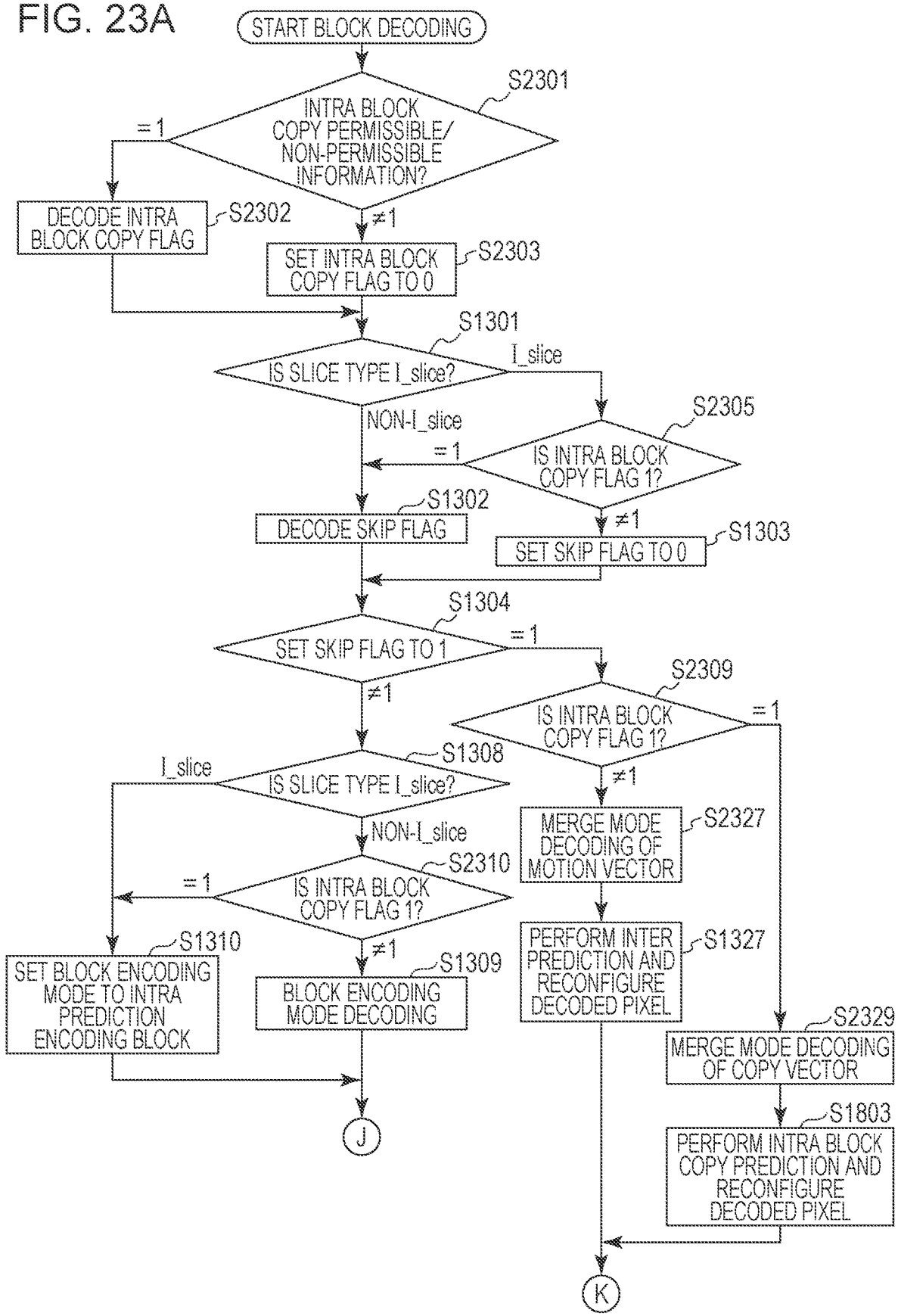
FIG. 23A is a flowchart illustrating the image decoding processing of a block according to the sixth embodiment.
Figure 23B:
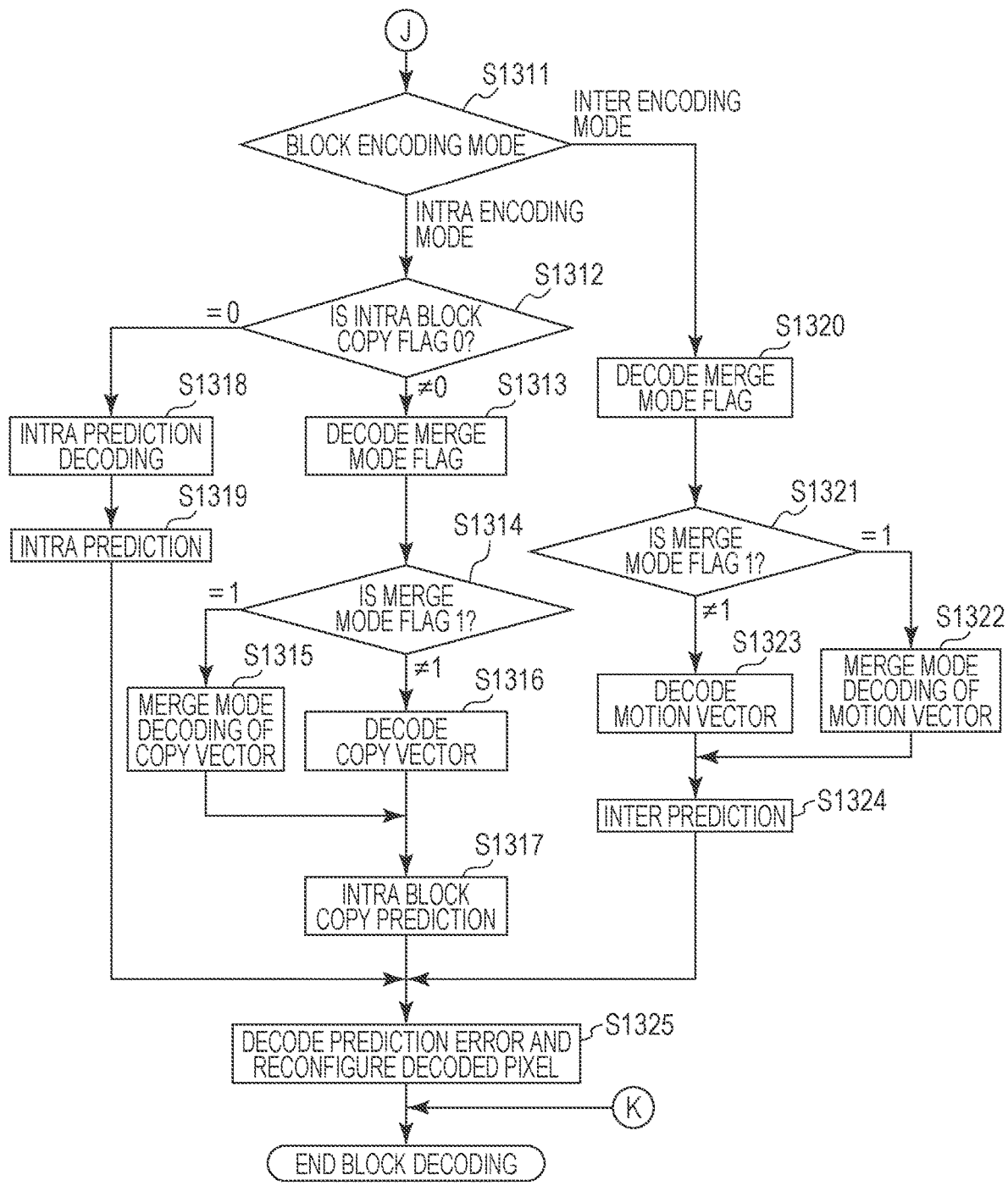
FIG. 23B is a continuation of the flowchart in FIG. 23A.

A sixth embodiment of the present invention will be described with reference to FIGS. 23A and 23B. Description will be made in the present embodiment regarding an example of a case where a bit stream generated in the fifth embodiment is to be decoded.

The configuration of the image decoding apparatus according to the present embodiment is the same as that in FIG. 11, so description thereof will be omitted. Note however, the operations of the dividing unit 1103, the header decoding unit 1104, the copy vector decoding unit 1105, the intra block copy prediction unit 1109, and the reconfiguring unit 1114 differ from those in the fourth embodiment. The image decoding operations according to the present embodiment will be described below. The decoding operations will be described with reference to the flowchart in FIGS. 23A and 23B. Steps in FIGS. 23A and 23B which have the same function as the flowchart in FIGS. 18A and 18B are denoted by the same step numbers, and description thereof will be omitted.

In step S2301, the header decoding unit 1104 determines the intra block copy permissible/non-permissible information obtained by the decoding in step S1201. In a case where the value of the intra block copy permissible/non-permissible information is 1 (intra block copying permissible) the flow advances to step S2302, and if not, to step S2303. In step S2302, the header decoding unit 1104 decodes the intra_bc_flag code input via the dividing unit 1103, and sets the value thereof to the intra block copy flag. In step S2303, the header decoding unit 1104 sets the intra block copy flag to 0.

Figure 12:
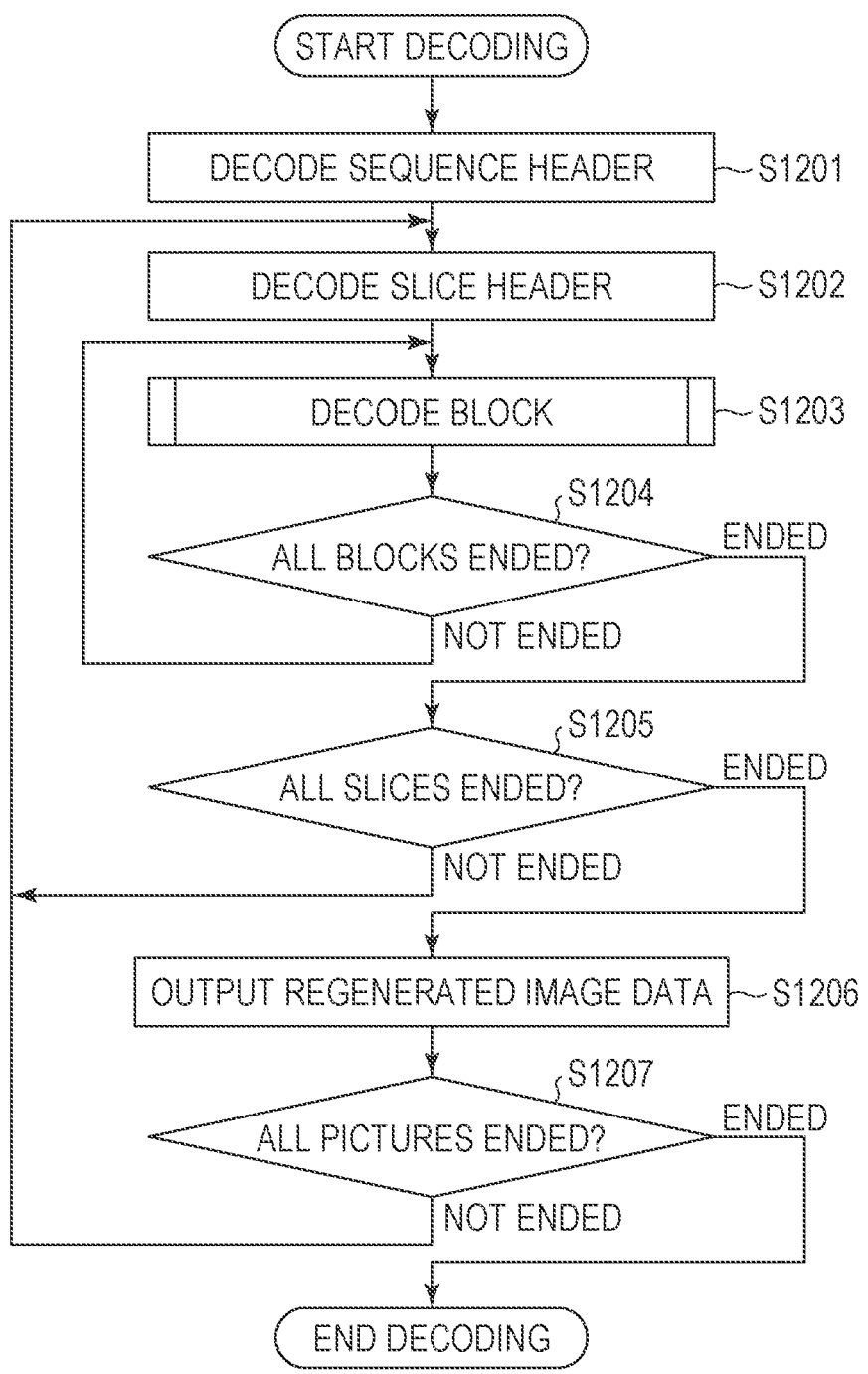
FIG. 12 is a flowchart illustrating the image decoding processing of an entire video according to the second, fourth, sixth, and eighth embodiments.

In step S1301, the header decoding unit 1104 determines the slice type regenerated in step S1202 in FIG. 12. If the slice type is I_slice, the flow advances to step S2305, and if not, to step S1302. In step S2305, the header decoding unit 1104 determines the value of the intra block copy flag set in step S2302 or step S2303. If the value thereof is 1, the flow advances to step S1302, and if not, to step S1303. The value of the skip flag is set in step S1302 and step S1303, in the same way as in the second embodiment.

In step S1304, the header decoding unit 1104 determines the value of the skip flag. If the value is 1, the flow advances to step S2309, and if not, to step S1308.

A case where the value of the skip flag is 1 in step S1304 will be described. In step S2309, the header decoding unit 1104 determines the value of the intra block copy flag set in step S2302 or step S2303. If the value is 1, the flow advances to step S2329, and if not, to step S2327.

A case where the value of the intra block copy flag is 1 in step S2309 will be described. In step S2329, the copy vector decoding unit 1105 inputs and decodes the merge_idx code via the dividing unit 1103. The value of the intra block copy flag is 1 here, so the block coding mode is the intra coding mode. Moreover, the prediction coding mode is the intra block copy prediction coding mode. Accordingly, the vector candidate index which the merge_idx code represents is the vector candidate index of the copy vector candidate list. The copy vector decoding unit 1105 generates a copy vector candidate list using the copy vectors of blocks spatially nearby the block to be decoded, referencing the copy vector memory 1106. The copy vector decoding unit 1105 decodes the merge_idx code and regenerates the vector candidate index. The copy vector is regenerated from the copy vector candidate list following this vector candidate index. The regenerated copy vector is input to the intra block copy prediction unit 1109. The regenerated copy vector is also stored in the copy vector memory 1106. Intra block copy prediction block data is generated in step S1803 in the same way as in the fourth embodiment, which is taken as image data of the regenerated image. The image data of the regenerated image in the block to be decoded is output to the current picture memory 1115. Thus, the decoding processing of the block to be decoded is ended.

A case where the value of the intra block copy flag is not 1 in step S2309 will be described. In step S2327, the motion vector decoding unit 1107 inputs and decodes the merge_idx code via the dividing unit 1103. The value of the intra block copy flag is 0 here, so the block coding mode is the inter coding mode. Moreover, the prediction coding mode is the inter prediction coding mode. The motion vector decoding unit 1107 decodes the merge_idx code input via the dividing unit 1103. The motion vector decoding unit 1107 generates a motion vector candidate list using the motion vectors of blocks spatially/temporally nearby the block to be decoded, referencing the motion vector memory 1108. The motion vector decoding unit 1107 decodes the merge_idx code and regenerates the vector candidate index, and regenerates the motion vector of the block to be decoded from the motion vector candidate list, following the vector candidate index. The regenerated motion vector is input to the inter prediction unit 1110. The regenerated motion vector is also stored in the motion vector memory 1108. Inter prediction block data is generated in step S1327 in the same way as in the fourth embodiment, and this generated data is taken as image data of the regenerated image of the block to be decoded. The image data of the regenerated image is output to the current picture memory 1115. Thus, the decoding processing of the block to be decoded is ended.

A case where the value of the skip flag is not 1 in step S1304 will be described. In step S1308, the header decoding unit 1104 determines the slice type, and if the slice type is I_slice, the flow advances to step S1310, and if not, to step S2310. In a case where the slice type is not I_slice in step S1308, in step S2310 the header decoding unit 1104 determines the value of the intra block copy flag. In a case where the value of the intra block copy flag is 1 (intra block copying permissible) the flow advances to step S1310, and if not, to step S1309. In step S1309, the header decoding unit 1104 decodes the pred_mode_flag code representing the block coding mode, and sets the value thereof as the value of the block coding mode, in the same way as in the second embodiment. In step S1310, the header decoding unit 1104 sets the block coding mode to the intra coding mode (MODE_INTRA). The processing thereafter is the same as in the fourth embodiment, so description will be omitted.

Input of block code data to the dividing unit 1103 will be described with reference to the syntax in FIG. 19. In FIG. 19, coding_unit( ) represents the syntax for the block. In a case where the intra block copy permissible/non-permissible information is 1, the dividing unit 1103 inputs intra_bc_flag code and outputs to the header decoding unit 1104, non-dependent on the slice type. Thereafter, in a case where the slice_type is not I_slice, or the value of the intra_bc_flag code is 1, the cu_skip_flag code is input, and output to the header decoding unit 1104. Thus, the cu_skip_flag code can be used in a case where the value of the intra block copy flag is 1, i.e., in the intra block copying coding mode, regardless of the slice type.

According to the above-described apparatus configuration and method, skip-encoded bit streams can be further decoded in intra block copying coding, regardless of the slice_type, improving coding efficiency. Accordingly, images compressed to a smaller amount of data can be decoded.

Further, an example has been described in the present embodiment where the functions are realized by hardware, but this is not restrictive, and part or all of the operations thereof may be realized by software using a processor such as a CPU or the like.

Further, the coding format used for generating each code data is not restricted in particular. For example arithmetic coding formats or Huffman coding formats can be used for decoding.

Also, when performing skip coding in the intra block copying coding mode in the present embodiment, a vector candidate index of a copy vector candidate decided beforehand may be used. For example, if the block to the left side of the block can be referenced, the copy vector of the block to the left side is taken as the copy vector of the block to be decoded. Also, if the block to the left side of the block cannot be referenced, the copy vector of the block above is taken as the copy vector of the block to be decoded. Thus, bit streams with less data amount can be decoded.

Seventh Embodiment

A seventh embodiment of the present invention will be described with reference to FIGS. 24A through 29. Prior to describing the present embodiment, the prediction coding modes used in the present embodiment will be described with reference to FIGS. 24A and 24B. The prediction coding modes used in the present embodiment are the intra prediction coding mode, intra block copying coding mode, and the inter prediction coding mode.

These modes are represented in FIG. 24A, which is a diagram describing conventional coding modes, as a combination of MODE_INTRA and MODE_INTER which are values of the pred_mode_flag code, and 1 and 0 which are values of the intra_bc_flag code. In the present embodiment, a block coding index is newly provided as code representing the prediction coding mode, and is encoded as pred_mode_idx. This will be described with reference to FIG. 24B. For the block coding index, MODE_INTRA is assigned to the intra prediction coding mode, MODE_INTRA_BC is assigned to the intra block copying coding mode, and MODE_INTER is assigned to the inter prediction coding mode. For example, MODE_INTRA may be 0, MODE_INTRA_BC 1, and MODE_INTER 2, but this is not restrictive.

The configuration of the image encoding apparatus in the present embodiment is the same as in FIG. 1, so description will be omitted. However, the operations of the header encoding unit 114 and the integrating unit 121 differ from the first embodiment. Image encoding operations of the present embodiment will be described based on the flowcharts in FIGS. 27 through 29. The flowchart illustrating the overall encoding operations is the same as FIG. 5, with the block encoding operations in step S507 being different. Also, the flowchart illustrating the block encoding processing is the same as FIG. 6, with the block operations in steps S621, S622, and S623 being different.

Figure 27:
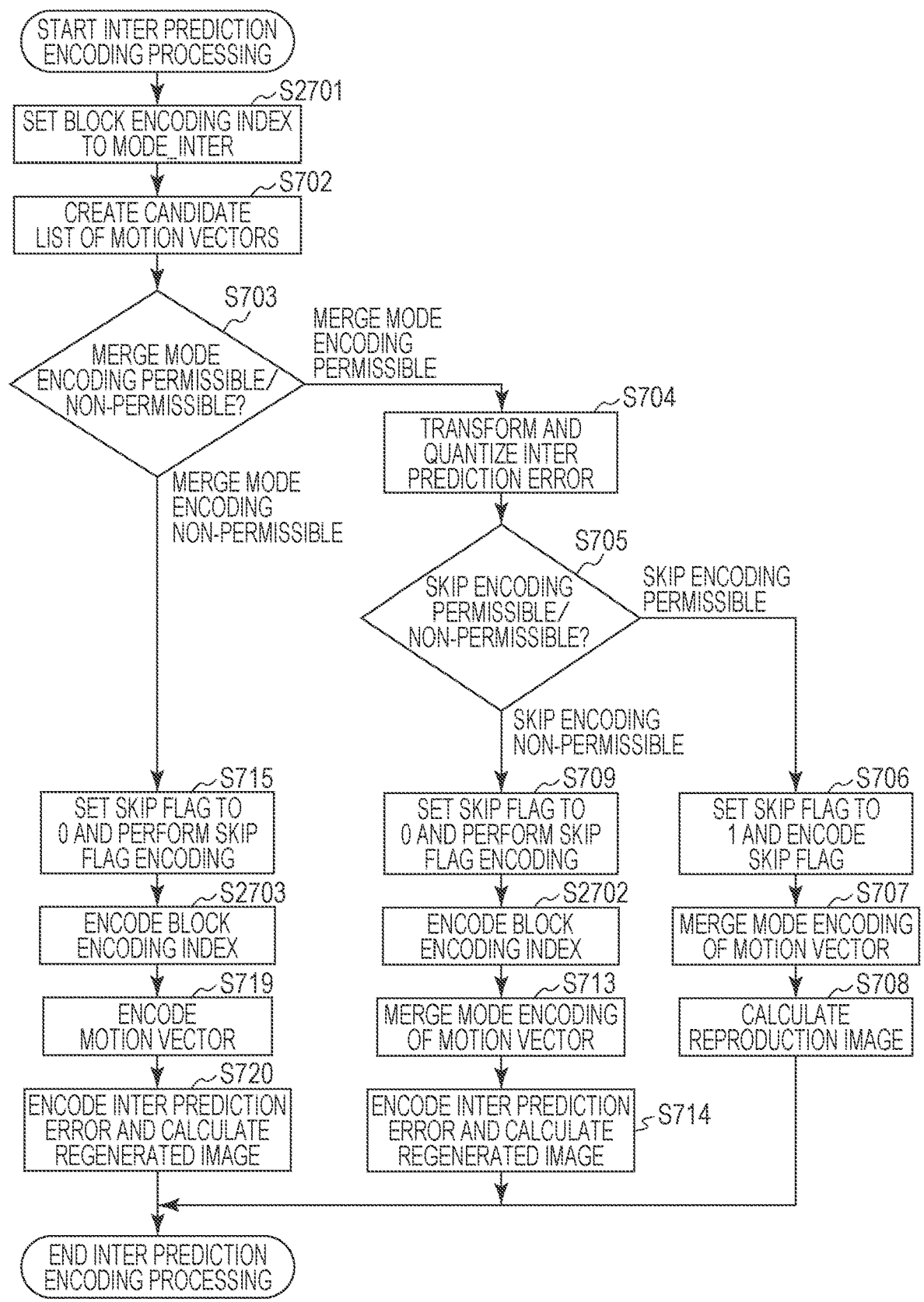
FIG. 27 is a flowchart illustrating inter prediction encoding processing of a block according to the seventh embodiment.

FIG. 27 is a flowchart illustrating the inter prediction encoding processing according to the present embodiment in step S621 in FIG. 6. Steps in FIG. 27 which have the same function as the flowchart in FIG. 7 are denoted by the same step numbers, and description thereof will be omitted. In step S2701, the header encoding unit 114 sets MODE_INTER as the value of the coding index. Thereafter, the motion vector encoding unit 111 generates a motion vector candidate list in step S702 and determines whether encoding can be performed in merge mode in step S703, in the same way as in the first embodiment. In a case of encoding in merge mode, the flow advances to step S704, and if not, to step S715.

A case where determination is made in step S703 to encode in the merge mode will be described. The transforming/quantizing unit 115 calculates quantized coefficients of the inter prediction error block data in step S704. In step S705, the header coding unit 114 performs determination regarding whether or not to perform skip coding. In a case of determining to perform skip coding, the flow advances to step S706, and if not, to step S709. In a case where determination is made in step S705 to perform skip coding, the same operations are performed from step S706 through step S708 as in the first embodiment, so description thereof will be omitted. In a case where determination is made in step S705 not to perform skip coding, the header encoding unit 114 sets the value of the skip flag to 0 in step S709, and encodes this as cu_skip_flag code. In step S2702, the header encoding unit 114 encodes the value of the block coding index set in step S2701 as pred_mode_idx code. The coding format is not restricted in particular, and encoding is performed by Huffman coding or arithmetic coding, in the same way as the other code. Thereafter, the same operations are performed in step S712 and step S713 as in the first embodiment, so description thereof will be omitted.

A case where determination is made in step S703 not to encode a motion vector in the merge mode will be described.

The header encoding unit 114 sets the value of the skip flag to 0 in step S715, and encodes this as cu_skip_flag code, in the same way as in the first embodiment. In step S2703, the header encoding unit 114 encodes the value of the block coding index set in step S2701 as pred_mode_idx code. Thereafter, the same operations are performed in step S719 and step S720 as in the first embodiment, so description thereof will be omitted.

Figure 28:
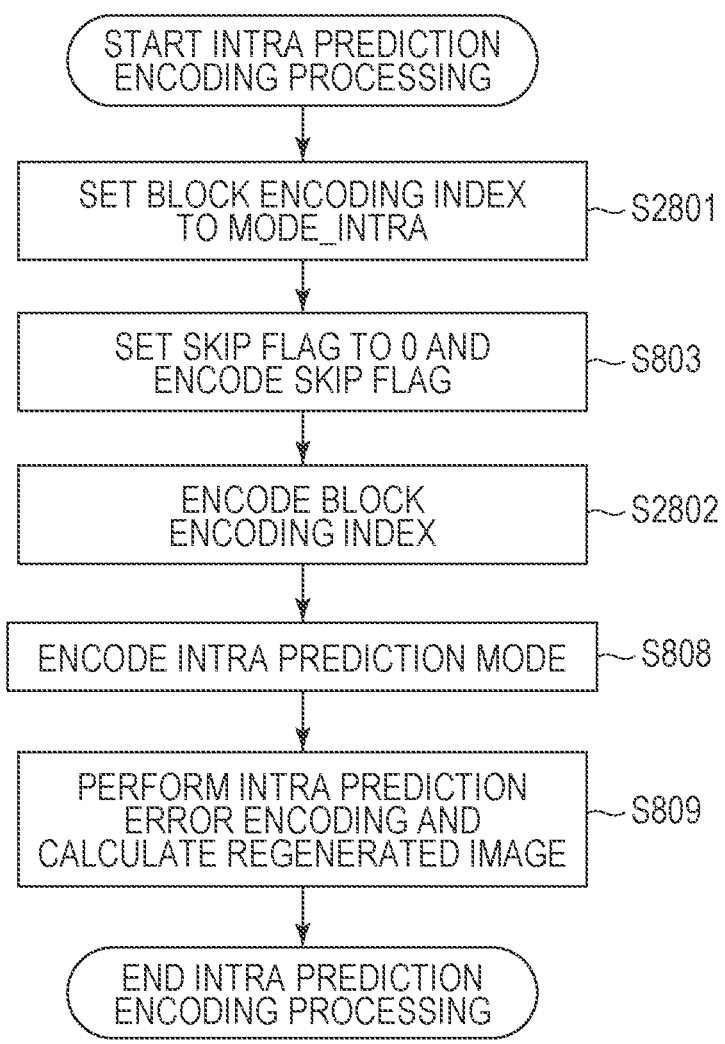
FIG. 28 is a flowchart illustrating intra prediction encoding processing of a block according to the seventh embodiment.

FIG. 28 is a flowchart illustrating the intra prediction encoding processing according to the present embodiment in step S622 in FIG. 6. Steps in FIG. 28 which have the same function as the flowchart in FIG. 8 are denoted by the same step numbers, and description thereof will be omitted. In step S2801, the header encoding unit 114 sets MODE_INTRA as the value of the block coding index. In step S2802, the header encoding unit 114 encodes the value of the block coding index set in step S2801 as pred_mode_idx code. The coding format is not restricted in particular, and encoding is performed by Huffman coding or arithmetic coding, in the same way as the other code. Thereafter, the same operations are performed in step S808 and step S809 as in the first embodiment, so description thereof will be omitted.

Figure 29:
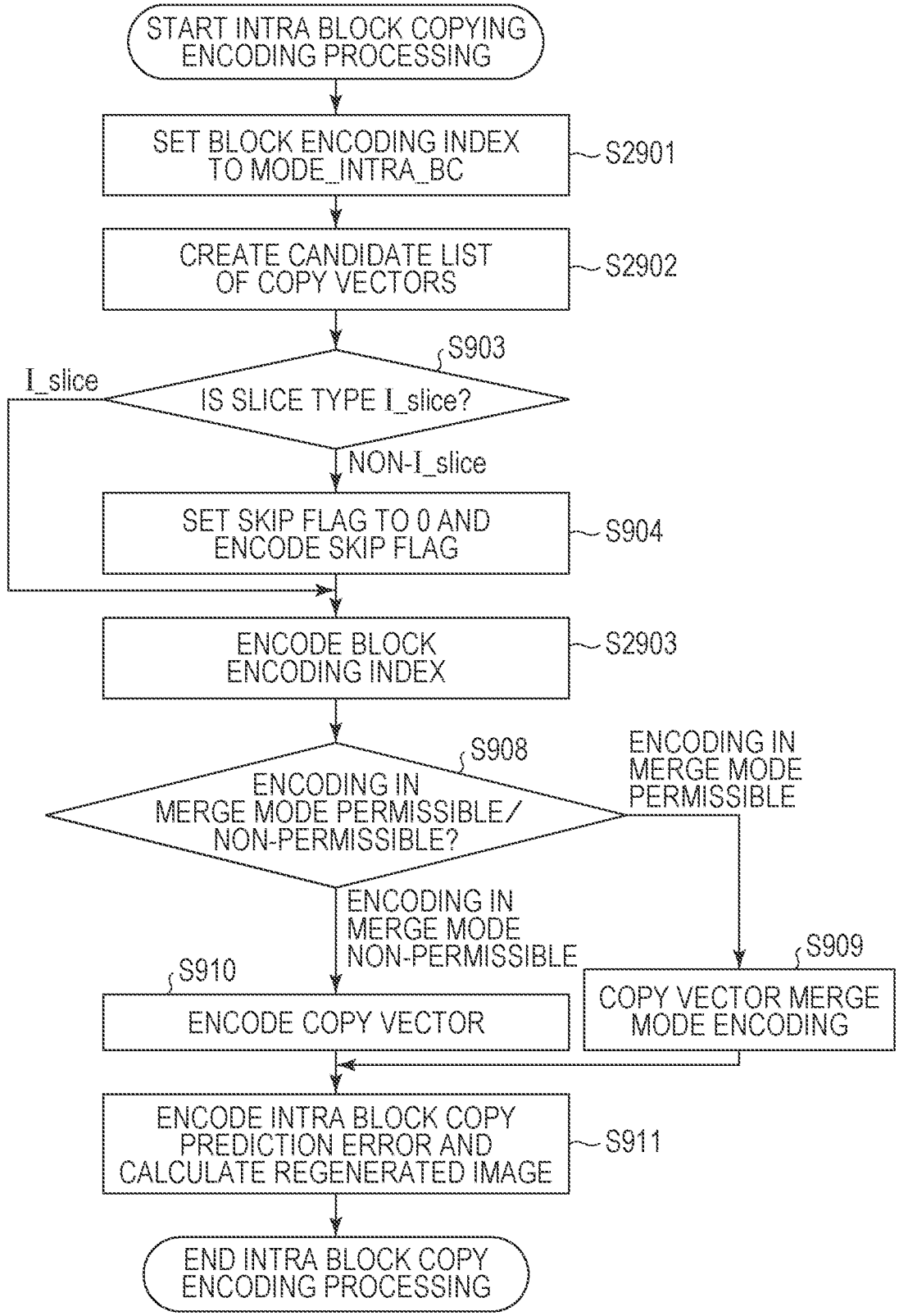
FIG. 29 is a flowchart illustrating intra block copying encoding processing of a block according to the seventh embodiment.

FIG. 29 is a flowchart illustrating the intra block copying encoding processing according to the present embodiment in step S623 in FIG. 6. Steps in FIG. 29 which have the same function as the flowchart in FIG. 9 are denoted by the same step numbers, and description thereof will be omitted. In step S2901, the header encoding unit 114 sets MODE_INTRA_BC as the value of the block coding index. Thereafter, the copy vector encoding unit 109 generates a copy vector candidate list in step S2902, in the same way as in step S902 in the first embodiment. In step S903, the header encoding unit 114 determines the slice type. In step S904, the header encoding unit 114 sets the value of the skip flag which indicates whether or not to perform skip coding to 0, and encodes this as cu_skip_flag code. In step S2903, the value of the block coding index set in step S2901 is set as pred_mode_idx code. Thereafter, the same operations are performed in step S908 through step S911 as in the first embodiment, so description thereof will be omitted.

FIGS. 25 and 26 illustrate an example of syntax relating to block coding, in the bit stream generated by the above-described configuration and operations. FIG. 25 represents the syntax for block coding. The pred_mode_idx code is encoded in FIG. 25 instead of the intra_bc_flag code and pred_mode_flag code used in the syntax for block coding in FIG. 2. Hereinafter, the value of the pred_mode_idx code is set in the CuPredMode[x0] [y0], instead of referencing the value of the intra_bc_flag code and pred_mode_flag code. The following determination is made according to the set values of MODE_INTRA, MODE_INTRA_BC, and MODE_INTER. FIG. 26 represents the syntax for blocks regarding which prediction is performed. The if(CuPredMode[x0][y0]!=MODE_INTRA||intra_bc_flag[x0] [y0] ||log2CbSize==MinCbLog2SizeY)
in line 12 of FIG. 2 is determined by the CuPredMode[x0][y0]
in which is set MODE_INTRA, MODE_INTRA_BC, or MODE_INTER, in the same way as in FIG. 25, and not by referencing the intra_bc_flag code in FIG. 2. Accordingly,
if(CuPredMode[x0][y0]=MODE_INTER||
CuPredMode[x0] [y0]=MODE_INTRA_BC||
log2CbSize==MinCbLog2SizeY)
holds.

According to the above-described apparatus configuration and method, processing in each block can be simplified by using pred_mode_idx code instead of the intra_bc_flag code and pred_mode_flag. For example, comparing FIG. 7 in the first embodiment and FIG. 27 in the present embodiment, step S701, step S712, and step S718 are replaced by step S2701, step S2702, and step S2703. Also, step S710, step S711, step S716, and step S717 are omitted.

In the encoding of the pred_mode_idx code, encoding may be performed by performing prediction from the value of block coding indexes of blocks in the periphery. For example, MODE_INTRA may be 1, MODE_INTRA_BC 2, and MODE_INTER 3, and 0 if the same as the block coding index of the block encoded immediately before, for example. Coding efficiency may be improved by assigning the shortest code thereto.

Also, the pred_mode_idx code may be situated at the top of the syntax, as in the case of the block coding syntax in the fifth and sixth embodiments. That is to say, an arrangement may be made where the content of Table 4 at lines 3 and 4 in FIG. 19 are replaced with the contents of Table 5, and the contents of lines 11 and 12 in FIG. 19 in Table 6 are omitted.

TABLE 4 if( intra_block_copy_enabled_flag )
intra_bc_flag[ x0 ][ y0 ]

TABLE 5 pred_mode_flag_idx

TABLE 6

If( slice_type != [ && !intra_bc_flag[ x0 ][ y0 ] ) 
pred_mode_flag

Eighth Embodiment

An eighth embodiment of the present invention will be described with reference to FIG. 30. Description will be made in the present embodiment regarding an example of a case where a bit stream generated in the seventh embodiment is to be decoded.

The configuration of the image decoding apparatus according to the present embodiment is the same as that in FIG. 11, so description thereof will be omitted. Note however, the operations of the dividing unit 1103 and the header decoding unit 1104 differ from those in the second embodiment. The image decoding operations according to the present embodiment will be described below. Description of a flowchart illustrating the overall decoding operations will be omitted, since this is the same as the second embodiment except for the block decoding operations in step S1203 in FIG. 12 being different.

Figure 30:
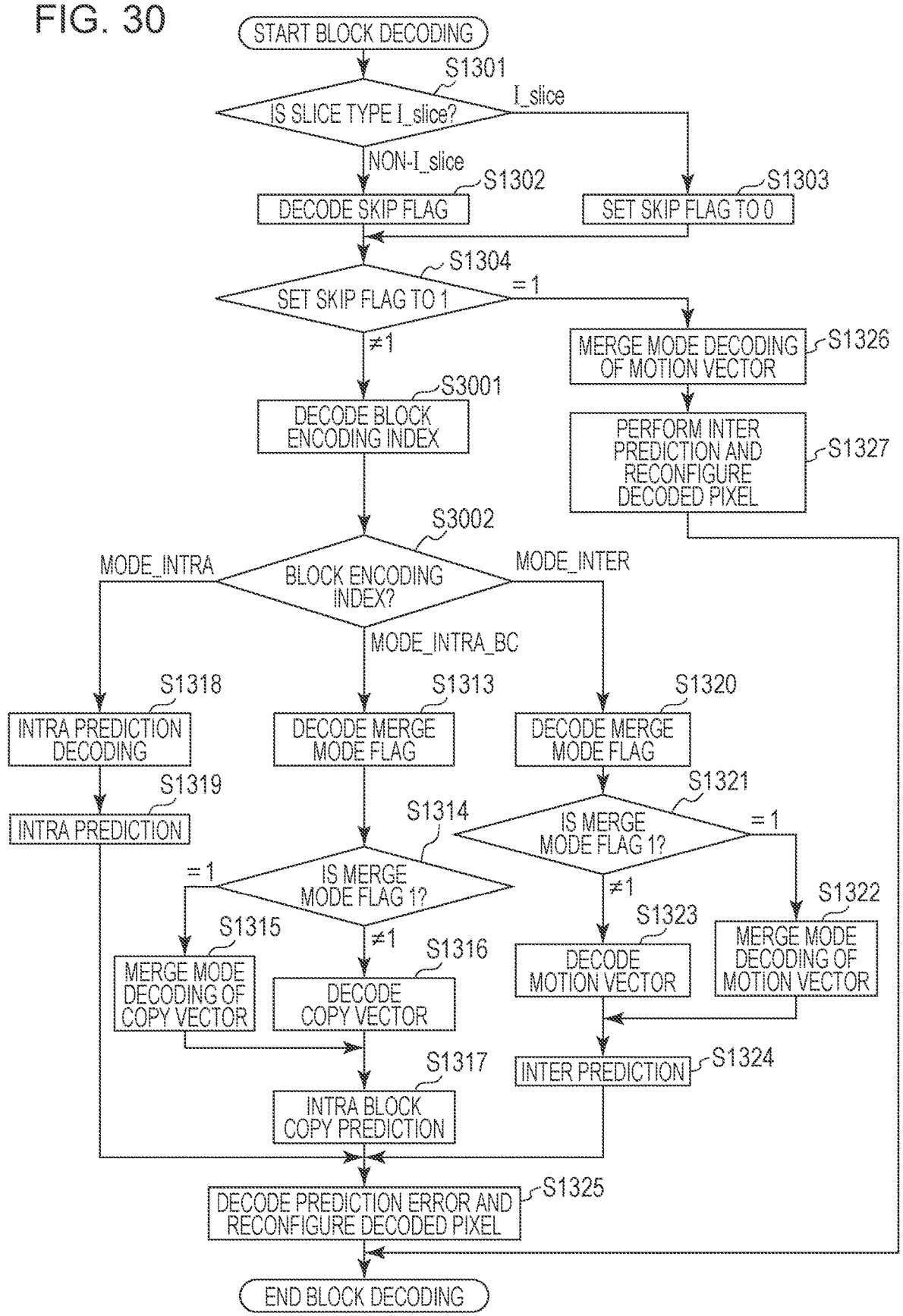
FIG. 30 is a flowchart illustrating the image decoding processing of a block according to the eighth embodiment.

FIG. 30 is a flowchart illustrating the block decoding operations according to the eighth embodiment. Steps in FIG. 30 which have the same function as the flowchart in FIGS. 13A and 13B are denoted by the same step numbers, and description thereof will be omitted. In steps S1301 through S1303, the header decoding unit 1104 decides the value of the skip flag in accordance with the slice type, in the same way as in the second embodiment. In step S1304, the header decoding unit 1104 determines the value of the skip flag, and in a case where the value of the skip flag is 1, determination is made that skip coding has been performed, and the flow advances to step S1326, and if not, to step S3001. In a case where the skip flag is 1 in step S1304, the header decoding unit 1104, motion vector decoding unit 1107, and inter prediction unit 1110 perform the processing of steps S1326 and S1327, in the same way as with the second embodiment. Thus, the decoding processing of the block to be decoded ends. In a case where the skip flag is not 1 in step S1304, in step S3001 the header decoding unit 1104 decodes the pred_mode_idx code, and regenerates the value of the block code index. In step S3002, the header decoding unit 1104 determines the value of the block coding index.

In a case where the value of the block coding index is MODE_INTRA_BC in step S3002, the flow advances to step S1313. Thereafter, the copy vector decoding unit 1105 decodes the copy vector in steps S1313 through S1316, in the same way as in the second embodiment. The intra block copy prediction block data is regenerated in step S1317, image data of the regenerated image is generated in step S1325, and the decoding processing of the block to be decoded ends.

In a case where the value of the block coding index is MODE_INTRA in step S3002, the flow advances to step S1318. Thereafter, the intra prediction unit 1111 decodes the intra prediction mode in step S1318, regenerates the intra prediction block data in step S1319, generates the regenerated image in step S1325, and ends decoding processing of the block to be decoded, in the same way as with the second embodiment.

In a case where the value of the block coding index is MODE_INTER in step S3002, the flow advances to step S1320. Thereafter, the motion vector decoding unit 1107 decodes the motion vector insteps S1321 through S1323, in the same way as with the second embodiment. Inter prediction block data is regenerated in step S1324, the regenerated image is generated in step S1325, and the decoding processing of the block to be decoded ends.

Input of block code data to the dividing unit 1103 will be described with reference to the syntax in FIGS. 25 and 26. In FIG. 25, coding_unit( ) represents the syntax for the block. In a case where the slice type is not I_slice, the dividing unit 1103 inputs cu_skip_flag code, and outputs to the header decoding unit 1104. In a case of not skip coding, the dividing unit 1103 inputs pred_mode_idx code, and outputs to the header decoding unit 1104. Thereafter, code is sequentially input following the value of the block coding index, and output to the header decoding unit 1104, copy vector decoding unit 1105, and motion vector decoding unit 1107, respectively.

Also, in FIG. 26, prediction_unit( ) represents the syntax for blocks regarding which prediction is performed. Ina case where the value of the cu_skip_flag code in FIG. 2 is 1, merge_idx code is input, and is output to the copy vector decoding unit 1105 or the motion vector decoding unit 1107 depending on the slice type. Also, if the value of the cu_skip_flag code is not 1, merge_flag code is input, and is output to the copy vector decoding unit 1105 or the motion vector decoding unit 1107 depending on the value of the block coding index. If there is merge_idx code, this also is output to the copy vector decoding unit 1105 or the motion vector decoding unit 1107 depending on the value of the block coding index. If the value of the merge_flag code is 0, inter_pred_idc code is input for B_slice, and output to the motion vector decoding unit 1107. In a case where the value of the block coding index is MODE_INTRA_BC, the code vector relating to the copy data is input to the copy vector decoding unit 1105. Thereafter, code data relating to motion vectors is input to the motion vector decoding unit 1107 as necessary.

Also, the pred_mode_idx code may be situated at the top of the block code data, as in the case of the block coding syntax in the fifth and sixth embodiments. The reason is that decoding the pred_mode_idx code first in the sixth embodiment is the same as decoding the intra_bc_flag code and pred_mode_flag code first.

According to the above-described apparatus configuration and method, processing in each block can be simplified by using pred_mode_idx code instead of the intra_bc_flag code and pred_mode_flag code. For example, comparing FIGS. 13A and 13B in the second embodiment and FIG. 30 in the present embodiment, step S1309 and step S1311 are replaced by step S3001 and step S3002. Also, step S1305 through step S1308, step S1310, and step S1312 are omitted.

Further, an example has been described in the present embodiment where the functions are realized by hardware, but this is not restrictive, and part or all of the operations thereof may be realized by software using a processor such as a CPU or the like.

Further, the coding format used for generating each code data is not restricted in particular. For example arithmetic coding formats or Huffman coding formats can be used for decoding.

Ninth Embodiment

Description has been made in the above embodiments that the processing units illustrated in FIGS. 1 and 11 are configured using hardware. However, processing performed by the processing units illustrated in FIGS. 1 and 11 may be configured using a computer program.

Figure 31:
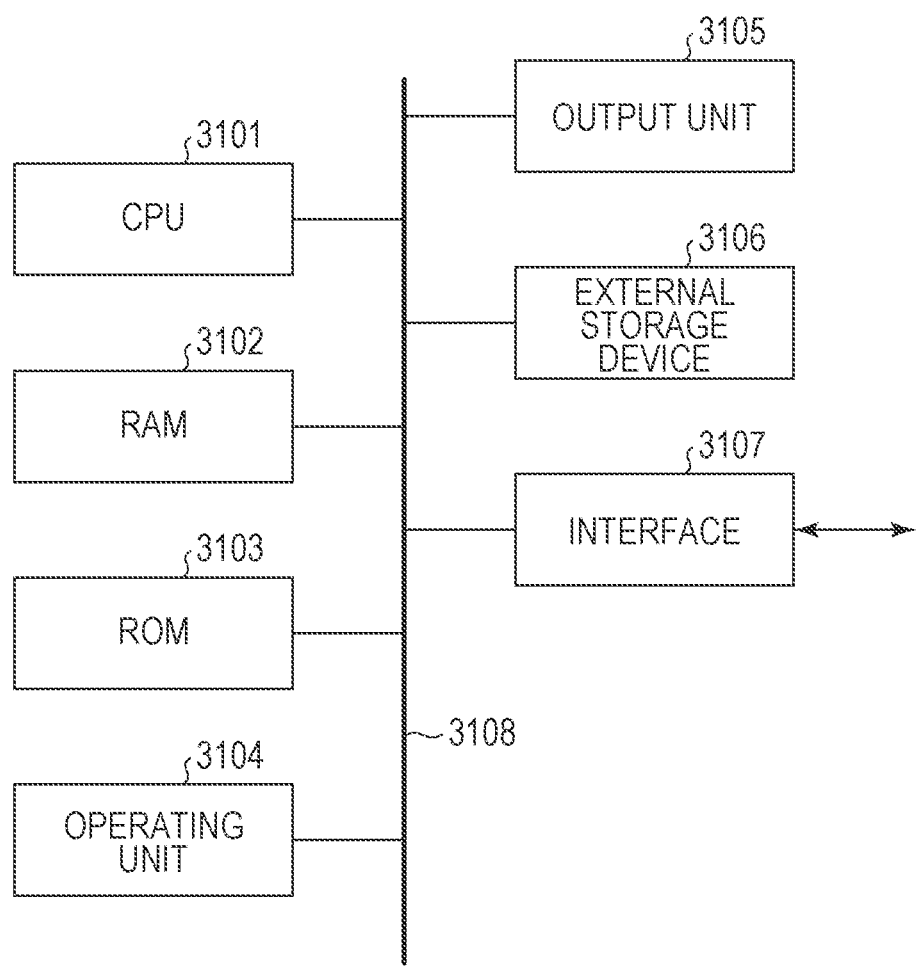
FIG. 31 is a block diagram illustrating a configuration example of hardware of a computer applicable to the image encoding apparatus and decoding apparatus according to the present invention.

FIG. 31 is a block diagram illustrating a configuration example of computer hardware that is applicable to an image display device according to the above embodiments. A CPU 3101 controls the entire computer using computer programs and data stored in random access memory (RAM) 3102 and read-only memory (ROM) 3103, and also executes the above-described processing which the image encoding apparatus or image decoding apparatus according to the above-described embodiments. That is to say, the CPU 3101 functions as the processing units illustrated in FIGS. 1 and 11.

The RAM 3102 has an area for temporarily storing computer programs and data loaded from an eternal storage unit 3106, data externally acquired from an interface 3107, and so forth. Further, the RAM 3102 has a work area used when the CPU 3101 executes various types of processing. That is to say, the RAM 3102 can be allocated as picture memory, and provide other various types of area, as appropriate.

The ROM 3103 stores settings data from the computer, a boot program, and so forth. An operating unit 3104 is configured including a keyboard, mouse, or the like, and can be used by a user of the computer to input various types of instructions to the CPU 3101. A display unit 3105 displays the results of decoding by the CPU 3101. The display unit 3105 may be configured as liquid crystal display, for example.

An external storage device 3106 is a large-capacity storage device, such as a hard disk drive or the like. The external storage device 3106 saves an operating system (OS) and computer programs for causing the CPU 3101 to realize the functions of the units illustrated in FIGS. 1 and 11. Image data to be processed may also be saved in the external storage device 3106.

Computer programs and data saved in the external storage device 3106 may be loaded to the RAM 3102 under control of the CPU 3101 and processed by the CPU 3101 as appropriate. The interface 3107 can be connected to networks such as a local area network (LAN) or the Internet, and other apparatuses such as projector apparatuses and display apparatuses and the like. The computer can acquire and transmit various types of information via the interface 3107. Reference numeral 3108 denotes a bus connecting the above-described parts. The apparatus configured as described above performs the operations described in the flowcharts above, under primary control of the CPU 3101.

Other Embodiments

The present invention may also be realized by supplying a storage medium storing code of a computer program realizing the above-described functions to a system, and the system reading out and executing the code of the computer program. In this case, the code of the computer program itself, read out from the storage medium, realizes the functions of the above-described embodiments, and the storage medium storing the code of the computer program makes up the present invention. Also included are cases where the OS or the like running on the computer performs part or all of the actual processing, based on instructions of the program code, thereby realizing the above-described functions.

The present invention may further be realized by the following form. Computer program code read out from a storage medium is written into memory in a function expansion card inserted to the computer or a function expansion unit connected to the computer. A CPU or the like provided to the function expansion card or function expansion unit performs part or all of the actual processing based on instructions of the code of the computer program, thereby realizing the above-described functions. This form is also encompassed by the scope of the present invention.

Note that in a case of applying the present invention to the storage medium, the storage medium stores code of the computer program corresponding to the above-described flowcharts.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The present invention can be applied to apparatuses which encode images which are not natural images, such as artificial images like screen contents that have been generated, for example, and an apparatus which decodes the encoded videos.

Copy vectors can be encoded in intra block copying coding without coding difference vectors, so efficiency of copy vector coding can be improved. Further, skip coding can be used in intra block copying coding, so coding efficiency can be improved. Also, intra block copying coding is added as a new coding mode to the conventional inter coding mode and intra coding mode. Establishing this as a unified coding mode (also referred to as "prediction coding mode" to distinguish from conventional block coding mode) enables encoding/decoding processing to be simplified.

The invention claimed is:

1. An image decoding method to decode a block in a target image of a video sequence from encoded data, using a first vector representing a spatial relationship between the block to be decoded and a first prediction block in the target image, the image decoding method comprising:
acquiring, from the encoded data, a prediction mode of the block to be decoded;
in a case where the prediction mode is an intra block copy prediction mode, generating, for the block to be decoded in the target image, a candidate list of vectors associated with second blocks in the target image, each of the vectors in the candidate list representing spatial relationship between one of the second blocks and a corresponding block of second prediction blocks in the target image;
adding, if a number of vectors in the candidate list is lower than a predetermined number, at least one vector having a zero vector value into the candidate list without adding a vector obtained from a third block in an image that is different from the target image, so that the number of vectors in the candidate list becomes the predetermined number,
acquiring a vector as the first vector for the block to be decoded, selected from the candidate list corresponding to an index decoded from the encoded data; and
determining the first prediction block for the block to be decoded from the decoded part of the target image, based on the acquired first vector, and
wherein, in a case where the prediction mode is inter prediction mode, the candidate list is made up of vectors obtained from blocks, which are spatially near the block to be decoded, in the target image having the block to be decoded, and blocks included in an image that is different from the target image, if available.

* * * * *